(12) United States Patent
Lauer

(10) Patent No.: US 7,209,287 B2
(45) Date of Patent: Apr. 24, 2007

(54) CONFOCAL OPTICAL SCANNING DEVICE

(76) Inventor: Vincent Lauer, 1 villa de Beauté, Nogent sur Marne (FR) 94130

(*) Notice: Subject to any disclaimer, the term of this patent is extended or adjusted under 35 U.S.C. 154(b) by 63 days.

(21) Appl. No.: 10/380,373

(22) PCT Filed: Sep. 18, 2001

(86) PCT No.: PCT/FR01/02890

§ 371 (c)(1),
(2), (4) Date: Jul. 23, 2003

(87) PCT Pub. No.: WO02/23247

PCT Pub. Date: Mar. 21, 2002

(65) Prior Publication Data

US 2004/0032650 A1 Feb. 19, 2004

(30) Foreign Application Priority Data

| Sep. 18, 2000 | (FR) | ................................. 00 11879 |
| Jan. 23, 2001 | (FR) | ................................. 01 01138 |
| Feb. 13, 2001 | (FR) | ................................. 01 01906 |
| Feb. 20, 2001 | (FR) | ................................. 01 02254 |
| Mar. 22, 2001 | (FR) | ................................. 01 03860 |

(51) Int. Cl.
*G02B 21/00* (2006.01)
(52) U.S. Cl. .................... 359/368; 359/385; 250/458.1
(58) Field of Classification Search .................... None
See application file for complete search history.

(56) References Cited

U.S. PATENT DOCUMENTS 4,170,398 A 10/1979 Koester (Continued)

OTHER PUBLICATIONS

G.J. Brakenhoff & K.Visscher, "Novel Confocal Imaging and visualization techniques", 11353 Proceedings of the Royal Microscopical Society Conference (Micro 90) Jul. 2-6, 1990, London, Bristol, UK.

(Continued)

*Primary Examiner*—Mark A. Robinson
*Assistant Examiner*—Lee Fineman

(57) ABSTRACT

Confocal optical scanning device designed to allow visualization of an object to be observed (1107) and comprising:
  an optical system designed, on the one hand, to focus an illuminating beam (FX) coming from a light source on to at least one illuminating point (FXO) intended to illuminate a point of the object to be observed (1107) and, on the other hand, to focus a light beam (FE) coming from the illuminated point of the object (1107) on to a luminous point (FEO) in a first image plane (P1),
  at least one rotatably mounted mobile mirror (1104) on which are reflected, on the one hand, the illuminating beam (FX) to allow the scanning of the object to be observed (1107) along an observed plane and, on the other hand, the light beam (FE) to bring the luminous point (FEO) on to a fixed point on the first image plane,
  a first spatial filtering system (1203) arranged in the first image plane and designed to filter the luminous point (FEO) to obtain a beam to be detected (FD).

The optical system and the first spatial filtering system (1203) are designed to send back the beam to be detected (FD) on to said rotatably mounted mobile mirror (1104), the optical system is also designed to focus said beam to be detected (FD), on to a point to be detected (FDO) in a second image plane (P2) to obtain, in said second image plane, a movement of said point to be detected proportional to the movement of the illuminated point in the observed plane of the object.

22 Claims, 32 Drawing Sheets

U.S. PATENT DOCUMENTS

| | | |
|---|---|---|
| 4,806,004 A | 2/1989 | Wayland |
| 5,737,084 A * | 4/1998 | Ishihara .................... 356/609 |
| 6,028,306 A | 2/2000 | Hayashi |
| 6,038,067 A | 3/2000 | George |
| 2002/0141051 A1 | 10/2002 | Vogt |

OTHER PUBLICATIONS

G.J. Brakenhoff & K.Visscher, "Confocal Imaging with bilateral scanning and array detectors", Journal of Microscopy vol. 165 Pt1, Jan. 1992, pp. 139-146, The Royal Microscopical Society, UK.

G.J. Brakenhoff & K.Visscher, "Imaging modes for bilateral confocal scanning microcopy", Journal of Microscopy(Oxford) vol. 171, Pt 1, Jul. 1993, pp. 17-26, The Royal Microscopical Society, UK.

G.M. Svishchev, "Microscope for the study of transparent light-scattering objects in incident light", Optics and Spectroscopy vol. 26 pp. 171-172, 1969, St Petersburg, Russia.

* cited by examiner

CONFOCAL OPTICAL SCANNING DEVICE

This invention relates to a confocal optical scanning device used for example in a fast confocal microscope, and in particular in a fluorescence or reflectance confocal microscope designed for real-time operation.

The principle of the confocal scanning optical microscope is the illumination of an object to be observed with an illuminating beam focused on a point of the object, and detecting the light returning from this illuminated point of the object. The confocal microscope thus has an illuminating beam, that may be filtered by a pinhole, and the light beam coming from the illuminated object itself goes through a pinhole selecting the light coming from the illuminated point. The light beam from the object, and which has been filtered spatially by the pinhole, is then detected.

To generate an image of the object, it is necessary to move the illuminated point of the object in a plane. This scanning can be carried out in different ways:

i)—By moving the observed object in relation to the objective. This is the simplest method but it is excessively slow. It is described for example in U.S. Pat. No. 3,013,467.

ii)—By providing pinholes on a disk which is traversed in one direction by the illuminating beam and in the other by the light beam coming from the object. When the disk is rotating rapidly in the image plane, the pinholes move and the object is scanned. This is the technique of the Nipkow disk, described for example in U.S. Pat. Nos. 3,517,980 and 4,927,254. As the disk is pierced with many holes, this scanning technique is very fast. Detection can take place directly on a camera, and it is also possible to observe the image directly with the naked eye. On the other hand, 95% of the available luminous power is lost, thus limiting the effectiveness of this technique when samples exhibit low fluorescence.

iii)—Using galvanometric mirrors to deflect the illuminating beam, in accordance with a technique described for example in U.S. Pat. No. 3,518,014. The object is then scanned point by point and a single pinhole is used. A photomultiplier tube allows the detection of photons going through this hole. The technique is the one most used in fluorescence confocal microscopy because there is little loss of luminous energy. On the other hand, the imaging speed is limited by the saturation of fluorescence and/or the oscillation frequency of the galvanometric mirrors. The image cannot be observed directly and must necessarily be reconstituted by computer based on data acquired by the photomultiplier tube. The reconstitution of a horizontal plane or an observed plane of the object requires precise knowledge of the position of the galvanometric mirrors corresponding to the signal sampled at each instant on the photodetector. To operate correctly the system requires very precise control of the galvanometric mirrors and perfect synchronization between the movement of the galvanometric mirrors and the sampling of the signal coming from the photodetector.

The Nipkow disk technique is today the only one making it possible to obtain directly, by optical means, a confocal image that can be recorded on a camera. It however involves a certain number of difficulties. An important point is that it is not possible to exchange the Nipkow disk without rebalancing the rotary system and, in practice, Nipkow disks are always fixed, thus generally preventing the optimization of the spatial filtering characteristics (the width of the pinholes or their density) according to the wavelength used and/or the speed desired. For this reason, U.S. Pat. No. 6,002,509 proposes a solution for modifying the spatial filtering characteristics by superposing on the same disk several zones having different spatial filtering characteristics. To filter the beam spatially, that patent uses a transparent disk having an array of microscopic mirrors which have a function equivalent to the pinholes of an opaque Nipkow disk. Another difficulty has to do with the problem of stray light which interferes with the useful light, coming from the object and filtered by the disk. U.S. Pat. No. 3,517,980 makes it possible to solve this problem at the cost of disk alignment difficulties and stability requirements which are difficult to meet. U.S. Pat. No. 4,927,254 only partially solves the problem but prevents any alignment difficulty.

To improve the imaging speed, a Nipkow disk microscope has been designed with a collecting disk consisting of an array of microlenses, and which is attached to the disk which has pinholes. Each microlens is placed opposite a pinhole and focuses on this hole the light coming from the illuminating beam. This technique is described for example in U.S. Pat. No. 5,162,941, as well as in U.S. Pat. No. 5,579,157. This technique makes it possible to prevent the loss of light power resulting from the use of a Nipkow disk, while preserving the high imaging speed inherent in Nipkow disk systems.

The technique described in U.S. Pat. No. 5,579,157 raises difficult mechanical design and alignment problems and it is costly to implement. The disk bearing the pinholes and the collector disk must be aligned in relation to each other with great accuracy. The assembly made up of these two disks must rotate rapidly around an axis which must be perfectly fixed, perfectly orthogonal to the plane of the disks, and perfectly orthogonal to the direction of propagation of the incident light. In practice, it is extremely difficult to keep the position of the axis fixed, and this results in image defects, typically small light or dark lines superposed on the image. In the above-mentioned systems, part of the illuminating beam is reflected on the plate bearing the pinholes and is then directed to the CCD sensor. As this part of the illuminating beam is very intense in relation to the return light beam corresponding to the fluorescence, it is difficult to eliminate by means of dichroic filters, thus resulting in significant attenuation of the beam.

In addition, the same pinholes are traversed successively by the illuminating beam directed towards the object, and by the light beam coming from the object. If the diameter of these holes is small, the resulting loss of beam intensity is far greater than that resulting from simply reducing the pinhole diameter in a confocal laser scanning microscope with galvanometric mirrors. In order for the intensity to remain reasonably high, the pinholes must have a diameter close to the width of the Airy disk. This causes a significant reduction in resolution compared with the confocal laser scanning microscope with galvanometric mirrors, in which resolution can be increased by reducing the pinhole diameter.

In the above-mentioned systems, the image of a pinhole on the CCD camera, when this image is moved by a length equal to half the Airy disk width, covers quite amply the same image before movement. Consequently, resolution is limited only by the fluorescent emission wavelength, and the resolution limit is higher than what it is in a confocal laser scanning microscope with galvanometric mirrors, in which advantage is taken of the small excitation wavelength.

Another solution for improving imaging speed is described in U.S. Pat. No. 5,351,152. The system described in that patent comprises a fixed array of microlenses which split the laser beam into sub-beams which are each filtered by a pinhole located in an image plane. The objective focuses in the object the beams coming from each of these pinholes. The light beam re-emitted by the object is then redirected towards a CCD sensor, each pixel of the CCD sensor being the image of a point of the object on which is focused the beam coming from a corresponding pinhole. Scanning is carried out using the method (i) consisting of moving the object in relation to the objective, although other methods are not expressly excluded. The point of the object which is illuminated by one of the sub-beams and whose image is obtained on a corresponding point of the CCD sensor scans a small zone of the object. The image of the object must be reconstituted by computer from a series of images obtained successively on the CCD sensor during the object scanning operation. The scanning speed of this microscope is thus limited by the reading speed of the CCD sensor, which must be re-read several times to obtain a single image. A variant of this solution is described in U.S. Pat. No. 5,978,095.

In general, the 3D deconvolution of the image, which can substantially improve the resolution, is difficult by means of existing confocal microscopes. In scanning instruments with galvanometric mirrors it is made difficult by sampling errors.

As an example, in FIG. 1 is represented a confocal microscope, according to the prior art, using galvanometric mirrors. The illuminating beam FX coming from a laser 1100 passes through a beam expander composed of lenses 1101 and 1102, is reflected by a splitter 1103, by rotating mobile mirrors 1104 and 1105, passes through a microscope objective 1106 and reaches, after focusing, an illuminating point FOX which illuminates a point of the object to be observed 1107, this illuminating point FOX being an isolated point surrounded by a nonilluminated zone. The light beam FE, coming from the illuminated point of the object 1107, passes through the objective 1106, is reflected by the rotating mobile mirrors 1104 and 1105, passes through the splitter 1103 and the lens 1108, and is focused on a luminous point FEO on a spatial filtering system 1220. After passing through the spatial filtering system, the light beam FE1 becomes a beam to be detected FD which is detected by a detector 1221. The spatial filtering system is a pinhole, i.e. it absorbs the light beam everywhere except on a hole of small dimensions. In the case of a Nipkow disk microscope, the Nipkow disk constitutes a spatial filtering device selecting the light passing through a set of distinct pinholes. in the case of the microscope described in U.S. Pat. No. 5,239,178, the camera plays both the role of detection system and spatial filtering device selecting the light passing through a set of pinholes forming a square grid array.

FIG. 2 shows a simple ray trace coming from a fixed point 1410 of a plane 1400, along the path of a beam coming from the plane 1400 and reflected by a mobile mirror 1405. After reflection by the mobile mirror 1405, the ray trace defines a virtual image plane 1404 conjugate of the plane 1400. The geometrical image of a point 1410 of the plane 1400 is a point 1411 of the plane 1404. Owing to the rotation of the mobile mirror 1410, the geometrical image 1411 of a fixed point 1410 is mobile.

In the case of FIG. 1, a ray trace coming from the point FOX of the object 1107 and along the path of the beam to be detected defines a first real image plane P1, in which is placed the spatial filtering system 1220, conjugate of the observed plane of the object 1107.

The rotation of the mobile mirror 1104 simultaneously entails:
a movement of the image of the plane 1210 in the observed plane of the object 1107,
a movement of the image of the observed plane of the object 1107, in the first image plane, in which is located the spatial filtering system 1220.

The image FEO in the first image plane P1, of a point FOX made mobile by the rotation of the mirror 1104, which is itself the image of a fixed point 1224, is a fixed point. This usually enables the confocal microscope to detect only the light coming from the illuminated point FOX which scans the object.

Object scanning characteristics depend on the mobile mirrors used. For example, if the mirror 1104 is mobile in rotation around an axis orthogonal to the plane of the figure, and the mirror 1105 is fixed, only a line of the observed object can be scanned. If the mirror 1104 is mobile in rotation around two axes orthogonal to each other, or if the mirrors 1104 and 1105 are each mobile around an axis, it is possible to scan a plane of the observed object.

Other equivalent configurations can be used although they are not of any particular interest and hence are not customarily used. FIG. 3 shows such a configuration, in which the mobile mirror 1104 in Figure has been replaced by a mobile mirror 1230 with several facets, in which a separator 1232 is placed on the path of the light beam FE coming from the object before reflection by a mobile mirror, and in which a mirror 1231 is used to send the beam back towards the mobile mirror. The illuminating beam FX and the light beam FE are reflected by distinct facets of the mirror, but the optical system is designed so that the basic properties of the device are conserved. In general, in the present patent, the term "mirror" will designate a mirror with one or more facets, the facets being integral with each other but may be separated by nonreflecting zones, and the mirror may have very diverse forms.

In the device of FIG. 1, a signal reaching the sensor 1203 is recorded and an image of the observed plane is reconstituted by a computer. To reconstitute the image, it is necessary to have access, for each sampled value of the signal coming from the sensor 1203, to the corresponding position of the mobile mirrors. This device is thus extremely sensitive to any error in the positioning of the galvanometric mirrors. Moreover, it does not allow direct observation of the image by means of an eyepiece.

It is an object of the present invention to overcome the technical problems mentioned above, by providing a confocal optical scanning device allowing the recording of a signal selected by the spatial filtering system, which permits a reconstitution of the observed object that will not be excessively sensitive to galvanometric mirror positioning errors. In particular, it is an object of the present invention to provide a confocal optical scanning device having, like the Nipkow disk systems, the ability to generate an image that can be recorded for example on a matrix CCD sensor using a purely optical method, but in which, unlike the Nipkow disk, the spatial filtering characteristics can be easily modified in order to always conserve optimum image quality.

For this purpose, it is the object of the invention to provide a confocal optical scanning device including:

a optical system designed, on the one hand, to focus an illuminating beam coming from the light source on to at least one illuminating point isolated and surrounded by a nonilluminated zone, said at-least-one illuminating point being designed to illuminate a point of the object to be observed and, on the other hand, to focus a light beam coming from the illuminated point of the object on to a luminous point in a first image plane;

at least one mirror mounted movably in rotation and on which are reflected, on the one hand, the illuminating beam to allow said at-least-one illuminating point to scan the object to be observed along an observed plane and, on the other hand, the light beam coming from the illuminated point of the object to bring the luminous point on to a fixed point on the first image plane;

a first spatial filtering system arranged in the first image plane and designed to obtain a beam to be detected coming from the filtered luminous point;

wherein the optical system and the spatial filtering system are designed to send the beam to be detected on to said mirror movable in rotation, and wherein the optical system is also designed to focus said beam to be detected, reflected off the mobile mirror, on to a point to be detected in a second image plane in order to obtain, in said second image plane, a movement of said point to be detected proportional to the movement of the illuminated point in the observed plane of the object.

Thanks to these arrangements, the reflection of the beam to be detected by the mobile mirror allows the image of the first spatial filtering system to move in the second image plane. As the mobile mirror on which the reflection of the beam to be detected takes place is the same as that on which the reflection of the light beam and the reflection of the illuminating beam take place, the movement of the point to be detected in the second image plane is proportional to the movement of the illuminated point in the observed plane. For example, in the case in which the spatial filtering system is a single pinhole as in FIG. 1, it is possible to place a linear or matrix CCD sensor in the second image plane, which must then be real. To each position of the image of the pinhole on the sensor there then corresponds a position of the observed point in the observed plane. On the image formed on the sensor, each point corresponds to a perfectly determined point of the observed object, the position of which is not affected by any errors in the positioning of the mobile mirror. The data recorded on the sensor thus make it possible to reconstitute faithfully the image of a scanned line in the object (if the rotation of the mirror takes place around a single axis) or a scanned plane in the object (if the rotation of the mobile mirror takes place, for example, around two axes orthogonal to each other), even if the mobile mirror positioning control is not perfect.

The second image plane may be real or virtual. However, the aim is to focus the beam to be detected in a real image plane which can be included in the scanning device or outside this device. This real image plane may, for example, be on the retina of the eye of an observer or on the sensor of a camera.

According to another characteristic of the invention, the optical system includes means for splitting the illuminating beam into a plurality of illuminating sub-beams, and the optical system is designed, on the one hand, to focus the plurality of illuminating sub-beams into a plurality of corresponding illuminating points on the observed plane of the object and, on the other hand, to focus the plurality of light sub-beams coming from the plurality of illuminated points of the object into a plurality of luminous points on the first spatial filtering system, and the first spatial filtering system is designed to filter individually each luminous point coming from each illuminated point of the object in order to obtain a plurality of corresponding sub-beams to be detected.

Thus, the system according to the invention makes it possible to achieve multipoint confocal imaging having all the advantages, in terms of speed, of known solutions such as the Nipkow disk microscope.

However, in this case where a multipoint technique is used, the image points of each illuminated point of the observed plane move simultaneously in the second image plane, and a point of the second image plane may be illuminated successively by the light coming from two different points of the observed object and having passed through two distinct points of the first spatial filtering system. The light intensity recorded at a point of the second image plane then corresponds to the superposition of signals coming from two distinct points of the object, and consequently does not allow optimum reconstitution of the observed object.

According to yet another characteristic of the invention, this problem is solved by adapting the optical system so that the geometrical image of a fixed geometrical point of the object, in the second image plane, is independent of the position of said at-least-one mirror mounted movably around its axes of rotation. In fact, in this case, a point of the second image plane is illuminated only by the light coming from its fixed geometrical image in the object, thus allowing the formation of a good-quality image. Preferably, the system may be adapted so that this geometrical image is fixed for arbitrary rotary movements of the mirror around three noncoplanar axes, including the case in which the mirror has only one axis of rotation. This prevents vibrations and instabilities of the mirror from resulting in movements of the image of a point in the illuminated plane of the object, and hence in sampling errors.

According to a characteristic of the invention, the scanning device comprises means for modifying the spatial filtering characteristics of the first spatial filtering system. This is facilitated by the fact that the first spatial filtering system is static during image acquisition, unlike a Nipkow disk. By spatial filtering characteristics is meant, for example, the diameter of each pinhole or of each microscopic mirror constituting the spatial filtering device, or the distribution of these elements on the spatial filtering device. For example, the first spatial filtering system may be designed with a spatial light modulator consisting of a matrix-type or ferroelectric liquid crystal-type device. In this case, the electrical connection of this device is facilitated by the fact that it is static. However, it is generally more effective to use mechanical means to modify the spatial filtering characteristics. According to a characteristic of the invention, the first spatial filtering system comprises at least one mobile or movable element to modify the spatial filtering characteristics of the first spatial filtering system. For example, the first spatial filtering system (130;606) may be mounted movably to be replaced, manually or by means of a motor-driven system, by another first spatial filtering system. The first spatial filtering system may also comprise several distinct zones whose filtering characteristics differ from each other, and be mounted movably to enable either one or the other of these zones to be placed on the path of the light beam. It may also be made up of a first absorbing and/or reflecting plate designed with a plurality of pinholes, and a second plate comprising absorbing and/or reflecting parts and transparent parts, these two planes being placed against each other and mobile in relation to each other so that the absorbing and/or reflecting parts of the second plate obstruct part of the pinholes of the first plate, and so that the relative movement of the two plates allows the modification of the pinholes left free. Whatever the method used, the device according to the invention makes it possible to modify the spatial filtering characteristics, thus allowing the optimization of these characteristics according to the wavelength used and/or the imaging speed or imaging quality desired. The movement of the mobile or movable element of the spatial filtering system requires, in the general case, good mechanical accuracy and/or a suitable alignment procedure: if, for example, the first spatial filtering system comprises pinholes about 30 microns wide, it is desirable that the positioning accuracy be better than 5 microns. On the other hand, as the first spatial filtering system is static during the operation of the microscope, it does not become misaligned and does not raise any balancing problems, thus solving the problem encountered in Nipkow disk systems; in the present scanning device, it is possible to modify the spatial filtering characteristics by a simple mechanical means. In the case, for example, in which the spatial filtering device is mounted movably and is exchangeable manually, there is no limit to the number of different devices that may be exchanged, and it is thus possible to optimize the filtering characteristics. If the spatial filtering device comprises zones and is mobile, the number of zones may be far greater than that which is utilizable on a Nipkow disk of the type described in U.S. Pat. No. 6,002,509. In fact, this number of zones is proportional to the total surface area of the device, whereas on a Nipkow disk it is proportional to the radius of the disk, i.e. to the square root of the surface area.

According to another characteristic of the invention, the means for splitting the illuminating beam into a plurality of illuminating sub-beams consist of the first spatial filtering system. This arrangement generally allows the system to be simplified. In particular, when the first spatial filtering system is exchangeable, this arrangement allows a considerable reduction in alignment stresses and improved mechanical accuracy. In fact, in this case, the first spatial filtering system determines both the position of the illuminated points in the sample or the object and the position of the filtered points to obtain the beam to be detected. When the spatial filtering system is exchanged, the position of the filtered luminous points corresponds automatically to the position of the illuminated points, without requiring any high-precision adjustments.

If the first spatial filtering system also constitutes the means for splitting the illuminating beam into a plurality of illuminating sub-beams, and if this spatial filtering system is made up of a plate pierced with pinholes, the optical system required to bring the beam to be detected towards the mobile mirror is relatively complex. This optical system may be considerably simplified, according to another advantageous characteristic of the invention, when the spatial filtering device is composed of a plate designed with a plurality of microscopic mirrors, and allowing the sending of the beam to be detected in a direction close to the direction of the incident beam. This solution moreover has the advantage, if the plate is transparent, of reducing the amount of light coming from the reflection of the illuminating beam on the spatial filtering system and which is superposed on the beam to be detected. In this case, and according to another characteristic of the invention, the optical system is preferably designed so that only one face of the rotatably mobile mirror reflects the plurality of illuminating sub-beams coming from the first spatial filtering system to the object to be observed, the plurality of the light sub-beams to the first spatial filtering system and the plurality of the sub-beams to be detected to the second image plane. This adaptation may be obtained in a particularly simple manner, according to another feature of the invention, by means of a single lens traversed by the plurality of illuminating sub-beams directed from the first spatial filtering system to the movably mounted mirror by the plurality of light sub-beams directed from the mobile mirror to the first spatial filtering system, and by the plurality of sub-beams to be detected directed from the first spatial filtering system to said movably mounted mirror. By "lens" is meant here either, as in the entire text of the patent, a single lens or a compound lens, for example an achromat or a set of several achroniats separated by air.

It is another object of the invention to allow the elimination of the light coming from the reflection of the illuminating beam on the spatial filtering system and which is superposed on the beam to be detected, and this without the difficulties related to the use of a Nipkow disk. For example, in a Nipkow disk-type microscope, the elimination of the light coming from the reflection of the illuminating beam on the spatial filtering system requires the use of two distinct parts of the disk traversed respectively by the illuminating beam and the light beam reflected by the sample, thus causing considerable adjustment and stability problems in the Nipkow disk.

According to one characteristic of the invention allowing the solution of the above problem, while using in its totality the opening of the objective, for the illumination beam as well as for the light beam coming from the object, the optical system also comprises a splitter to separate the plurality of illumination sub-beams directed to the object to be observed, from the light beam coming from the object to be observed to the first spatial filtering system, so that the first spatial filtering system is not reached by the illumination beam. As the first spatial filtering system is not reached by the illumination beam, the stray light is eliminated. However, owing to the fact that the first spatial filtering system is fixed, this result is obtained without the instability problems related to the Nipkow disk. To completely avoid stray light reflection on the first spatial filtering system, the first spatial filtering system is preferably made up of an absorbing and/or reflecting plate bearing pinholes through which light passes in a single direction. To completely avoid stray light reflections on the means for splitting the illuminating beam into sub-beams, these illuminating beam splitting means may preferably be, in the case of illumination in noncoherent light, a plate provided with a plurality of pinholes through which the illuminating beam passes in only one direction. In the case of illumination with coherent light, and so as not to reduce the useful intensity of the beam, it is preferable to use a support having a plurality of microlenses. In both cases, operation during transmission and the use of a splitter make it possible to avoid stray-light related problems.

According to another characteristic of the invention, the means for splitting the illuminating beam into a plurality of sub-beams include a support with a plurality of microlenses, and in which the first spatial filtering system comprises a plurality of pinholes through which the plurality of illuminating sub-beams pass. In this case, and according to a characteristic of the invention, the support comprising a plurality of microlenses, and the first spatial filtering system, are integral with each other and constitute a splitting and filtering system mounted movably so as to be replaced by another splitting and filtering system. The advantage of this solution is that, even in the case in which a splitter is used, it is not necessary to integrate this splitter in the removable splitting and filtering system.

When only one reflection face of a mirror is used, it is necessary, in order to avoid light intensity losses by polarizing devices allowing the separation of the different beams, to increase the size of the movably mounted mirror so as to separate spatially some of the beams. Increasing the size of the mirror results in a decrease of its resonance frequency, which may be troublesome for obtaining clean scanning. In addition, when the first spatial filtering system operates under reflection, the optical system required for the use of a single mirror face is complex. To optimize the resonance frequency of the movably mounted mirror, and in order to simplify the optical system, the movably mounted mirror may be a plane mirror comprising a first reflection face and a second reflection face, the first reflection face being designed to deflect the illuminating beam coming from the light source and the light beam emitted by the illuminated point of the object, and the second reflection face being designed to deflect the beam to be detected sent back by the first spatial filtering system and the optical system.

According to another characteristic of the invention, the means for splitting the illuminating beam into a plurality of illuminating sub-beams are designed so that the plurality of illuminating points forms a two-dimensional periodic array. Preferably, this array may be a hexagonal grid. Thanks to these arrangements, the device according to the invention allows light intensity losses to be minimized and the possibility of obtaining constant imaging characteristics independent of the considered point.

In this case, and in order to obtain constant imaging characteristics, it is possible to control said at-least-one mobile mirror so that each illuminated point completes a two-dimensional scanning of the object. However, this solution calls for efficient mobile mirrors with a high resonance frequency, and a more economical solution is for each point to scan a single line. If this line is curved, for example if each point scans a circle, the obtained image tends to exhibit illumination irregularities in certain directions. According to one version of the invention, a good-quality image benefiting from homogeneous illumination is obtained by controlling said at-least-one mirror mounted movably in rotation so as to move each of said illuminated points along a straight line not parallel to the direction of the director vectors of the periodic array. This solution makes it possible in particular to use a single mirror mounted movably in rotation.

When said at-least-one mobile mirror rotates around its axis or axes, each illuminated point moves in the object, and the entire illuminated zone moves consequently in the same manner, and all the points illuminated during the movement of this zone define an extended illuminated zone. The points of the object located at the center of the extended illuminated zone are illuminated more often than those located on the periphery of this zone, and the illumination is thus not homogeneous in the extended illuminated zone, thus making it difficult to obtain a good-quality image of a fixed observed zone. According to a characteristic of the invention, the illuminated zone can be made fixed by means of a diaphragm placed in an image plane through which passes the illuminating beam coining from said mobile mirror and directed to the observed object. This diaphragm makes it possible to limit the illuminated zone to the central part of the extended illuminated zone which would be obtained in the absence of a diaphragm. However, as part of the illuminating beam is stopped by the diaphragm, this solution reduces the useful intensity of the illuminating beam.

According to another characteristic of the invention providing a solution to this problem, the device comprises means for moving a zone illuminated by the illuminating beam on to the means for splitting the illuminating beam into sub-beams. The means for splitting the illuminating beam into sub-beams are, for example, a plurality of microlenses placed in the splitting plane, a transparent and/or reflecting plate designed with a plurality of pinholes and placed in the splitting plane, or a transparent plate designed with a plurality of microscopic mirrors and placed in the splitting plane. The movement of the illuminated zone in the splitting plane allows the modification of the illuminated zone in the object by modifying the sub-beams making up the plurality of sub-beams, but without modifying the characteristics of the individual movement of each illuminated point in the object, According to a characteristic of the invention, the means for moving the zone illuminated by the illuminating beam on to the means for splitting this illuminating beam into sub-are also designed so that the illuminated zone in the observed object remains fixed when said at-least-one mirror mounted movably in rotation turns. This makes it possible to conserve a fixed illuminated zone without the loss of intensity related to the use of a diaphragm. The means for moving the illuminated zone in the splitting plane can, for example, comprise an acoustical-optical beam deflection device or a mobile mirror independent of the one used for moving the illuminated points in the object. In this case, the independent mobile mirror or the acoustical-optical device must be synchronized with said at-least-one movably mounted mirror. According to a characteristic of the invention, the means for moving the zone illuminated by the illuminating beam in the splitting plane comprise at-least-one mirror mounted movably in rotation, and the optical system is designed so that the illuminating beam is reflected before reaching the splitting plane by said at-least-one mirror mounted movably in rotation. As the reflection is carried out on said mobile mirror, it is not necessary to perform any synchronization. This solution is, moreover, generally less expensive. However, if the first spatial filtering device is a plurality of pinholes through which the light beam passes in a single direction, this solution calls for the use of several additional splitters, and it is technically preferable to use an independent mobile mirror to move the illuminated zone in the splitting plane. Any synchronization defects in this mirror affect only the edges of the illuminated zone and can be eliminated by means of a diaphragm placed in an image plane through which passes the illuminating beam coming from said mobile mirror and directed to the observed object.

When the mobile mirrors rotate, the movement speed of the illuminating points in the observed plane varies. These speed variations generate localized over-illumination. For example, when the illuminating point moves over a line segment that it traverses alternately in one direction and the other, its speed is cancelled at the two ends of the segment, and the point of the observed object which is illuminated when the illuminating point reaches one end of the segment is thus over-illuminated, as a time average, in relation to neighboring points. If the illuminating point crosses successively several distinct line segments, the same problem exists. In general, any speed variation in the illuminating point generates illumination nonhomogeneities. When said mobile mirror rotates, the position of an illuminating point in the object is the mobile geometrical image of a corresponding fixed point on the first spatial filtering device. When an illuminating point is extinguished (obstructed) by different means, it no longer exists physically, but the movement it would have if it had not been extinguished may be characterized by the movement of the geometrical image of a fixed geometrical point of the spatial filtering device. To solve the problem of localized over-illuminations, one will be led to extinguish, by various means, the illuminating beam when the movement speed of the geometrical image of a fixed geometrical point of the spatial filtering device reaches its minimum value (i.e. when the movement speed of the illuminating points, if they have not yet been extinguished, reaches its minimum value). According to a characteristic of the invention, the scanning device accordingly comprises means for eliminating the illuminating beam, or the plurality of illuminating sub-beams, before it reaches the observed object, when the movement speed of the geometrical image, in the observed object, of a fixed geometrical point of the first image plane, reaches its minimum value.

According to a characteristic of the invention, the means for eliminating the illuminating beam or the plurality of illuminating sub-beams can consist of a shutter allowing the extinguishing of the illuminating beam when the movement speed of the illuminating points is at its minimum. However, the extinguishing of the beam must take place at a very precise moment so that the trajectory of each illuminating point ends at a perfectly defined point, otherwise illuminating nonhomogeneities are also generated. This synchronization is difficult.

According to yet another characteristic of the invention aimed at solving the problem of illuminating nonhomogeneities by limiting the synchronization problems, the means for eliminating the illuminating beam or plurality of illuminating sub-beams consist of a limitation device designed to be reached by the illuminating beam or plurality of illuminating sub-beams, said limitation device having means for eliminating part of the illuminating beam or plurality of illuminating sub-beams not reaching a selection surface, and the limitation device, the optical system, and the movement of the rotatably mounted mobile mirror are designed so that the zone illuminated by the illuminating beam on the limitation device is outside the selection surface when the movement speed of the geometrical image, in the observed object, of a fixed geometrical point of the first image plane, reaches its minimum value. Under these conditions, the illuminating beam is stopped when the movement speed of the illuminating points would normally be at its minimum value, and the over-illumination of the corresponding points of the observed object is prevented. When this solution is applied to a system in which each illuminating point moves along a straight line, it also enables each illuminating point to traverse entirely the observed zone, so that the beginning and end of its trajectory are defined by the limits of the observed zone without precise synchronization being necessary.

The characteristics of the limitation device differ depending on whether or not the scanning device comprises means for moving the illuminated zone on the means for splitting the illuminating beam into a plurality of sub-beams. In general, the limitation device must be placed in a part of the system in which the zone illuminated by the illuminating beam moves. According to another characteristic of the invention, suited in particular to the case in which the scanning device comprises means for moving the illuminated zone on means for splitting the illuminating beam into a plurality of sub-beams, the limitation device is arranged to be reached by the illuminating beam or the plurality of illuminating sub-beams before the illuminating beam or the plurality of illuminating sub-beams is reflected, in the direction of the observed object and coming from means for splitting the illuminating beam into a plurality of sub-beams, by said rotatably mounted mobile mirror. In this case, the limitation device may be placed in a plane conjugate to the observed plane so that the observed part of the observed plane is delimited by sharp contours. It may be replaced in the plane in which are located the means for splitting the illuminating beam into a plurality of sub-beams, which in the case in which microlenses are used is not conjugate to the observed plane, which in this particular case does not degrade the sharpness of the image's edges. The limitation device can, for example, be a diaphragm in which the limitation surface is the aperture of this diaphragm. If the means for splitting the illuminating beam into a plurality of illuminating sub-beams are made up of an absorbing and/or reflecting plate provided with a plurality of pinholes, the limitation device can be made up of a part of this plate which does not have pinholes, thus obviating the introduction of an image plan or an additional diaphragm. If the means for splitting the illuminating beam into a plurality of illuminating sub-beams consist of a transparent plate provided with a plurality of microscopic mirrors, the limitation device can be made up of a part of this plate which does not have microscopic mirrors, thus also obviating the introduction of a diaphragm. If the means for splitting the illuminating beam consist of a plurality of microlenses placed in a splitting plane, the limitation device may be a diaphragm placed in the same plane or in a focusing plane of the sub-beams coming from the microlenses.

According to a characteristic of the invention, suited in particular to the case in which the scanning device does not comprise means for moving the illuminated zone on means for splitting the illuminating beam into a plurality of sub-beams, the limitation device is placed near a plane conjugate to the observed plane and traversed by the illuminating beam after it has been reflected, coming from means for splitting the beam into sub-beams and in the direction of the observed object, by the rotatably mounted mobile mirror. The limitation device can then be a diaphragm and the selection surface is then the aperture of this diaphragm. As previously, in the case in which each illuminating point moves along a straight line, each illuminating point crosses entirely the observed zone. However, this solution may result in a significant loss of luminous intensity.

The scanning device may be considerably simplified when the first spatial filtering system comprises a nonabsorbing plate provided with at least one reflecting microscopic mirror, and the rotatably mounted mobile mirror comprises a reflection face which reflects the illuminating beam directed to the object to be observed, the light beam coming from the object to be observed and directed to the first spatial filtering system, and the beam to be detected coming from the spatial filtering system. This solution limits considerably the number of system components. However, it does not allow the total elimination of interference with stray light.

When a single reflection face of a mirror is used, it is necessary, in order to avoid luminous intensity losses by polarizing devices enabling the splitting of the different beams, to increase the size of the mobile mirror so as to separate spatially some of the beams. Increasing the size of the mirror results in a decrease in its resonance frequency, which may be detrimental to proper scanning. In addition, when the first spatial filtering system works under reflection, the optical system required to use a single face of a mirror is complex. To optimize the resonance frequency of the mobile mirror, and to simplify the optical system, the mobile mirror may be a plane mirror comprising a first reflection face and a second reflection face, the first reflection face being designed to deflect the illuminating beam coming from the light source and the light beam emitted by the illuminated point of the object, and the second reflection face being designed to deflect the beam to be detected sent by the first spatial filtering system and the optical system. This configuration is suited particularly to the use of a first spatial filtering system and comprises an absorbing and/or reflecting plate provided with at least one pinhole traversed in a single direction by the light beam. This solution can prevent stray light problems, and the use of two opposite faces of a mirror obviates the need to re-superpose the filtered beam rid of stray light on the illuminating beam.

Other characteristics and advantages of the invention will appear in the description which follows of several of its embodiments, given by way of nonlimitative examples, in connection with the appended drawings.

SIMPLE SINGLE-POINT EMBODIMENT

This simple embodiment uses single-point laser illumination in which the spatial filtering system is a microscopic mirror, and in which a single face of the mobile mirrors is used. Owing to its simplicity, this embodiment lends itself well to an intuitive understanding of the operating principle.

Figure 4:
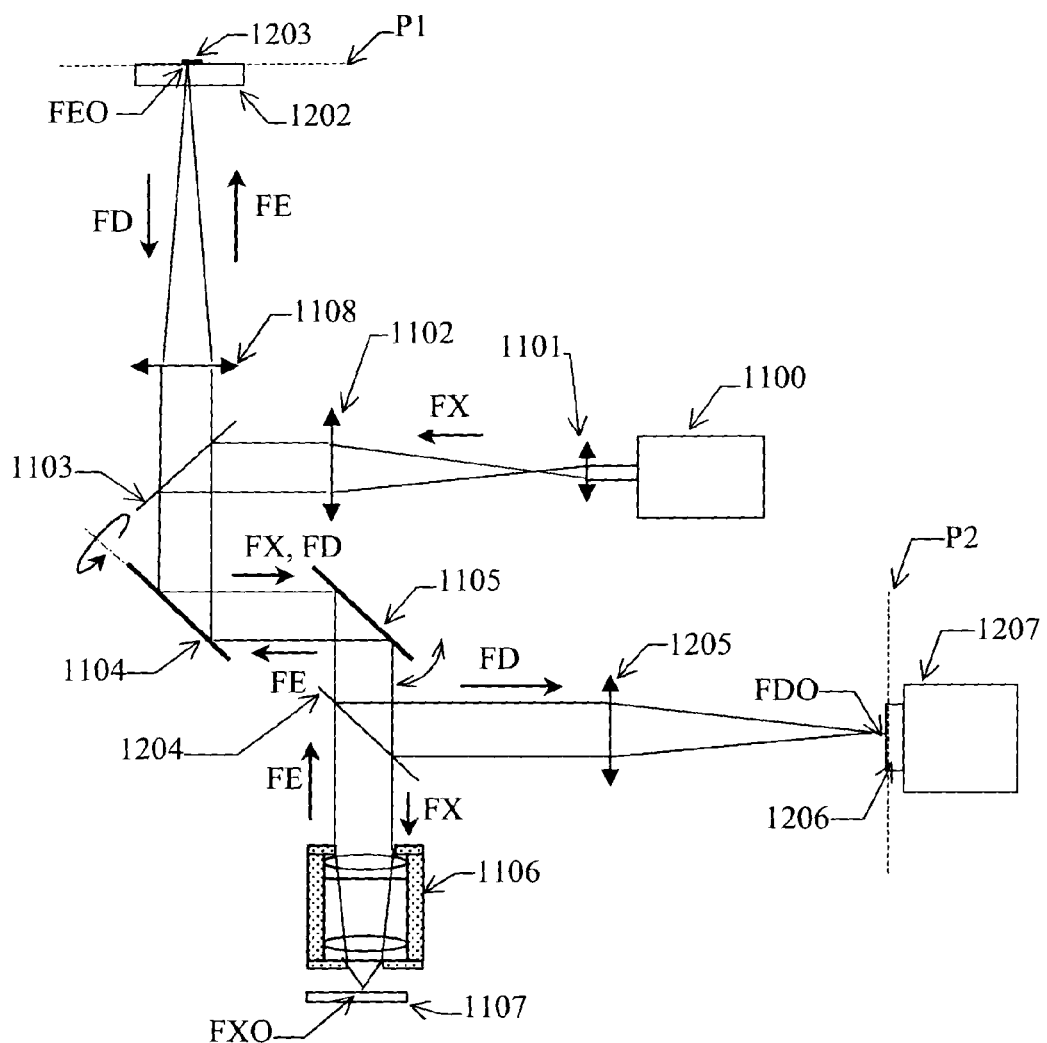
FIG. 4 represents an embodiment using point-by-point scanning and a microscopic mirror. This embodiment, represented in FIG. 4, is the best for an immediate understanding of the operating principle.

FIG. 4 shows a confocal laser scanning fluorescence microscope according to this embodiment of the invention. In the figure is indicated in thin lines a beam passing through a point of the object, and in arrows the directions of the different beams, namely the illuminating beam FX, the light beam FE and the beam to be detected FD.

An illuminating or excitation beam FX coming from a laser 1100 passes through a beam expander or collimator formed by lenses 1101, 1102 then reflected by the dichroic mirror 1103 which reflects the wavelength of the illuminating beam FX of the laser 1100 and allows the passage of the wavelength of the light beam FE retransmitted by fluorescence. The illuminating beam FX is then reflected on the rotatably mobile galvanometric mirror 1104 rotating around an axis located in the plane of the figure and in the plane of the mirror 1104, then on the rotatably mobile galvanometric mirror 1105 rotating around an axis orthogonal to the plane of the figure. It then passes through the polarizing beam splitter 1204 and then the microscope objective 1106. It is focused by the objective at an illumination point FOX which illuminates a point of the object formed by a fluorescent sample 1107. The light beam FE retransmitted by fluorescence from the illuminated point is collected by the objective 1106, passes through the polarizing beam splitter 1204, is reflected successively by the two galvanometric mirrors 1105 and 1104, passes through the dichroic mirror 1103, and is focused by the lens 1108 at a luminous point FEO. This luminous point FEO is located in a first image plane P1 on which is also provided a microscopic mirror 1203 located on the rear face of a quarter-wave plate 1202. The microscopic mirror 1203 comprises, in this embodiment, a first spatial filtering system for filtering the luminous point. The part of the luminous point FEO that passes on the side of the microscopic mirror then reaches an absorbing cavity. The microscopic mirror 1203 can be obtained by optical lithography, for example.

The part of the luminous point FEO or of the beam FE which is reflected by the point 1203 will hereinafter be called the beam to be detected FD. This beam to be detected FD passes again through the quarter-wave plate 1202, the lens 1108, the dichroic mirror 1103, is reflected by the galvanometric mirrors 1104, 1105, is reflected by the polarizing beam splitter 1204, then focused by the lens 1205 at a point to be detected FDO in a second image plane P2 on which is provided a CCD sensor 1206 fixed on a camera 1207.

Laser polarization 1100 is chosen so that the beam FX coming from this laser passes through the beam splitter 1204. The quarter-wave plate 1202 has its neutral axis oriented 45 degrees from the passing axis of the polarizer 1201 and is a quarter wavelength for the light beam FE retransmitted by fluorescence. Its function is to rotate by 90 degrees the polarization direction, so that only the beam to be detected FD reflected by the microscopic mirror is then reflected by the polarizing beam splitter 1204, to the exclusion of the wave coming from spurious reflections on the lens 1108.

Under these conditions, the confocal image of the object is formed directly on the CCD sensor 1206 when the object is scanned by means of galvanometric mirrors. Imperfect control of the galvanometric mirrors may result in the worst case in dark zones on the image, but in no case in a displacement of the illuminated points of the object or any geometrical inaccuracy. The scanning of the object must be carried out during the sensor integration time. The images can then be transferred from the CCD sensor to a sampler or a computer.

The sensor can also be replaced by an eyepiece, possibly a binocular assembly, allowing direct observation of the image formed in the second image plane P2 in which is located the CCD 1206 in the diagram. In this case, scanning must take place sufficiently fast so as not to be perceptible to the eye.

Figure 20:
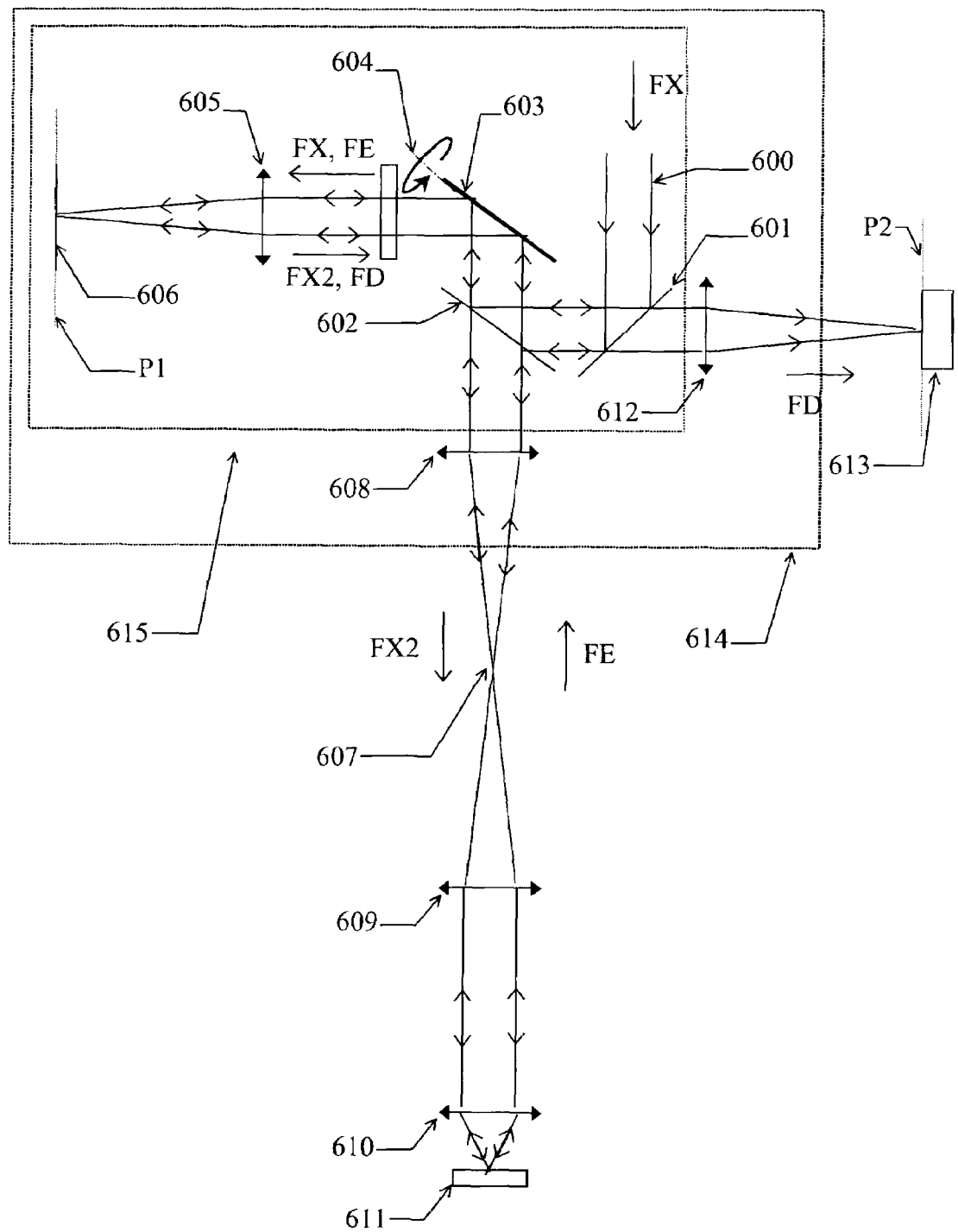
FIG. 20 represents an embodiment using incoherent lighting a microscopic mirror array, and in which the illuminating beam undergoes a first deflection before reaching the microscopic mirror array forming the first spatial filtering system.

This embodiment may be suited to a multibeam system, for example of the type represented in FIG. 20. Its main advantage is that it does not require any precise adjustment except for the matching of the laser's focusing point with the microscopic mirror. Its major drawback is the loss of luminous intensity resulting from the use of semi-transparent or polarizing mirrors to allow the use of a single side of the mirrors for all the optical paths.

Figure 1:
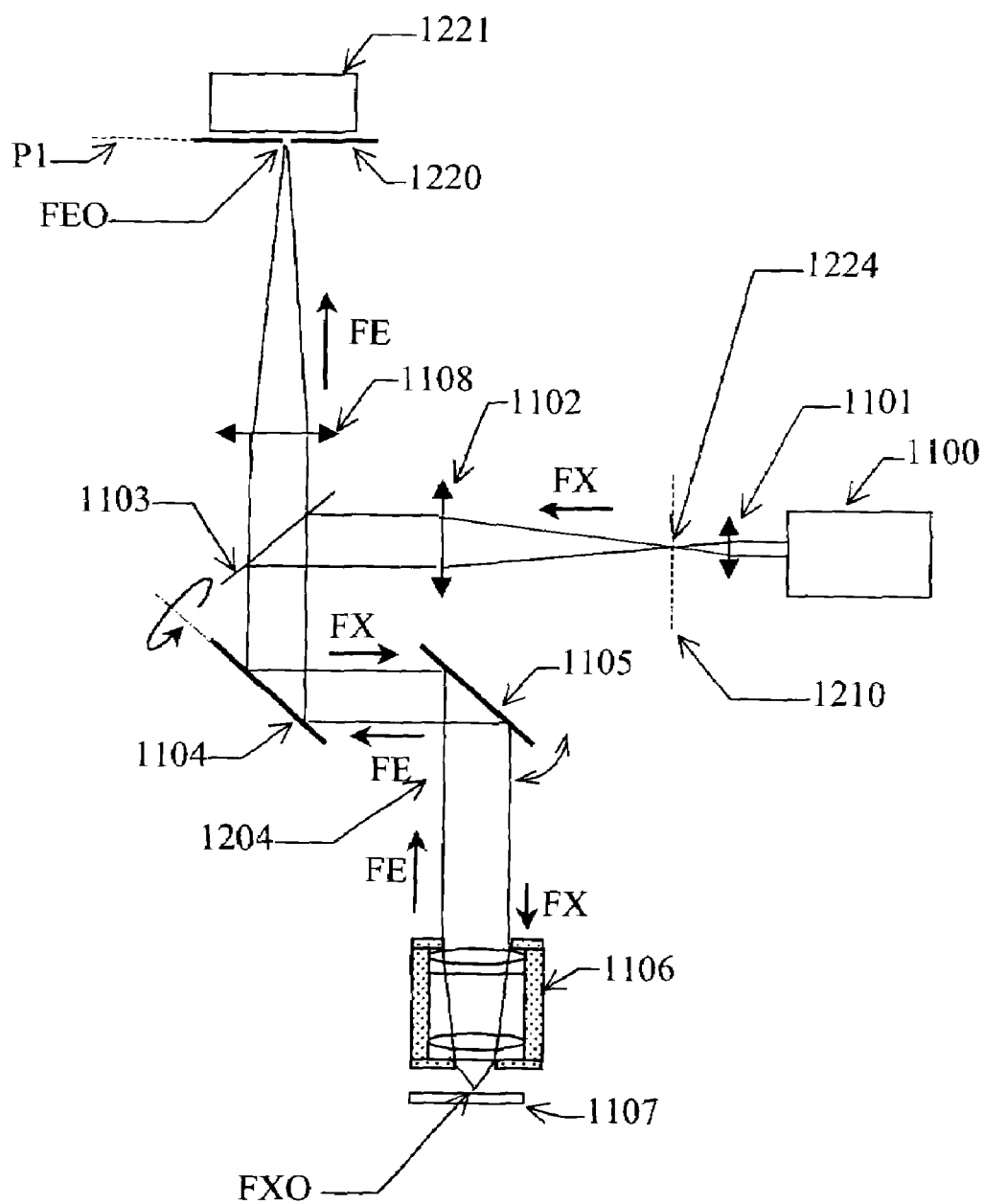
FIGS. 1 and 3 represent prior-art confocal optical scanning devices.
Figure 2:
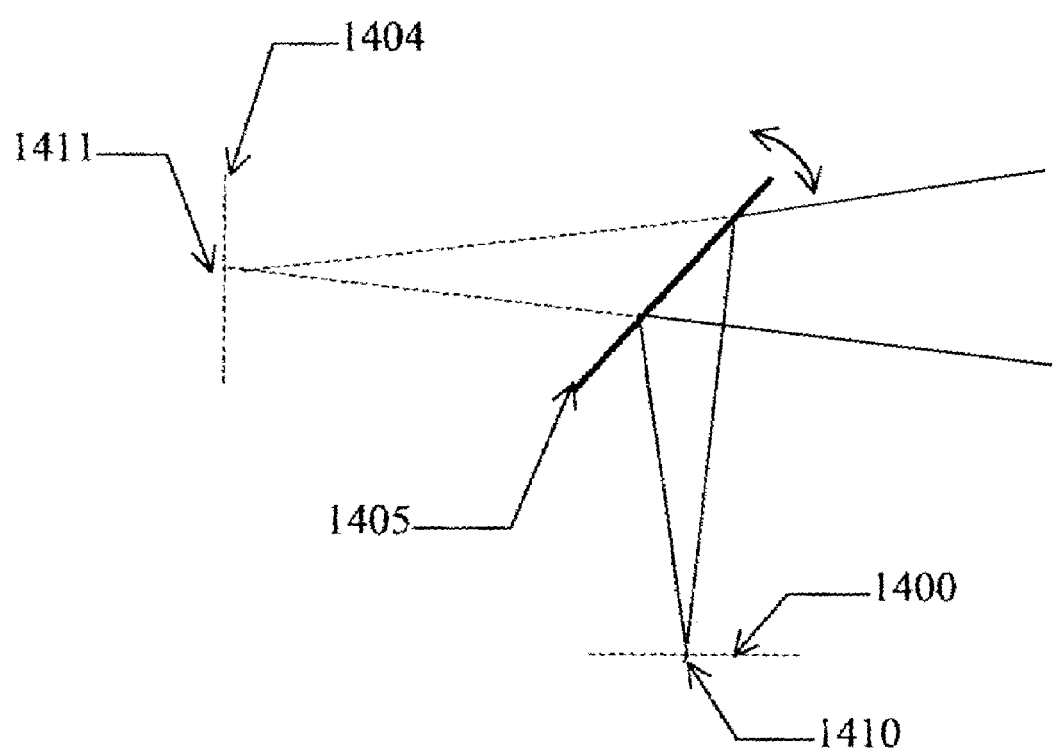
FIG. 2 represents an example of a ray trace coming from a fixed point.
Figure 3:
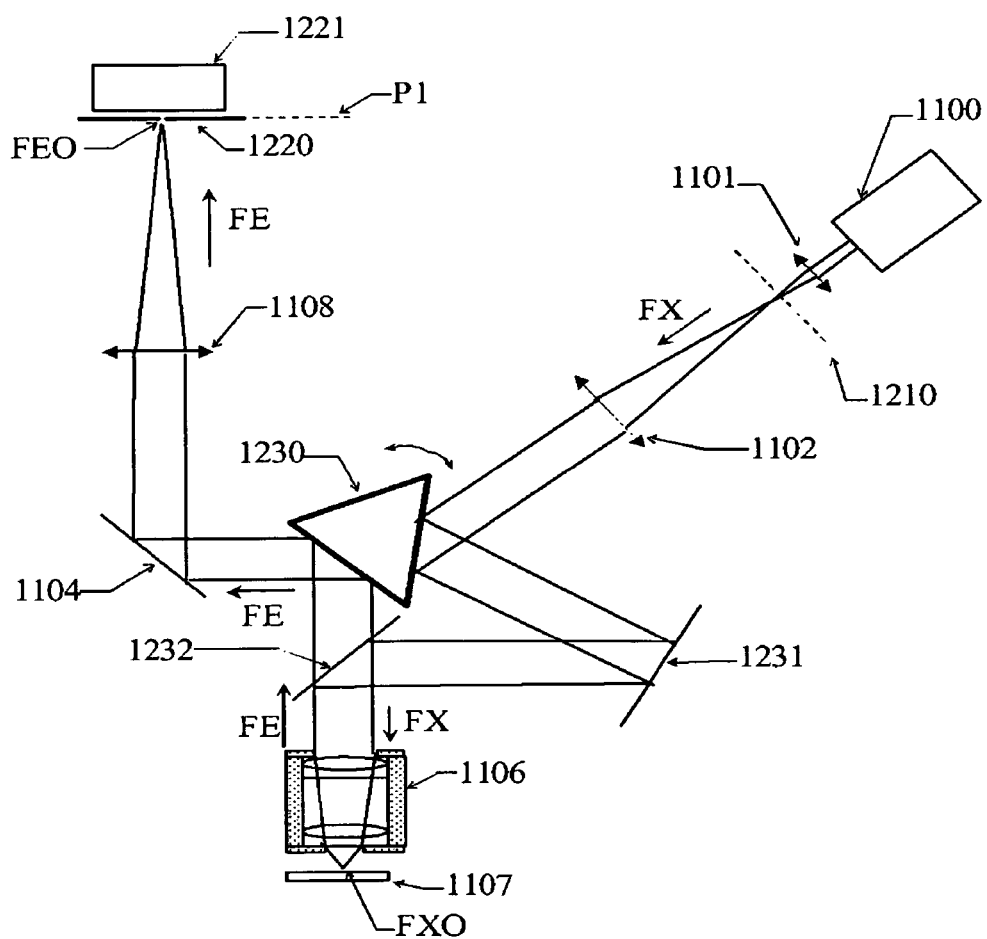

The present embodiment allows particularly easy understanding of the device's operating principle. As in the confocal laser scanning microscope represented in FIG. 1, the movement of the galvanometric mirrors results in the scanning of the object 1107 by the illuminating point FOX resulting from the focusing of the illuminating beam FX in the observed plane of the observed object. The light beam FE emitted by fluorescence then reaches, is fixed and is on the microscopic mirror 1203. In the confocal scanning microscope represented in FIG. 1, this microscopic mirror is replaced by a pinhole behind which the signal is detected by means of a photomultiplier. In the present case, the light bean) FE is reflected by the microscopic mirror 1203, giving the beam to be detected FD. The beam to be detected FD follows exactly the reverse path of the light beam FE and, in the absence of the beam splitter 1204, would come back exactly to the focusing point FOX of the illuminating beam FX in the sample 1107. By introducing the beam splitter 1204, this beam is deviated so that it reaches a point FDO of the CCD 1206 located in the plane P2. This point FDO of the CCD 1206 is reached only when the corresponding point FOX of the sample 1107 is illuminated by the beam FX. Each point of the CCD 1206 thus corresponds to a unique point of the sample 1107 and, when the sample 1107 is scanned by means of galvanometric mirrors, an image of this sample is formed on the CCD 1206. More precisely, in the present case, the geometrical image in the plane P2 of a fixed point of the observed plane of the observed object is fixed.

Figure 21:
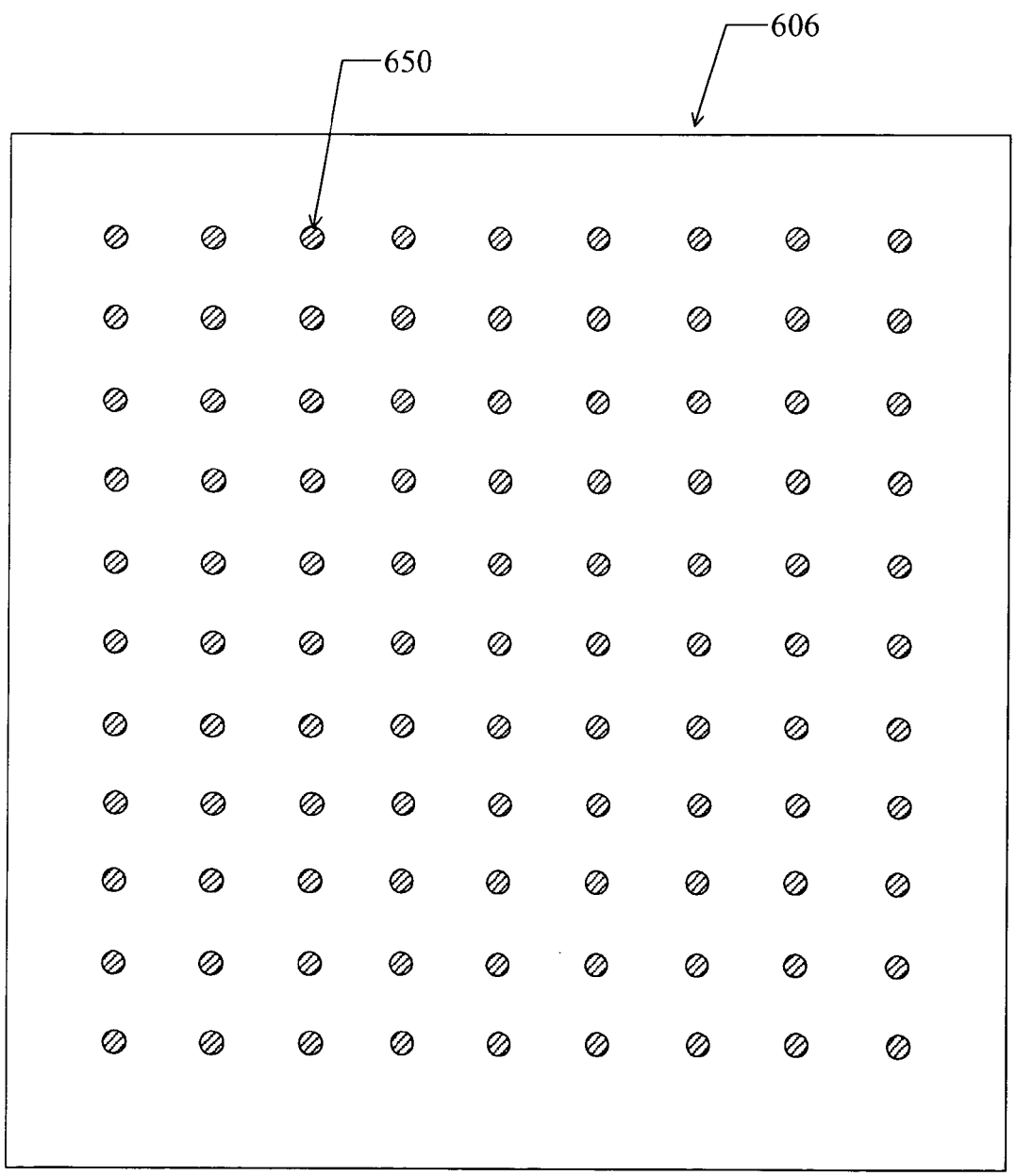
FIG. 21 represents a microscopic mirror array used in the embodiment of FIG. 20.

Single-point Embodiment Using Opposite Faces of Galvanometric Mirrors:

This embodiment is represented in FIG. 21. It is a system using single-point laser illumination, but two faces of the galvanometric mirrors and a pinhole are used. These characteristics prevent most of the spurious reflections.

Figure 5:
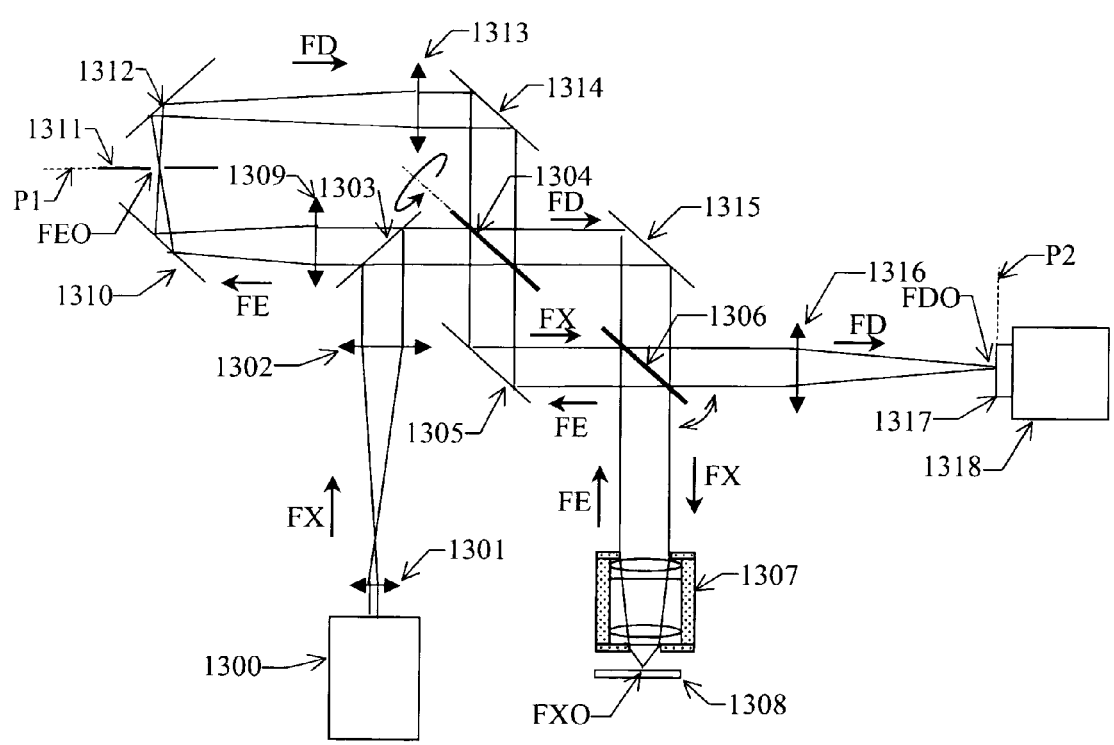
FIG. 5 represents an embodiment using point-by-point scanning and a pinhole.

The illuminating beam FX coming from the laser 1300 passes through the beam expander or collimator made up of lenses 1301, 1302 and is then reflected by the dichroic mirror 1303. It is then reflected by the rotatably mobile galvanometric mirror 1304 rotating around an axis located at the intersection of the plane of the figure and the plane of the mirror 1304, then by the fixed mirror 1305 and by the rotatably mobile galvanometric mirror 1306 rotating around an axis orthogonal to the plane of the figure. It then passes through the objective 1307 forming an image of the sample at infinity, and is focused at an illuminating point FOX which illuminates a point of the observed sample 1308. The light beam FE retransmitted by fluorescence from this point passes through the objective 1307 in the opposite direction, is reflected by the galvanometric mirror 1306, the fixed mirror 1305, and the galvanometric mirror 1304. The light beam then goes through the dichroic mirror 1303, and is focused by the lens 1309 and the fixed mirror 1310 at a luminous point FEO located on the pinhole 1311 placed in an image plane P1. The light beam passes through the pinhole 1311 to obtain a beam to be detected FD which is reflected by the mirror 1312, collimated by the lens 1313, reflected by the mirror 1314, then by the second face of the galvanometric mirror 1304. The beam to be detected is then reflected by the mirror 1315 and then by the second face of the galvanometric mirror 1306. The beam to be detected FD is then focused by the lens 1316 at a point to be detected FDO located on a point of the image plane P2 in which is located the CCD sensor 1317 fixed to the camera 1318. As previously, the CCD sensor can be replaced by an eyepiece allowing direct observation of the plane P2. In this embodiment, represented in FIG. 5, the pinhole 1311 forms the first spatial filtering system of the luminous point coming from the focusing of the light beam.

The overall operating principle is the same as in the previous description, namely that the galvanometric mirrors are used to scan the object along two dimensions and the image forming on the plane P2 is recorded by the CCD 1317.

Each point of the CCD 1317 corresponds, as in the embodiment of FIG. 4, to a unique point of the sample 1308 and, when the sample 1308 is scanned by means of the galvanometric mirrors, an image of this sample is formed on the CCD 1317. On the other hand, in the present case, the geometrical image in the plane P2, of a fixed point of the observed plane of the observed object, is not fixed. This has no troublesome consequences to the extent that a single illuminating point scans the object.

Multipoint Laser Embodiment

Figure 6:
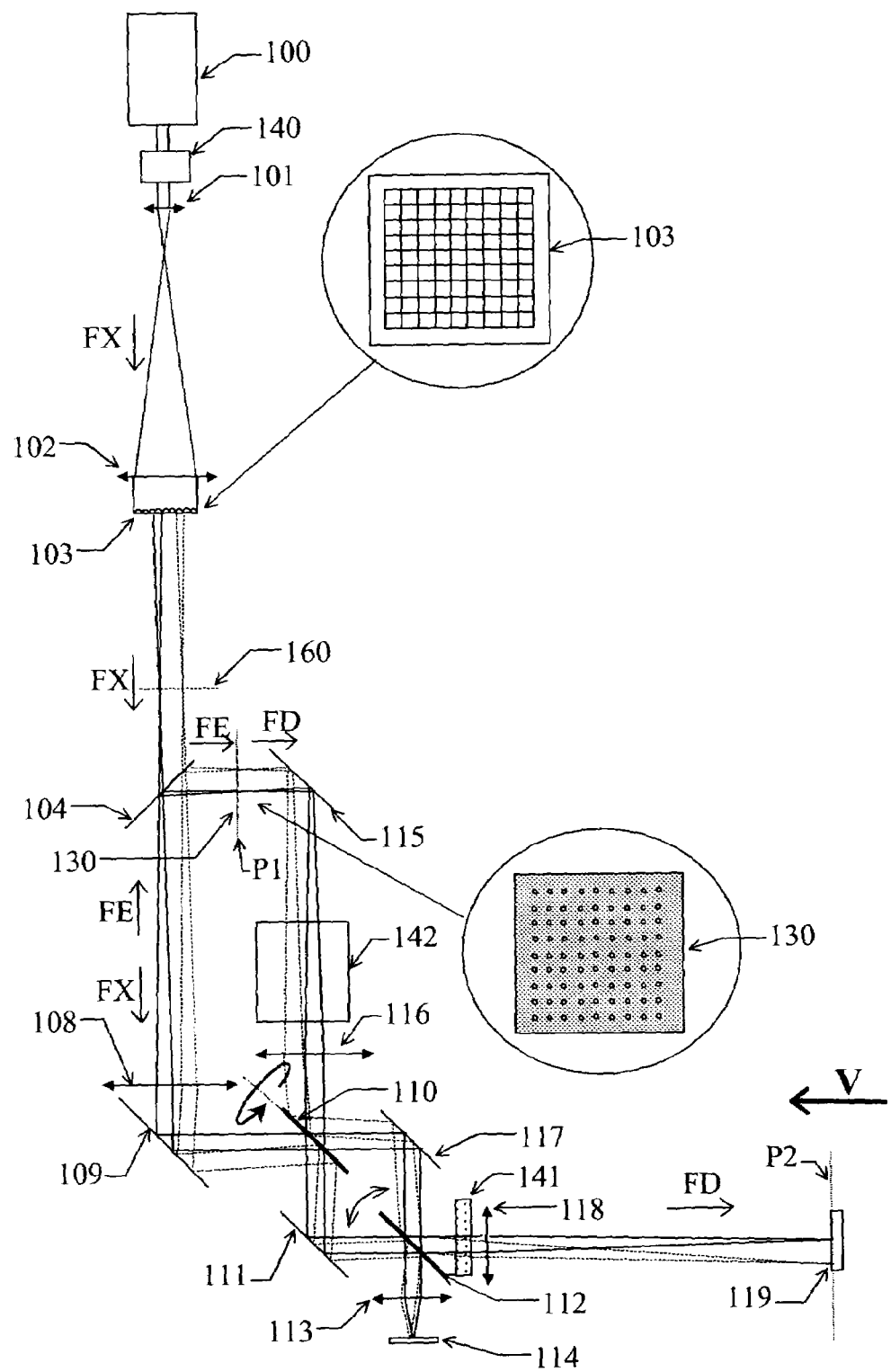
FIG. 6 represents an embodiment using multipoint laser illumination and a pinhole array.

This embodiment is represented in FIG. 6. It constitutes an efficient embodiment in terms of image quality and speed. Indeed:

Use of multipoint laser illumination makes it possible, in particular on zones of small dimensions, to use an intense illumination without saturating the sample;

Use of a pinhole array, which filters the beam and limits difficulties related to possible spurious reflections.

The illuminating beam FX coming from a 100 passes through a beam attenuator 140 which may be, for example, electro-optical or acoustico-optical. It then passes through a beam expander comprising, for example, the lenses 101 and 102. The illuminating beam FX then passes through means for splitting said illuminating beam FX into a plurality of illuminating sub-beams. This splitting means consist of a microlens array 103.

Solid lines have been used to represent the sub-beam coming from one of these microlenses and dotted lines for the sub-beam coming from another microlens. Directional arrows indicate the illuminating or excitation beam FX and the light beam retransmitted by the fluorescent object FE.

The plurality of illuminating sub-beams coming from the microlens array 103 then passes through the dichroic mirror 104 and the tube lens 108 and is then reflected by a mirror 109. These illuminating sub-beams are then reflected by a rotatably mobile galvanometric mirror 110 rotating around an axis located in the intersection of the plane of the figure and the plane of the mirror 110, by a mirror 111, and by a rotatably mobile galvanometric mirror 112 rotating around an axis orthogonal to the plane of the figure. They pass through the microscope objective 113 and reach the observed object 114. The objective 113 is an objective forming an image of the observed sample at infinity. The focusing point of each illuminating sub-beam coming from the microlens array 103 is located in an observed plane of the observed object 114.

Preferably, the image focal plane of the objective 113 is in the object focal plane (in the objective-to-lens (108) direction) of the lens 108 and the array of holes 160 is in the focal plane of the lens 108. This makes it possible to maximize the useful aperture of each sub-beam.

Figure 7:
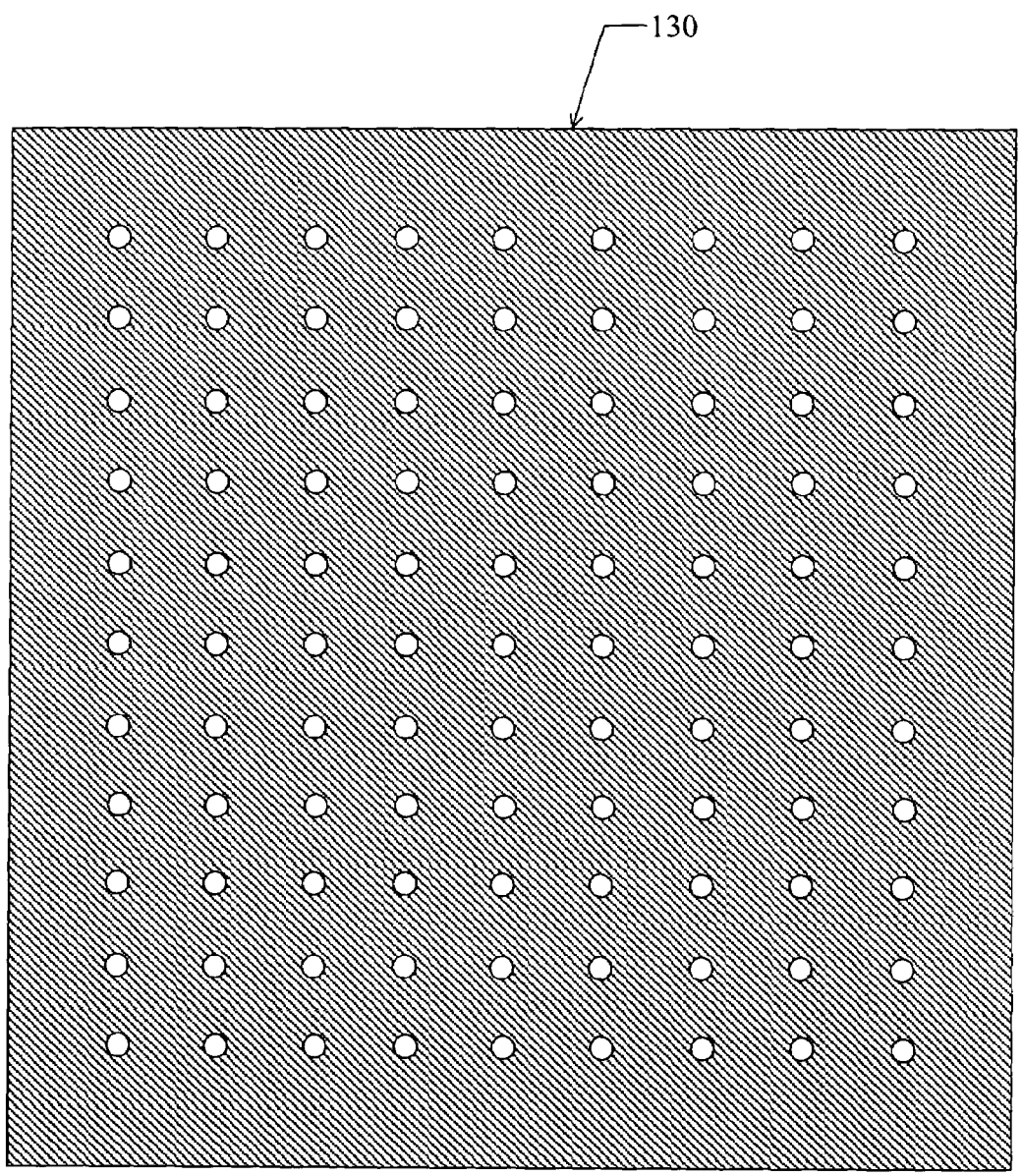
FIG. 7 represents a pinhole array used in various embodiments.
Figure 8:
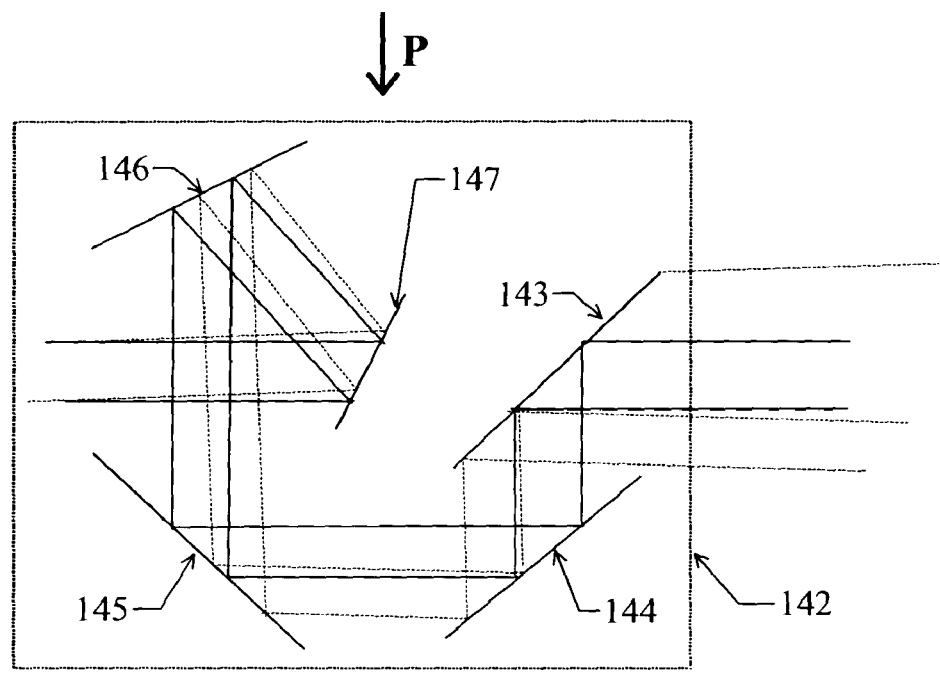
FIG. 8 represents a side view of a set of mirrors also represented in FIG. 6.

The illuminated object or more precisely the plurality of illuminated points of the object send back a plurality of noncoherent light sub-beams. These light sub-beams pass through the objective 113, are reflected by the galvanometric mirror 112, the mirror 111, the galvanometric mirror 110 and the mirror 109. They pass through the tube lens 108, are reflected by the dichroic mirror 104, and then pass through the pinhole array 130 located in the first image plane P1 and forming the first spatial filtering system. The pinhole array 130 is, for example, of the type represented schematically in FIG. 7. This array 130 may be obtained by depositing a reflecting layer on a transparent glass using the "lithographic" method, the holes then being interruptions of the reflecting layer. In this case, a neutral filter placed at the output of the laser can be used to attenuate laser light return effects. The pinhole array can also be made up of a ground metallic plate in which the holes are pierced by means of a laser. This solution overcomes laser beam return problems. The pitch (distance between adjacent pinhole centers) of the pinhole array 130 is the same as the microlens array pitch 103 (distance between two adjacent microlens centers). The arrays 103 and 130 are positioned so that each hole of the array 130 is the image of a point of the object on which is focused one of the illuminating sub-beams coming from a microlens of the array 103. This implies that the array 130 is in a focal plane of the tube lens 108, and that the focusing plane 160 of the illuminating sub-beams coming from the microlens array 103 is also in a focal plane of the tube lens 108. The light sub-beams FE pass through the array 130 to obtain sub-beams to be detected FD which are then reflected by the mirror 115. The sub-beams to be detected FD are then reflected successively by the mirrors 143, 144, 145, 146, 147 constituting the assembly 142 represented by a block in FIG. 6, which are shown in FIG. 8 in a view along the direction V indicated in FIG. 6. The assembly 142 is used to invert the angle of the sub-beams to be detected in relation to a plane containing the optical axis and located in the plane of FIG. 6. The direction P indicated in FIG. 8 shows the observation direction on which FIG. 6 is based. The sub-beams to be detected then pass through the lens 116 identical to the tube lens 108, and whose object focal plane is on the pinhole array 130. They are reflected by the second face of the galvanometric mirror 110, by the mirror 117, and by the second face of the galvanometric mirror 112. They pass through the monochromatic filter 141. They then pass through the lens 118 which forms, in its image focal plane, the image of the array 130, and hence of the observed sample.

They reach the image focal plane of the lens 118, which forms the second image plane P2, in a plurality of points to be detected. A CCD sensor 119 can be placed in this plane, which corresponds to the second image plane P2; however, it is also possible to observe directly the image formed in this plane by means of an eyepiece. The focal length of the lens 116 must be equal exactly to the focal length of the lens 108, and to allow precise adjustment, the lenses 116 and 108 may be replaced by lens doublets, the adjustment of the interlens distance of a doublet allowing an adjustment of the focal length of the doublet.

The inversion of the angle of the sub-beams to be detected, which is performed by the set of mirrors 142, enables the geometrical image in the plane P2 of a fixed geometrical point of the observed object, to be a fixed geometrical point. As an array of illuminating points is used, this condition is indispensable for the formation of a good-quality image.

Figure 9:
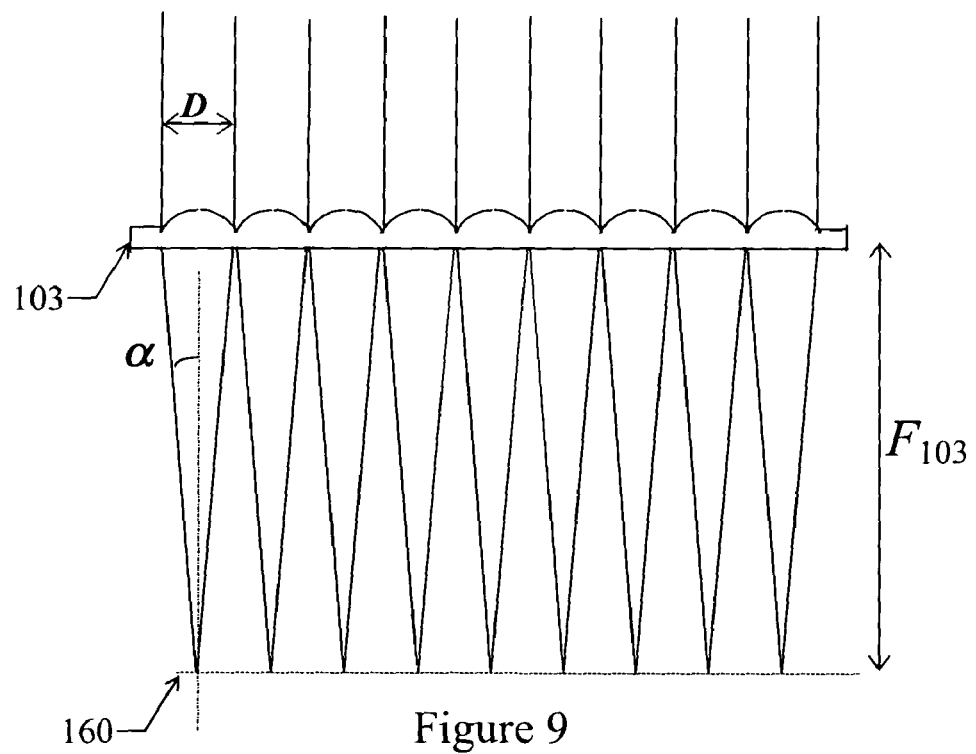
FIG. 9 represents a lens array used to illuminate the sample.

FIG. 9 shows the principle of laser beam focusing by the microlens array 103. The value of the angle α indicated in this figure is preferably $$\alpha = ouv \frac{F_{113}}{F_{108}}.$$

The width of the Airy disk produced in the plane 160 is then $$L_{160} = 1.22 \frac{\lambda_{las}}{ouv} \frac{F_{108}}{F_{113}}$$

where $F_{108}$ is the focal length of the lens 108, $F_{113}$ is the focal length of the objective 113, ouv is the numerical aperture of the objective 113, $\lambda_{las}$ is the wavelength of the laser. The distance D between two adjacent microlenses is preferably at least 10 times the width of each hole. The microlenses of the array 103 are spherical microlenses limited by squares and adjacent to each other. The width of each microlens (side of square limiting it or distance between centers of two adjacent microlenses) is equal to the distance D between two adjacent pinholes of the array 130, and the diameter $L_{130}$ of a pinhole is equal, for example, to the width of the Airy disk produced in the plane 160, or to half this width. The focal length $F_{103}$ of each microlens of the microlens array 103 and its width D are moreover related by the relationship $$\frac{D}{2F_{103}} = \alpha = ouv \frac{F_{113}}{F_{108}},$$

so that $$F_{103} = \frac{D}{2} \frac{F_{108}}{F_{113}} \frac{1}{ouv}.$$

For example we may have:
$F_{113}$=2 mm
ouv=1.25
$F_{108}$=200 mm
D=2 mm
$\lambda_{las}$=488 nm (argon laser)
$F_{103}$=80 mm
$L_{130}$=23 µm For maximum resolution, with pinholes having a diameter sufficiently smaller than the Airy disk, and to enable optimum subsequent deconvolution of the confocal image, the sampling pitch $P_{119}$ on the CCD sensor (distance between centers of two adjacent pixels) must agree with:

$$P_{119} = \frac{1}{4ouv} \frac{F_{118}}{F_{113}} \frac{\lambda_{las}\lambda_{fluo}}{\lambda_{las}+\lambda_{fluo}}$$

so that $F_{118} = 4ouvP_{119}F_{113}\frac{\lambda_{las}+\lambda_{fluo}}{\lambda_{las}\lambda_{fluo}}$ For example, with $P_{119}$=12 µm and still in the same dimensioning example, we obtain:
$F_{118}$=477 mm For maximum resolution but without subsequent deconvolution of the confocal image, it is possible to accept:

$$F_{118} = \frac{4}{2\sqrt{2}} ouv P_{119} F_{113} \frac{\lambda_{las}+\lambda_{fluo}}{\lambda_{las}\lambda_{fluo}} \text{ so that } F_{118} = 168 \text{ mm}$$

With pinholes whose diameter is an Airy disk, the following may be acceptable:

$$F_{118} = \frac{4}{2\sqrt{2}} ouv P_{119} F_{113} \frac{\lambda_{las}+\lambda_{fluo}}{\lambda_{las}\lambda_{fluo}}$$

It is thus useful to be able to modify the focal length of the lens 118, or replace it with a zoom-type system or with a variable magnification system using interchangeable optical elements.

Figure 10:
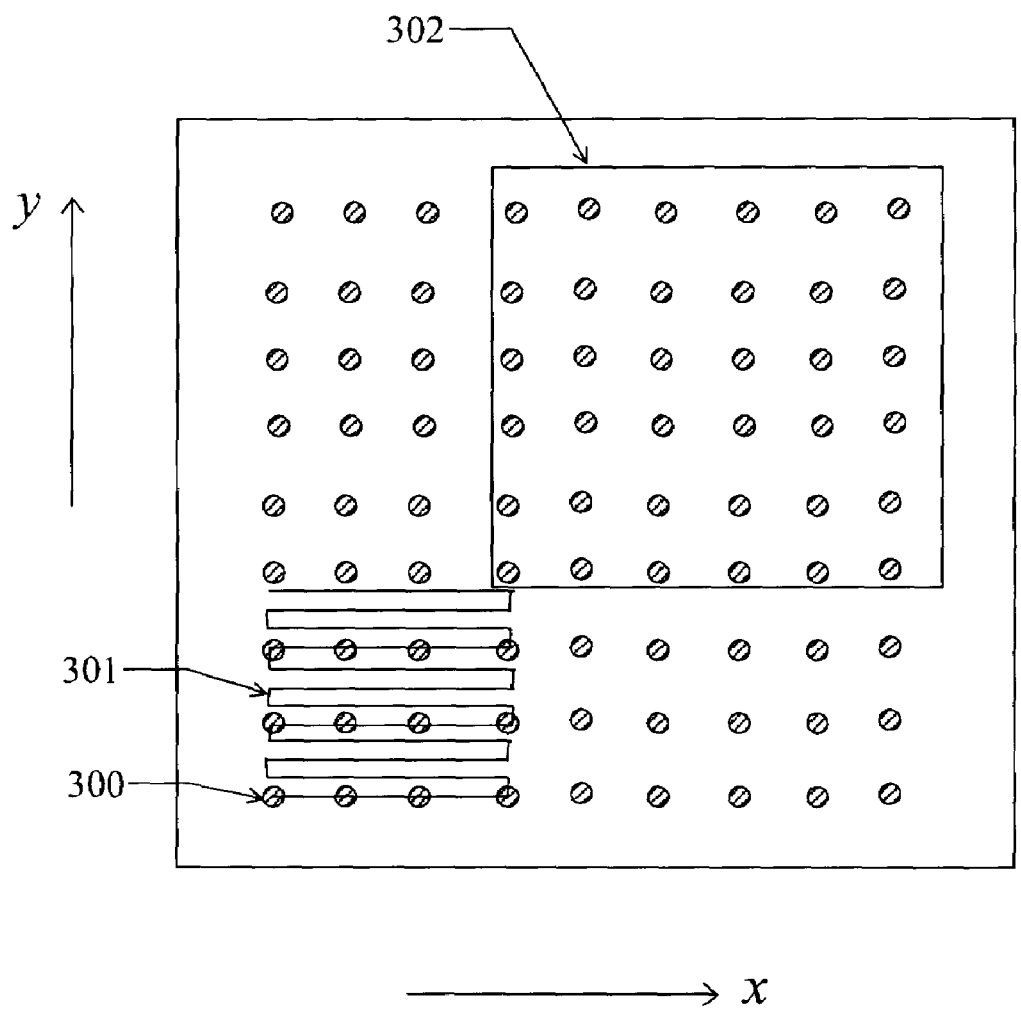
FIG. 10 represents a set of illuminated points in the observed object, and the trajectory of these points.

The galvanometric mirrors 110 and 112 are controlled so as to move the illuminated points in the observed object 114, as shown in FIG. 10. FIG. 10 shows, shaded, all the points illuminated by the excitation sub-beams FX in the observed plane of the object, for a reference position of the galvanometric mirrors. The diameter of the points represents the approximate diameter of the corresponding diffraction disks. The line 301 superposed on the drawing shows the path followed by an illuminated point 300 when the galvanometric mirrors are operated. This path is run alternately in both directions. When this path is followed, each illuminated point scans a small part of the image plane, and all the illuminated points scan the entire image plane. A confocal image of the entire observed plane of the object 114 is thus generated on the sensor 119. The contour 302 shows the limit of the useful zone, from which a good-quality confocal image is generated on the sensor. Many variants in the path covered may be used, the essential requirement being that the entire useful zone should be scanned, two distinct parts of the useful zone generally being scanned by distinct illuminated points.

The beam attenuator 140 must be controlled according to the position of the galvanometric mirrors and their speed. These parameters may be obtained in a known manner by feedback from galvanometers, or may be obtained without feedback through a galvanometer control system with a lower accuracy. Ilas is used to denote the intensity of the laser beam after passing through the attenuator 140, and Vscan the scanning speed, i.e. the movement speed in the observed plane and along the x axis of an illuminated point in the observed object. This scanning speed is due only to the fastest galvanometric mirror. The position of the galvanometric mirrors may be characterized by the position of the illuminated point in the object 114.

Figure 11:
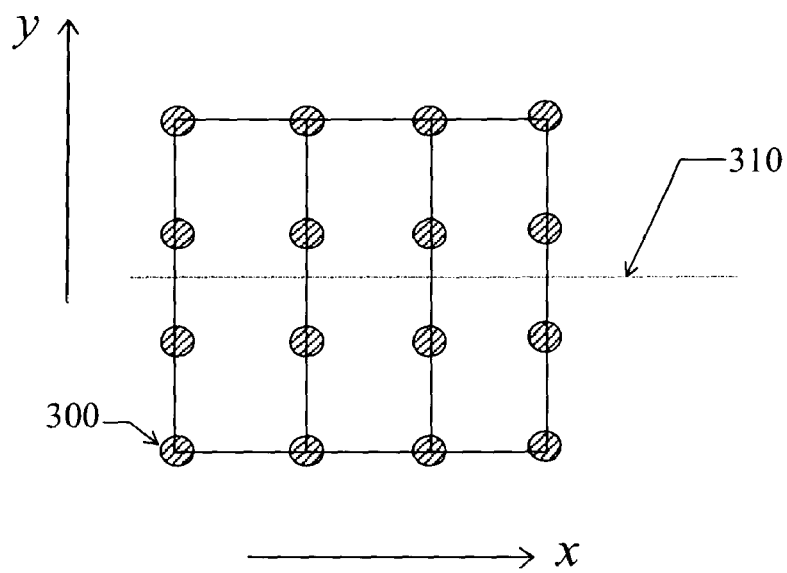
FIGS. 11 to 13 illustrate the command applied to a beam attenuator according to the position and movement speed of the image of a pinhole on a camera.
Figure 12:
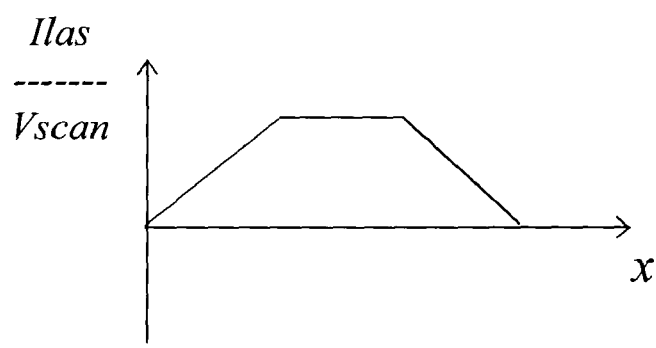
Figure 13:
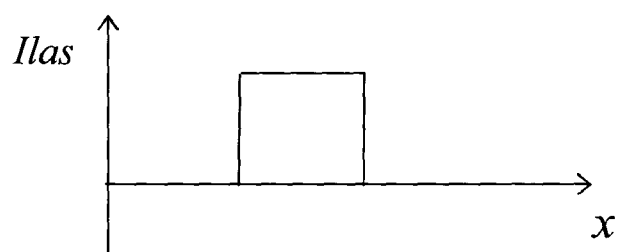

Figures and et 12 illustrate the value of ratio $$\frac{Ilas}{Vscan}$$

as a function of the position of the illuminated point in the sample 114. FIG. 11 represents a set of illuminated points, including the point 300 also shown in FIG. 10, for the reference position of the galvanometric mirrors. In this figure is represented in unbroken lines the edges of the surface representing the function $$\frac{Ilas}{Vscan}$$

as a function of the coordinates x,y of the point 300 in the observed plane. In FIG. 12 is represented the shape of this function along the line 310 of FIG. 11. A constant value of $$\frac{Ilas}{Vscan}$$

over the entire trajectory, i.e. a control of the attenuator as a function of only the scanning speed, would make it possible in principle to eliminate illumination variations due to variations in the scanning speed. However, the curve of FIG. 12 also allows the attenuation of the effects of an uncontrolled variation in the oscillation amplitude of the mirrors, however to the detriment of luminous intensity. It is also possible to have the beam attenuator operate in binary mode. Intensity control then takes place for example in accordance with FIG. 13. Only the central part of the trajectory on which the speed is roughly constant is used. Finally, it is also possible not to use any beam attenuator. The image remains of acceptable quality but may be affected by local intensity variations, which may be compensated by subsequent digital processing. In general, the higher the number of pinholes the greater the surface area of an illuminated point, and the smaller the illumination intensity variations. A sufficiently dense pinhole array can thus partially replace a beam attenuator.

To each utilizable objective 113, characterized by its aperture, its magnification and the position of its image focal plane, there corresponds an optimum dimensioning of the pinholes used, of the microlenses and of the lens 108. These elements can be designed so that they suit all the objectives, but the properties of the system will be sub-optimal with certain objectives. It is also possible to consider a series of objectives designed to give the best results with a given dimensioning of the rest of the system. However, it is preferable to be able to change the pinholes used and the microlenses so as to be able to optimize them according to the objectives used, the excitation and fluorescence wavelengths, the fluorescence level, the desired acquisition speed, and the desired resolution. Accordingly, the microlens array 103, the pinhole array 130 and the dichroic mirror 104 can be made integral with each other and form an exchangeable unit in a single piece. This avoids the user having to adjust the alignment of the different elements: alignment problems are settled when the unit is manufactured. The positioning of the unit in the rest of the system requires only a sufficient angular accuracy (of the order of 1 milliradian).

The present embodiment may be combined with all known imaging modes in confocal microscopy. In particular, the microscope stage may be equipped with a piezoelectric or step-motor type vertical movement system so as to be able to generate three-dimensional images by modifying the focusing plane. Systems based on acoustico-optical attenuators may be used to switch several lasers and excite different fluorophores, so as to generate, by superposition, images with a richer information content. The system is also compatible with the use of the two-photon method, the number of pinholes then needing to be adjusted so that a sufficient intensity remains available on each focusing point of the beam. Filter wheels (filter 141) can be used to modify detected wavelengths. The dichroic mirror 104 can be replaced by a semi-transparent mirror to enable the changing of excitation wavelengths and fluorescence by switching a laser and changing the filter 141, without having to exchange the dichroic mirror 104. Replacement of the dichroic mirror 104 by a semi-transparent mirror also allows the device to be used to observe nonfluorescent diffractive samples in reflection.

It is possible, by means of relay lenses, to modify the device so that the entire scanning system is placed at the back of an intermediate image plane. Such a solution can be useful in designing a scanning system adaptable to any type of microscope.

It is of course possible to use only one pinhole, in which case the speed characteristics are those of a confocal scanning microscope of current design with galvanometric mirrors. However, the advantage of the system is the possibility of displaying the image directly and recording on a camera.

It may also be useful to equip the system with a device for positioning the sample 114 in the direction of the optical axis. This in fact makes it possible to obtain three-dimensional images made up of series of two-dimensional images each obtained at a different depth. The three-dimensional image obtained can then undergo three-dimensional deconvolution which improves its resolution. Prior to deconvolution, the point spread function (PSF), or three-dimensional impulse response, must be measured, for example on a fluorescent microbead.

Laser Multipoint Embodiment with Compensation of Certain Defects.

Figure 14:
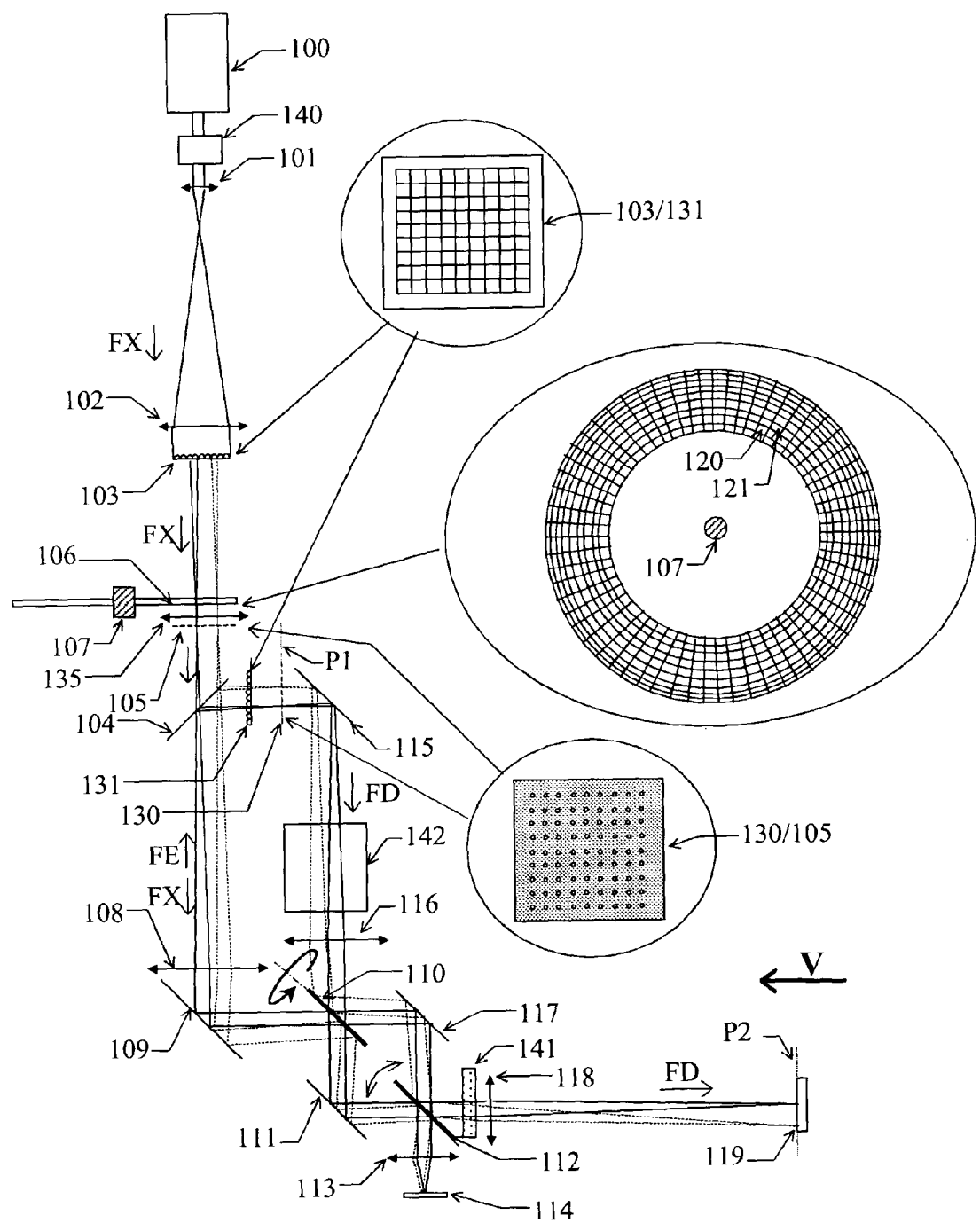
FIG. 14 represents an embodiment of the confocal optical scanning device in accordance with the invention and in which use is made of multipoint laser illumination and a pinhole array.

FIG. 14 illustrates an embodiment derived from the preceding one but improved by several additional devices.

The plurality of illuminating sub-beams coming from the microlens array 103 passes through a rotatably mobile glass 106 rotating around an axis 107, then an optional lens 135, then a second spatial filtering system made up of a pinhole array 105, and only then reaches the dichroic mirror 104.

The surface of the glass 106 is divided into a set of sub-surfaces, for example the sub-surfaces 120 and 121. Half of these sub-surfaces have an extra thickness generating a phase shift of 180 degrees in the illuminating sub-beams passing through them. The sub-surfaces having extra thicknesses are distributed in a pseudo-random manner in all the sub-surfaces. Each sub-surface is approximately square. The width of the side of the square is equal to the distance between two adjacent pinholes in the array 105. The glass 106 is positioned so that each pinhole of the array 105 is placed under a difference sub-surface. The fast rotation of the glass 106 allows the generation of pseudo-random phase shifts in all the illuminating sub-beams, so that the spatial coherence of the sub-beams is broken after passing through the glass 106. In fact, the coherence between beams is capable of disturbing the image slightly.

A practical difficulty has to do with the fact that objectives with different magnifications have distinct image focal planes. Consequently, the object focal plane of the lens 108 (in the direction from the objective to the lens 108) can be the same as the image focal plane of the objective only for one of the objectives used. This difficulty may be thereby decreasing the available luminous intensity. The lens 135 enables this difficulty to be overcome without any loss in luminous intensity. It must be dimensioned so that a plane wave in the object has as its image a plane wave between the lens 135 and the microlens array 103. Changing an objective then requires the changing of the lens 135.

The pinhole array 105 forming the second spatial filtering system is designed to filter the laser sub-beams coming from the microlenses of the array 103. This makes it possible to overcome any imperfections in these microlenses. Each pinhole of the array 105 is placed at the point of focus of a corresponding microlens and its diameter may, for example, be an Airy disk or an Airy half-disk, depending on whether one wishes to optimize resolution or brightness.

The microlens array 131 placed before the first spatial filtering system made up of the pinhole array 130 is especially useful when the excitation wavelength is much smaller than the fluorescent emission wavelength and when the diameter of the pinholes is of the order of an Airy disk. It then allows a slight improvement in resolution without sacrificing brightness.

Figure 15:
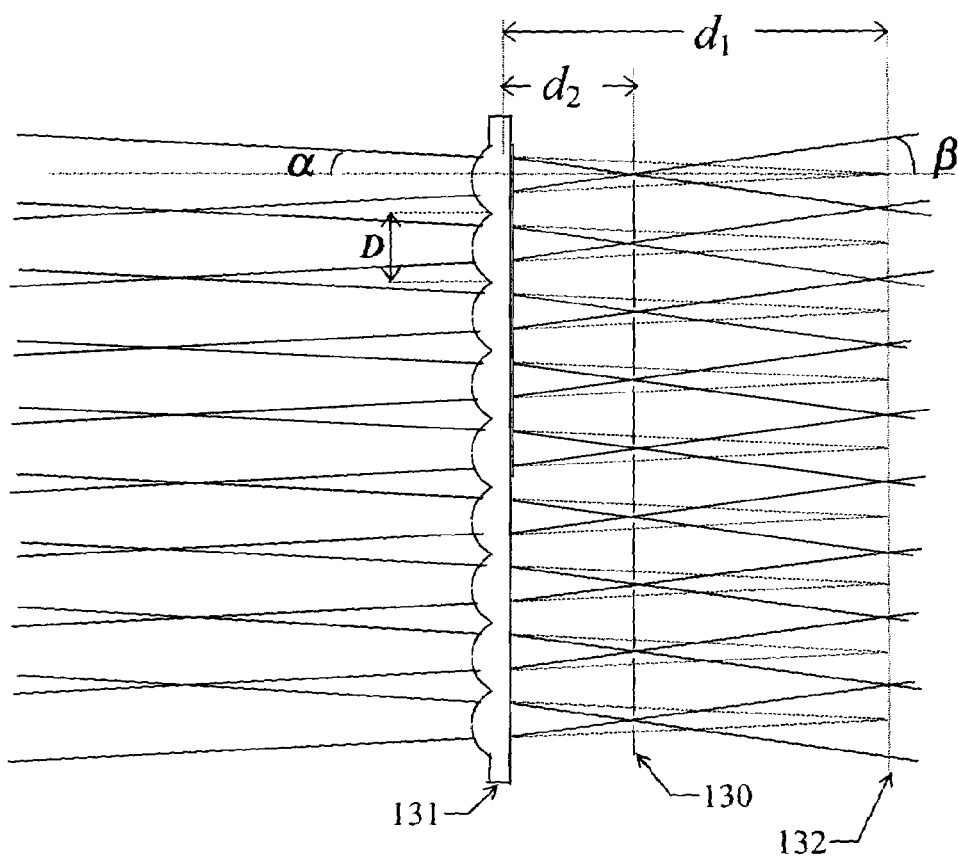
FIG. 15 represents a lens array and a pinhole array capable of being used to filer the light beam coming from the object.

FIG. 15 shows the operating principle of the microlenses of the array 131 and the pinholes of the array 130. As indicated in this figure, and in FIG. 9, the angle $$\alpha = ouv \frac{F_{113}}{F_{108}}.$$

The focal plane 132 of the lens 108 has been represented. In the absence of the microlens array 131, the pinhole array 130 must be placed in this plane, and the divergence angle of the beam after passing through the pinholes, to the extent that these holes are sufficiently large, would be α. What makes the lens array 131 useful is that it increases this divergence angle, which is equivalent to reducing the diameter of the Airy disk formed on each hole of the pinhole array 130. This makes it possible to reduce the diameter of the pinholes of the array 130 without any loss in luminous intensity, thus subsequently allowing reception on a CCD sensor without the resolution being decreased by the superposition of the Airy disks, obtained for close points. The divergence angle of the beam after passing through the pinholes becomes, because of the microlenses of the array 131, β=mα with, typically, m=1.5 to m=4. The distances $d_2$ between the microlens array 131 and the pinhole array 130, $d_1$ between the microlens array 131 and the focal plane 132 of the lens 108, and the focal length $F_{131}$ of the microlenses of the array 131, are linked by the thin lens equation (which may be modified if necessary to take into account the thickness of the lenses):

$$\frac{1}{d_2} - \frac{1}{d_1} = \frac{1}{F_{131}}$$

and we moreover have, given the desired coefficient m:

$$\frac{d_1}{d_2} = m$$

Furthermore, for reasons of overall dimensions, we have: $D=2d_1c\alpha$ where $c \geq 1$. Typically it is possible to take c=2.

Given also the expression of the angle $$\alpha = ouv \frac{F_{113}}{F_{108}},$$

we finally obtain:

$$d_1 = \frac{D}{2c} \frac{F_{108}}{F_{113}} \frac{1}{ouv}$$

$$F_{131} = \frac{1}{m-1} d_1$$

$$d_2 = \frac{1}{m} d_1$$

The width of the pinholes on the array 130 can be equal to the diameter of the Airy disk on these holes, that is:

$$L_{130} = 1,22 \frac{1}{m} \frac{\lambda_{fluo}}{ouv} \frac{F_{108}}{F_{113}}$$

where $\lambda_{fluo}$ is the wavelength corresponding to maximum fluorescent emission.

Figure 16:
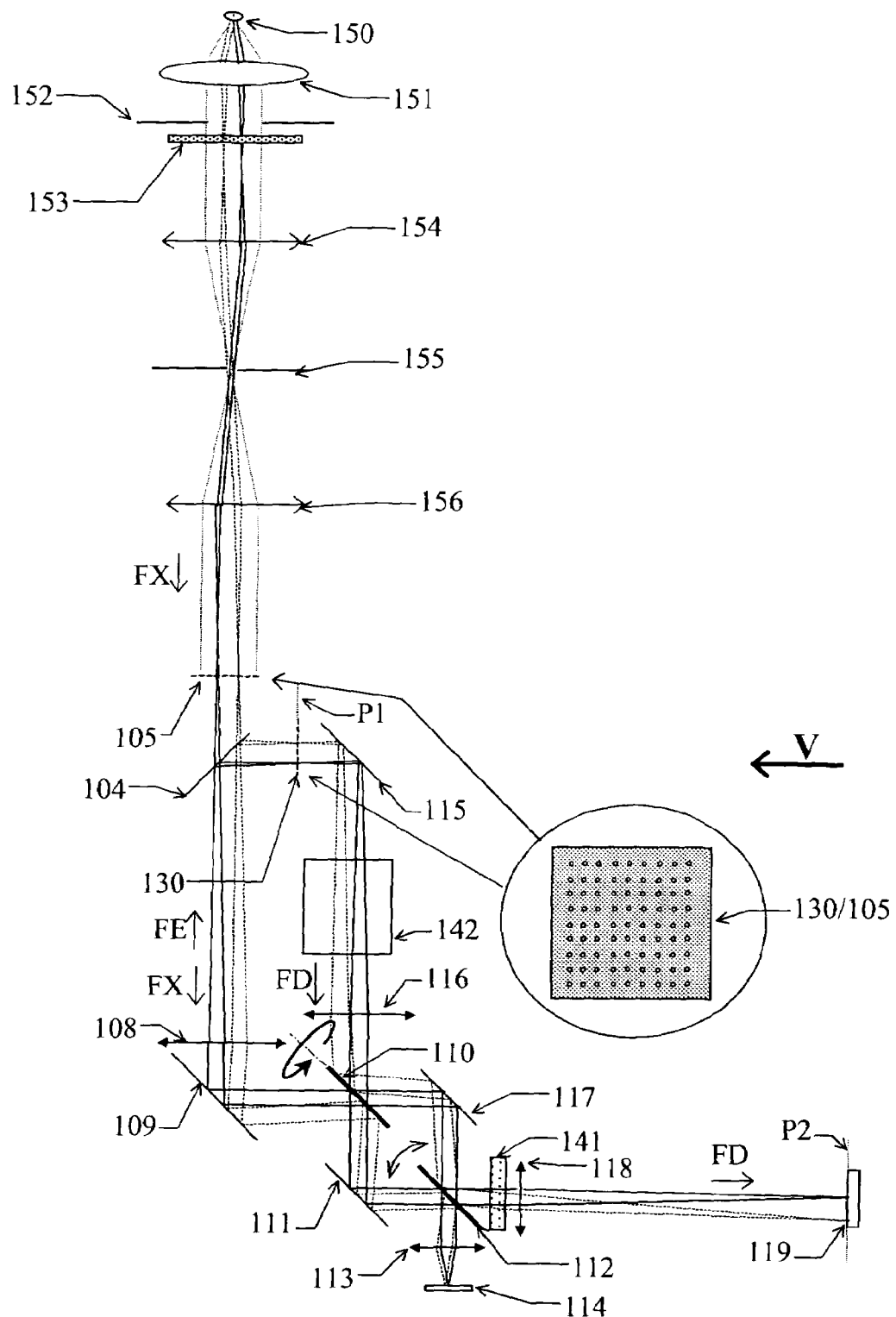
FIG. 16 represents an embodiment using multipoint incoherent lighting and two pinhole arrays.

Using the dimensioning example used in the previous embodiment for the arrays 103 and 105 we obtain, for c=2 and m=4, and for $\lambda_{fluo}$=518 nm (fluoresceine):

$F_{113}$=2 mm
ouv=1.25
$F_{108}$=200 mm
D=2 mm
$F_{103}$=80 mm
$d_1$=40 mm
$F_{131}$=13.3 mm
$d_2$=10 mm
$L_{130}$=12 μm Multipoint Embodiment with Incoherent Lighting This embodiment represented in FIG. 16 differs from the one represented in FIG. 6 by the fact that noncoherent illumination is used. This limits the imaging speed but allows the use of less costly illumination in which the wavelength can easily be adjusted, or the use of white light illumination for observation under reflected light.

The illuminating beam FX is supplied, for example, by the incandescent arc 150 of a mercury vapor or Xenon lamp. This illuminating beam passes through a collector 151, a field diaphragm 152, and a monochromatic filter 153 selecting the fluorescence excitation wavelength of the object to be observed. Then this illuminating beam FX passes through the lens 154, the aperture diaphragm 155, the lens 156, and reaches directly the pinhole array 105 forming the second spatial filtering system. The system made up of elements 150 to 156 constitutes Köhler illumination and can be replaced by any other Köhler illumination system. The rest of the system is the same as in the embodiment of FIG. 6.

A great part of the available luminous intensity is reflected by the pinhole array 105, thus limiting the brightness of the image formed in the plane 119 corresponding to the second image plane P2. In order for the acquisition time and the brightness of the image to remain within reasonable limits, it is preferable to use an array 105 consisting of pinholes very close to each other. While in the preceding embodiment, the distance between two pinholes can typically be about 20 times the width of each hole, in the present embodiment it is preferable to limit this distance, which may be for example from 2 to 4 times the width of the pinhole. This generates image disturbances, but the confocal effect is maintained and the disturbances may be eliminated for example by three-dimensional deconvolution if a three-dimensional image is acquired, composed of a series of two-dimensional images acquired at different depths in the object.

Figure 17:
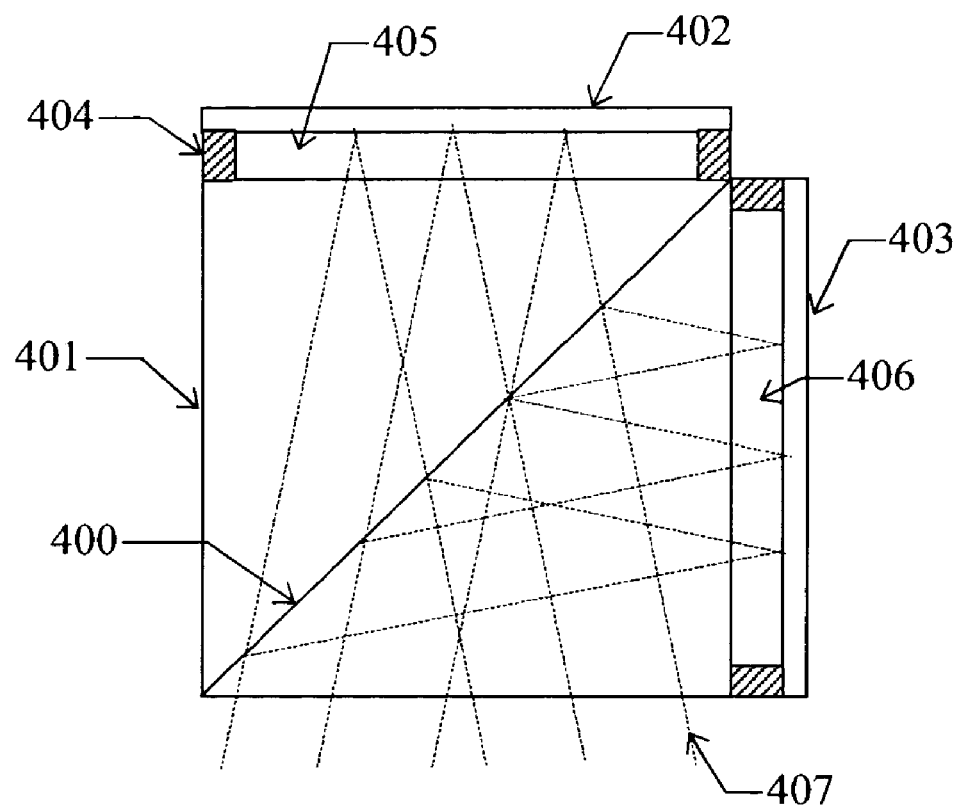
FIG. 17 represents a cube incorporating two pinhole arrays and a dichroic mirror.

To allow the exchange of two pinhole arrays without this exchange requiring complex adjustment, and to reduce manufacturing cost, the pinhole arrays 105, 130 and the dichroic mirror 104 can be incorporated in a single easily-made element, represented in FIG. 17. The dichroic mirror 400 is integral with a transparent cube 401. Glasses 402, 403 are mounted on the sides of the cube, to which they are secured by suitable parts, for example 404. Empty spaces 405, 406 are left between the glasses and the cube 401. The side of the glasses 402, 404 which faces the cube is covered with a thin metallic layer and a thin photosensitive resin layer. The pinholes are obtained by insolating the photosensitive resin by means of a white light projector. The shape of the beam coming from this projector has been represented symbolically by a dotted line. The projector is focused for example on the plane made up of the face of the glass 402 which carries the thin layers. Each illuminated point of the glass 402 will become a pinhole. Because of the configuration of the system, the points of the glass 403 which are illuminated are correctly placed without any additional adjustment being necessary, and will become the pinholes corresponding to the holes in the glass 402. After insolation, an appropriate liquid is introduced into the empty spaces 405, 406 so as to remove the resin at the insolated locations, then an acid is used to remove the metal at these same points. The pinholes are then obtained. A solvent can be used to remove the residual resin layer, and then the whole thing can be cleaned. Finally, it may be useful to introduce an optical liquid or a transparent plastic in the empty space, preferably with the same index as the plates 402, 403. This prevents unnecessary reflections on the contact surfaces. If a material with the same index as the plates 402, 403 is introduced into the empty spaces, it is then possible to use in the overall design glasses 402, 403 ground on the side facing the cube. This allows better dispersion of incident light by the reflecting parts. The monochromatic filters 153 and 141 can also be incorporated in this cube, thus making it possible to modify the imaging mode by exchanging only one component. If observation under reflected light is desired, the dichroic mirror can be replaced by a neutral separator cube.

Figure 18:
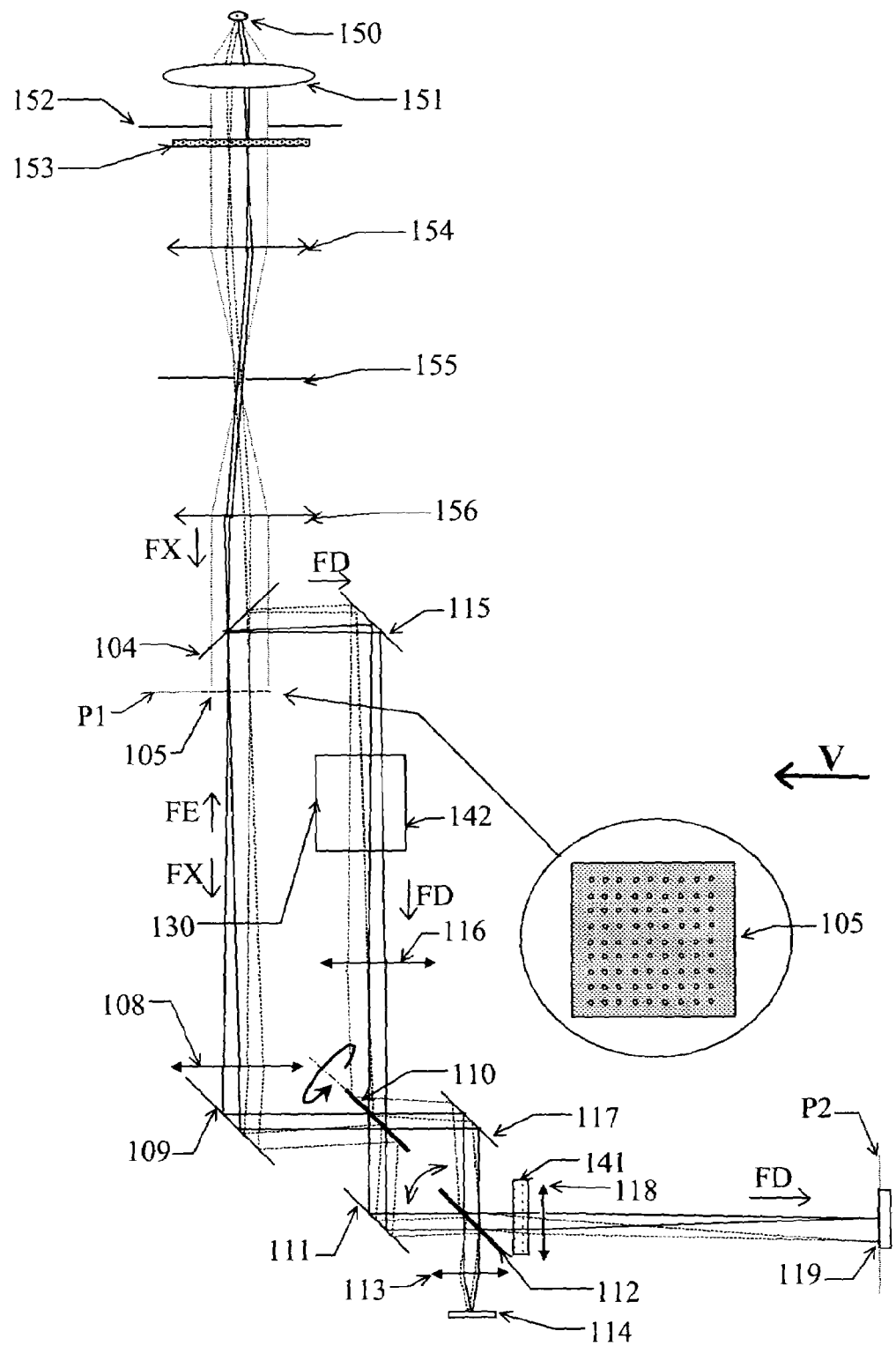
FIG. 18 represents an embodiment using multipoint incoherent lighting and a single pinhole array.

Another solution simplifying the exchange of pinhole arrays consists in using only one hole array which is traversed in one direction by the illuminating beam FX and in the other direction by the light beam FE emitted by fluorescence from the observed sample. In this case, the system is modified as indicated in FIG. 18: a single pinhole array 105 used, but the dichroic mirror 104 is placed between the lens 156 and the pinhole array 105. The microlens array 131 is also eliminated and the mechanical dimensioning is modified to take into account the replacement of the array 130 by the array 105. This configuration is particularly simplified, but one consequence of this simplification is the presence of a high light intensity resulting from partial reflection of the illuminating beam FX by the hole array 105 (stray light), which must be eliminated by the dichroic mirror 104 and the filter 141. The advantage of this configuration is that the exchange of the array 105, which constitutes both the means for splitting the illuminating beam into sub-beams, and the first spatial filtering device, can take place without alignment problems.

Figure 19:
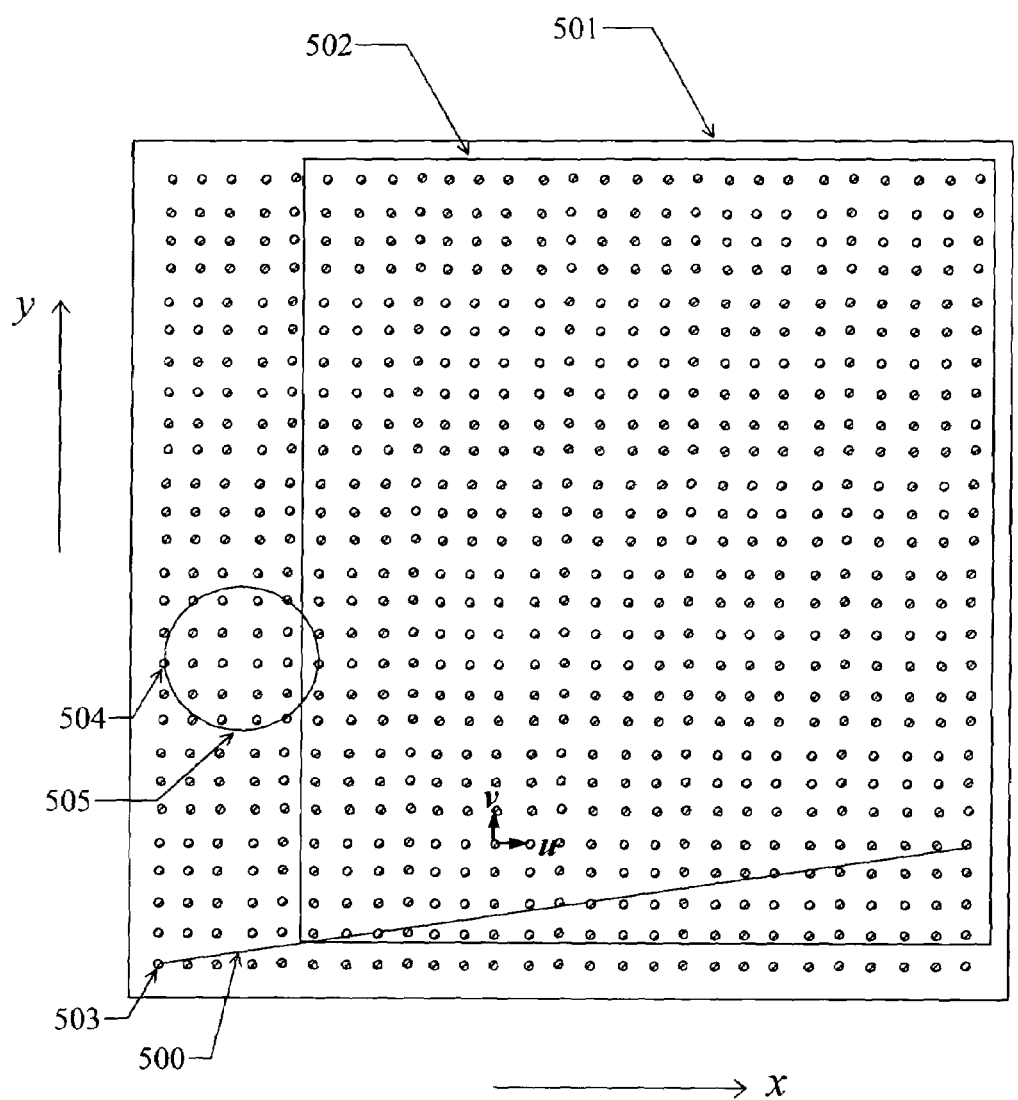
FIG. 19 represents the illuminated points in the object, and the trajectory of one of these points, a single galvanometric mirror being used.

It is also possible to eliminate one of the galvanometric mirrors 110 and 112 and replace it by a fixed mirror, provided a slight modification is made in the axis of rotation of the remaining mirror and its control so as to have, for each illuminated point, a sufficiently long trajectory. FIG. 19, prepared using the same conventions as FIG. 10, shows the trajectory 500 of an illuminated point 503 in the observed plane of the object 114, as well as the zone 502 in which a good-quality image is obtained, the position of the illuminated points for the reference position of the remaining galvanometric mirror being as indicated in the figure, limited by the contour 501. A rectilinear trajectory 500 slightly oblique in relation to the director vectors x, y of the two-dimensional periodic array of pinholes makes it possible to scan the entire plane without requiring a second galvanometric mirror. It is all the more easy to obtain an extended zone 502 as the illuminated points are close to each other. As it is preferable in the present embodiment, in order to maximize the illuminating intensity, to have many illuminated points, the present embodiment is particularly well suited to the use of this technique. However, it is also possible to use a rectilinear trajectory in an embodiment using a microlens array, provided the illuminated points are sufficiently numerous.

Similarly, it is possible to use the two galvanometric mirrors controlled in quadrature so that the trajectory of the image of a point 504 moves on a circle 505, and to modify progressively the diameter of this circle so that the trajectory covered during an image acquisition is a spiral. If the pinholes are sufficiently numerous and close to each other the entire plane is scanned. The advantage of this solution is that the movement of the illuminated point is at roughly constant speed; however, this type of scanning tends to generate over-illumination on lines parallel to the director vectors of the pinhole array.

This embodiment has the advantage of not requiring a laser beam. It also has the advantage of permitting easy modification of excitation and fluorescence emission wavelengths in the entire visible and UV domain. On the other hand, the low illumination limits the imaging speed.

This second embodiment may be combined with the first in the same system, shutters being utilizable for switching from one illuminating mode to another.

Embodiment with an Additional Reflection of the Illuminating Beam on the Mobile Mirror FIG. 20 illustrates another embodiment, which offers the advantage of low cost. It uses noncoherent illumination and requires fewer adjustments or specific elements than the preceding embodiment. It uses only one galvanometric mirror and a single face of this mirror, and uses an array of microscopic mirrors.

The excitation beam FX is a noncoherent beam produced for example by a Xenon arc lamp equipped with a collector and an optical system allowing the generation of Köhler illumination. It is filtered by a narrow bandpass filter which selects the excitation wavelength of the fluorescence. It reaches the scanning device at 600. The illuminating or excitation beam FX is reflected by the dichroic mirror 601 then by the polarizing beam splitter 602. The illuminating beam FX is then reflected by the galvanometric mirror 603, passes through the quarter-wave plate 604 whose neutral axis is 45 degrees from the plane of the figure, passes through the lens 605 and reaches the microscopic mirror array 606 placed in the image focal plane of the lens 605. The microscopic mirror array 606 is of the type represented in FIG. 21 and consists, for example, of a set of microscopic mirrors (for example 650) forming a square matrix on a transparent glass with antireflection treatment. The microscopic mirror array can also have a hexagonal grid, thus improving the efficiency of the system. Microscopic mirrors can be obtained for example by lithography, each mirror being composed of a reflecting layer deposited on the glass 606, the glass being preferably antireflection treated. The reflecting layer can for example be an aluminum layer. It is also possible to use mirrors composed of alternating layers of different indices, and which can thus be selective in terms of wavelength. The part of the illuminating beam FX which is reflected by the microscopic mirrors is in the form of a plurality of illuminating sub-beams FX2. These illuminating sub-beams FX2 pass again through the lens 605, the quarter-wave plate 604, and are reflected by the galvanometric mirror 603. The illuminating sub-beams FX2 pass through the polarizing beam splitter 602 then the lens 608 and the tube lens 609. They pass through the objective 610 and are focused in a plurality of illuminating points FOX on the observed fluorescent object 611. The light sub-beams FE retransmitted by fluorescence of the illuminated points of the fluorescent object pass through the objective 610, the tube lens 609, the lens 608 and the polarizing beam splitter 602. The light sub-beams FE are reflected by the galvanometric mirror 603, pass through the quarter-wave plate 604 and the lens 605, and reach the microscopic mirror array 606 which then constitutes the first spatial filtering system. The part of the light sub-beams FE which are reflected by this microscopic mirror array constitutes the plurality of sub-beams to be detected FD. These sub-beams to be detected FD pass through the lens 605, the quarter-wave plate 604, are reflected by the galvanometric mirror 603, also are reflected by the polarizing beam splitter 602, pass through the dichroic mirror 601 and the lens 612, and then reach the CCD sensor 613 located in the image focal plane of the lens 612 which coincides with the second image plane P2. The image formed in the plane in which the sensor 613 is located can also be observed by means of an eyepiece.

The focal plane 607 of the tube lens 609 is also a focal plane of the lens 608. The other focal plane of the tube lens 609 is preferably the same as the image focal plane of the objective 610. Preferably, the galvanometric mirror 603 is in a common focal plane of the lenses 605, 608 and 612. The microscopic mirror array 606 is in a focal plane of the lens 605 coinciding with the first image plane P1. The CCD sensor 613 is in a focal plane of the lens 612. For example, the lenses 609, 608, 605 and 612 can have a focal length of 200 nm, the objective 610 can be a inmmersion-type Nikon objective x100 with an aperture of 1.4. In this case, the array 606 can for example be made up of microscopic mirrors whose diameter is 30 microns, the distance between two adjacent points being for example 150 microns. The dichroic mirror 601 reflects the wavelength of the excitation beam and allows the passage of the fluorescent emission wavelength. The retardation plate 604 is used to modify the polarization of the beams so that, for example the plurality of sub-beams to be detected FD are reflected by the polarizing splitter 602 whereas the plurality of light sub-beams FE pass through it.

The galvanometric mirror 603 can for example be rotatably mobile around an axis located in the plane of the figure. In this case, the microscopic mirror array 606 must be oriented so that the trajectory of an illuminated point in the object is slightly oblique in relation to a director vector of the periodic array of illuminated points, as described by the trajectory 500 in FIG. 19, thus allowing the scanning of the entire object by means of a single galvanometric mirror.

The microscopic mirror array 606 is placed in a plane P1 which constitutes the first image plane, in which is placed the first spatial filtering system. The mirror array 606 forms both the first spatial filtering system, which filters the light beam FX coming from the sample to give the beam to be detected FD, and the second spatial filtering system, which splits the illuminating beam FX into a plurality of sub-beams FX2.

As in the first embodiment, it would have been possible to place the galvanometric mirror 603 in the image focal plane of the objective or near this place. The relay lenses 609 and 610 have been introduced to illustrate the possibility of such a design, which lends itself particularly to the setup of a scanning device that can be used with any type of microscope.

The position of the array 606 must be adjusted in rotation around the optical axis so that a director vector of the illuminated point array in the observed object is slightly oblique in relation to the trajectory 500 of an illuminated point when the mirror 603 rotates, as indicated in FIG. 19. The position of the array 606 must be adjusted in translation in the direction of the optical axis so that the array 606 is conjugate to the CCD 613. These adjustments are easily carried out.

The present embodiment offers the advantage of being low in cost and requiring few adjustments. It is well suited to a low-cost version of the invention, intended for fluorescence observation. The device an be equipped with a vertical sample movement system, in which case the obtained image quality can be improved by three-dimensional deconvolution. Such deconvolution makes it possible to improve resolution and to eliminate most defects due to stray reflections in the system, and possibly to also compensate for defects related to limited distance between the points of the array 606. It requires prior measurement of the point spread function (PSF) which may be carried out by imaging a fluorescent microbead using a known technique.

The confocal scanning device can comprise all the elements contained in the zone limited by the dotted line 614. In this case the user must simply connect to the system a microscope and an eyepiece or a camera. However, the confocal scanning device can also include only the elements included in the zone limited by the dotted fine 615. In this case, the user is free to choose the lenses 608 and 612, thus enabling him/her for example to modify the magnification of the system by an appropriate choice of the lens 612. It is also possible to add a lens in the plane 607 in order to bring to infinity the image focal plane of the microscope in the case in which it is not exactly placed in a focal plane of the tube lens 609.

Figure 22:
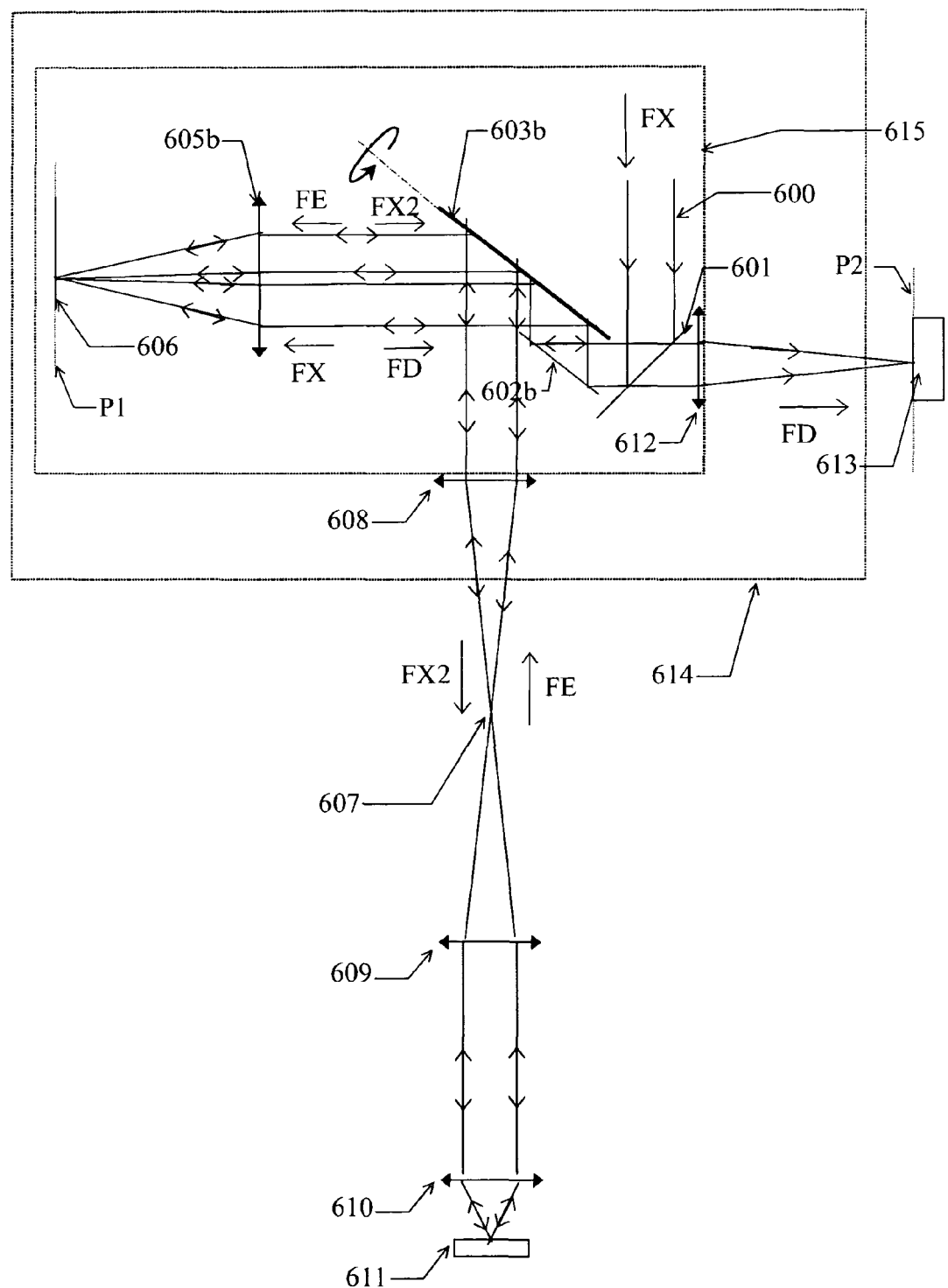
FIG. 22 represents an improved version of the embodiment of FIG. 20, in which a nonpolarized beam can be used with no loss of luminous energy.

To obviate the use of a polarizing beam splitter and prevent the loss of luminous intensity resulting therefrom, the device may be modified as indicated in FIG. 22. In FIG. 22 the various elements of the device are the same as in FIG. 20, the elements 602, 603 and 605 however being replaced respectively by the elements 602b, 603b and 605b. The polarizing mirror 602 is replaced by the simple mirror 602b on which are reflected the illuminating beam FX and the plurality of sub-beams to be detected FD. The galvanometric mirror 603b is roughly twice as long as the mirror 603, and the lens 605b is also larger than the lens 605. The optical axis of the lens 605b is offset in relation to the optical axis of the illuminating beam FX coming from the galvanometric mirror, so that the illuminating beam FX comes in on a slant on to the microscopic mirror array 606. The illuminating sub-beams FX2 reflected by the array 606 then reach a zone of the mirror 603b distinct from that which was illuminated by the illuminating beam FX. After reflection on 603b, the illuminating sub-beams FX2 pass next to the mirror 602b. The plurality of light sub-beams FE coming from the sample follow the reverse path so that, after reflection on the pinhole array, the sub-beams to be detected FD reach the sensor. The device in FIG. 22, for its design simplicity and its effectiveness, constitutes the preferred embodiment for fluorescence observation with incoherent illumination.

An advantage of the present embodiment is that the illuminating beam FX is reflected a first time on a galvanometric mirror before reaching the microscopic mirror array. It is then reflected a second time (beams FX2) before reaching the observed object. Consequently, the zone illuminated by the illuminating beam on the microscopic mirror array moves, whereas the illuminated zone in the observed object remains stationary. This differs from the preceding multipoint embodiments in which the illuminated zone in the image plane moves, and hence the illuminated zone in the observed object cannot be made stationary unless it is limited by a diaphragm located in the image plane, causing an energy loss, or by moving the illuminating points over very short trajectories, which resolves the problem only partially and poses synchronization problems.

The synchronization of the system can be simplified by using the movement of the illuminated zone over the microscopic mirror array. When the illuminating beam, moving over the microscopic mirror array, leaves the covered zone of microscopic mirrors, the observed object is no longer illuminated. One need only have extinction coincide with the end positions of the galvanometric mirror in order to eliminate illumination nonhomogeneity caused by the slowing of mirror movement around the end (stationary) points of their trajectory.

Figure 23:
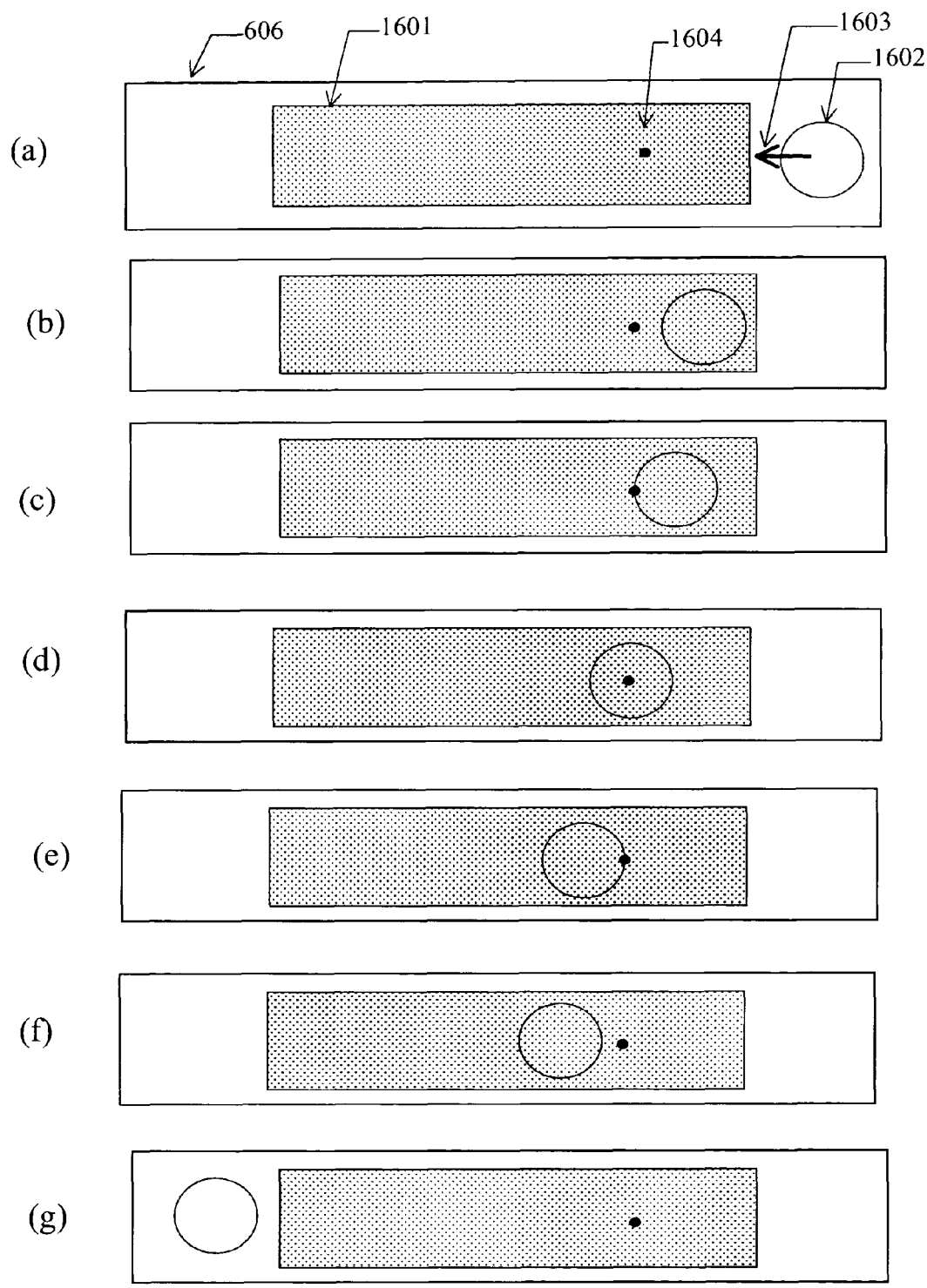
FIG. 23 represents the movement of an illuminated zone on a transparent plate provided with an array of microscopic mirrors and used as a means of splitting the illuminating beam into sub-beans, for example in the embodiment of FIG. 22.

FIG. 23 illustrates this operating principle. FIG. 23(a) shows the plate 606 on which is located a microscopic mirror array 1601. Also represented is the zone 1602 illuminated by the illuminating beam when the galvanometric mirror 603 reaches an end position of its oscillatory movement. In the position indicated in FIG. 23(a) the illuminated zone is outside the zone covered with microscopic mirrors, the illuminating beam thus passes through the plate without being reflected, and the observed object is not illuminated. In this position, the plate 606 consequently makes it possible to eliminate the illuminating beam before it reaches the observed object. The zone 1602 moves over the plate 1600 but, in the end position represented in FIG. 23(a), its movement speed is cancelled before the movement of the illuminated zone resumes in the direction indicated by the arrow 1603. The illuminated zone 1602 then passes through the zone 1601 covered with microscopic mirrors, at a roughly constant speed, as indicated in FIGS. 23(b) to 23(f). During this phase, the observed object is illuminated. When the position of the mobile mirror reaches the extreme reverse of its oscillatory movement, the illuminated zone leaves the zone covered with microscopic mirrors and its speed is cancelled, as indicated in FIG. 23(g). The observed object again ceases to be illuminated. The illuminated zone 1602 then moves again in the opposite direction for another crossing of the zone 1601 covered with microscopic mirrors. If a camera is used for signal detection, the movement of the galvanometric mirror can be synchronized with acquisition by the camera. During the camera exposure time, the illuminated zone 1602 can, for example, carry out one or several complete crossings of the zone 1601.

Figure 24:
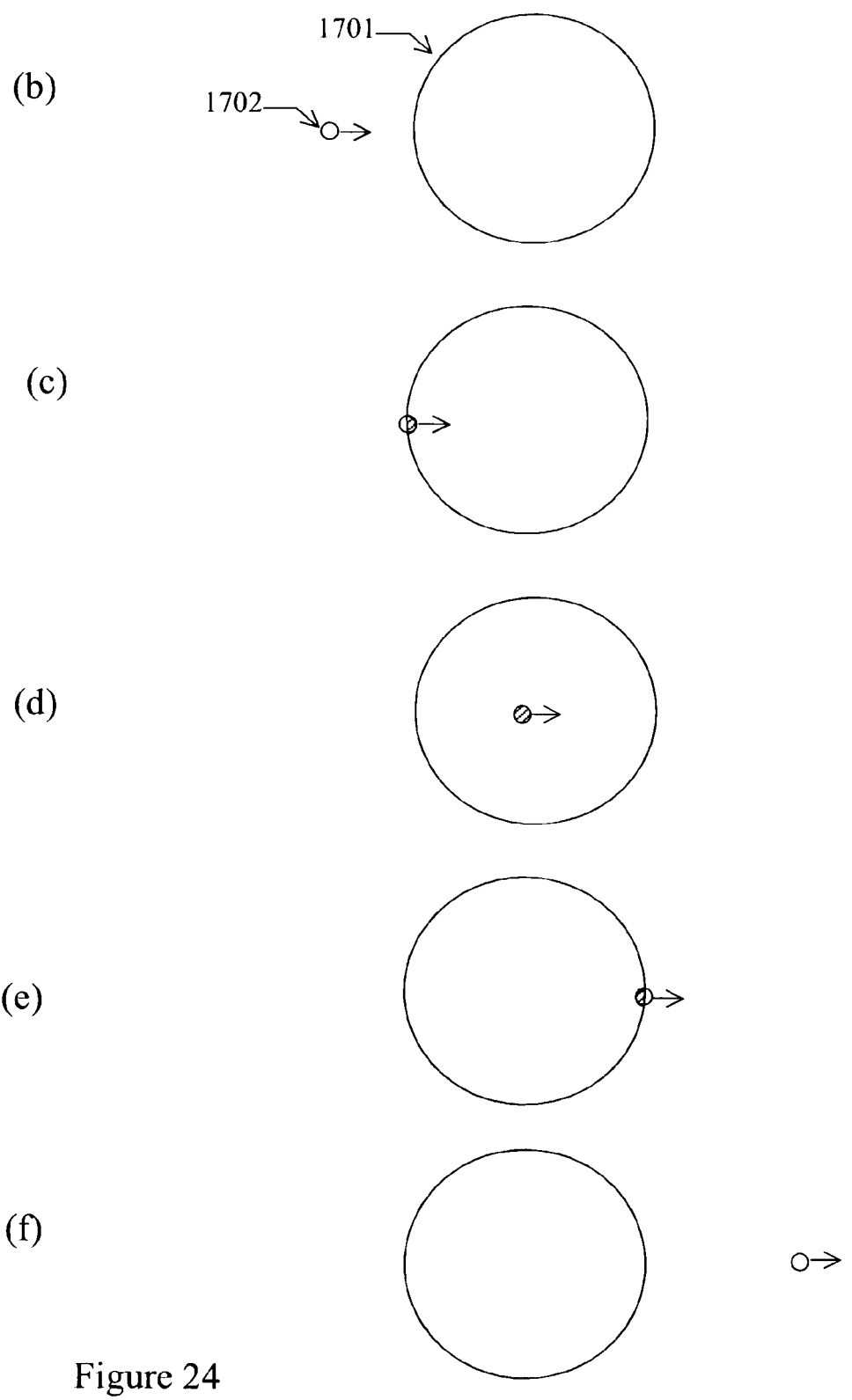
FIG. 24 shows the trajectory of an illuminating point in the observed zone of the object.

In FIG. 23 has been indicated a particular microscopic mirror 1604. FIG. 24 illustrates the movement in the object of the geometrical image 1702 of the mirror 1604, and hence of the corresponding illuminated point in the object. The mirror 1604 may be assimilated with a point of the first image plane P1, in which is located the glass 606. FIG. 24(b) represents the position of the geometrical image 1702 of the microscopic mirror 1604, as well as the observed zone 1701 which is the geometrical image of the illuminated zone 1602 on the plate 606, and this for a position of the illuminated zone 1602 on the plate 606 which is the one represented in FIG. 23(b). The point 1702 moves along the direction indicated by the arrow but has not yet reached the zone 1701, and is hence not yet illuminated. This reflects the fact that in FIG. 23(b) the illuminated zone 1602 has not yet reached the point 1604. The point 1702 then reaches the observed zone 1701 as indicated in FIG. 24(c) and hence begins to be illuminated, this reflecting the fact that the illuminated zone 1602 reaches the point 1604 as indicated in FIG. 23(c). The point 1702 is then illuminated and passes through the zone 1701 at constant speed, as indicated in FIG. 24(d), which reflects the fact that the point 1604 is in the illuminated zone as indicated in FIG. 23(d). The point 1702 reaches the limit of the observed zone as indicated in FIG. 24(e), which reflects the fact that the point 1604 is at the limit of the illuminated zone 1602, as indicated in FIG. 23(e). The point 1702 then comes out of the observed zone and is then no longer illuminated, as indicated in FIG. 24(f), which reflects the fact that the illuminated zone 1602 has gone beyond the point 1604, as indicated in FIG. 23(f). The point 1702 then continues to move at constant speed and then its speed is cancelled and it changes direction to come back towards the observed zone. When the movement speed of the point 1702 is cancelled, the movement speed of the illuminated zone 1602 on the plate 606 is also cancelled, and this zone is hence in one of the positions illustrated in FIGS. 23(a) and 23(g). When the movement speed of the point 1702 is cancelled, the entire illuminating beam is thus eliminated. The plate 606 acts as a limitation device eliminating the part of the illuminating beam which passes outside of a selection surface coinciding with the zone 1601 covered by the microscopic mirror array. When the movement speed of the point 1702 (or of any other equivalent point) is cancelled, the entire zone 1602 illuminated by the illuminating beam is outside the selection area 1601, and the illuminating beam FE is entirely eliminated. The observed zone is thus traversed successively by a set of illuminated points each passing through it at constant speed. Speed variations of the illuminated points are effectively eliminated by this method.

Figure 25:
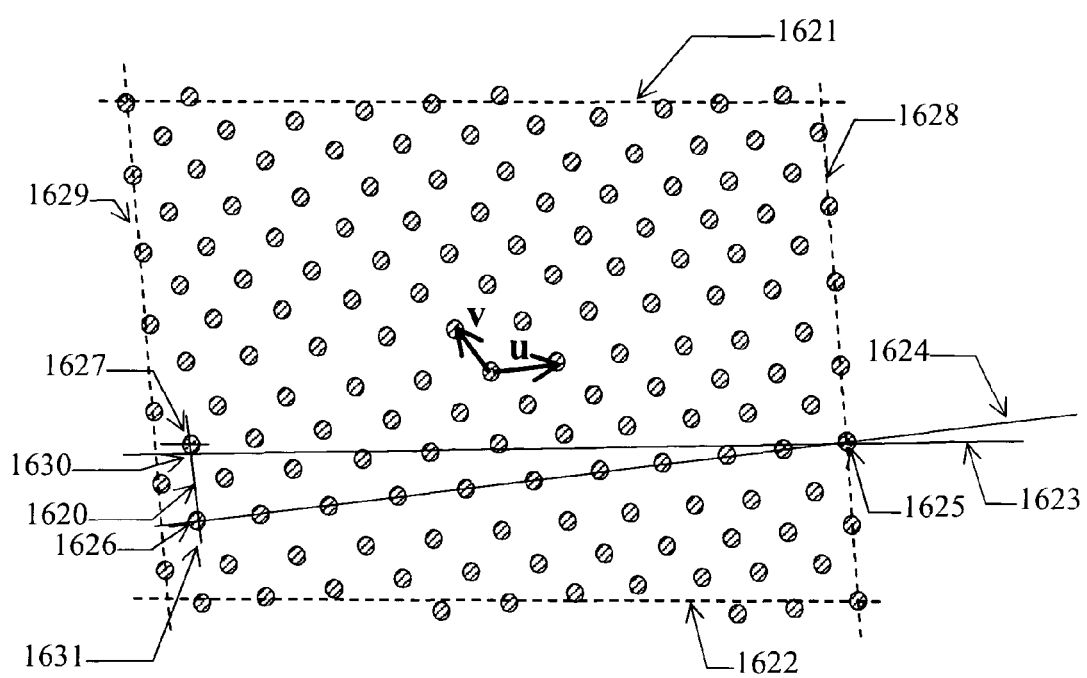
FIG. 25 represents part of an array of reflecting points with hexagonal grid, and indicates the position of this array in relation to the direction of movement of the illuminated zone on the array.

FIG. 25 represents the shape of part of the array of reflecting microscopic mirrors 1601, in the case of a hexagonal grid array. The director vectors of the array are u and v, as represented in the figure. This array includes a set of reflecting microscopic mirrors, shaded in the figure. The line 1623 passes through the center of the microscopic mirror 1625 and is oriented in the direction of movement of the illuminated zone 1602 over the array, which is also the direction of movement over the array of the geometrical image of a fixed point of the observed object. The line 1624 is directed along a director vector of the array and passes through the center of the microscopic mirror 1625. The microscopic mirror 1627 is the first mirror located on a line 1631 orthogonal to the line 1624 and passing through the center of the microscopic mirror 1626. The point 1630 is the intersection of the lines 1624 and 1623. The following notations are used:

D1 the distance between the center of the mirror 1627 and the point 1630.

D2 the distance between the center of the mirror 1626 and the center of the mirror 1627.

N the number of microscopic mirrors located on the line 1624 between the points 1625 and 1626, including these points.

For the scanning conditions to be optimal it is necessary for N to be sufficiently large and agree moreover with the inequality D1=D2/N. Also, as the array is extended beyond the points indicated in the figure, the total number of points on the line 1624 must be a multiple of N, and the limits of the array must be orthogonal to the line 1624.

The more extensive the zone 1601 in the direction of movement of the illuminated zone 1602, the greater will be the possibility of minimizing luminous energy losses related to the nonreflection of the beam on the plate 606 at the end points of movement of the illuminated zone on the plate 606. However, this technique always causes a certain loss of energy. This loss may be avoided, for example, by modifying the movement of the galvanometric mirror and hence the trajectory of a geometrical point 1702, image of the point 1604, so that the illuminated zone 1602 remains in the zone 1601 covered by the microscopic mirror array. However, if the change of direction of the point 1702 at the end points of its trajectory is not sufficiently rapid, this technique creates illumination nonhomogeneities in the observed object and hence a variation of the three-dimensional point spread function (PSF) according to the considered point. Because the microscopic mirror array is periodic, the dependence of this PSF according to the considered point is itself periodic. Illumination nonhomogeneities can be corrected by means of appropriate image processing algorithms.

Usual deconvolution algorithms consist in calculating at each point of the object a value:

$$V(r_0) = \int\int\int D(r-r_0) I(r) d^3r$$

where $r_0$ is the position vector of the considered point, r is a variable position vector, where the deconvolution function $D(r-r_0)$ allows the inversion of the PSF, and where $I(r)$ is the non-deconvoluted image obtained from a series of two-dimensional confocal images each obtained for a different observed plane, a piezoelectric positioner along the z axis (vertical) being used for the acquisition of such a series of images. This calculation can be carried out in the frequency domain by means of known three-dimensional Fourier transform techniques, or in the spatial domain by means of filtering techniques.

When the illuminating nonhomogeneities are not too strong, or when the diameter of the microscopic mirrors is small (less than a Airy half-disk), illumination nonhomogeneities can be compensated by a multiplication of the three-dimensional image $I(r)$ by an appropriate function $C(r)$, which is periodic along the same director vectors as the array of illuminating points in the observed object, and compensate directly for illumination variations. This function $C(r)$ can be obtained for example by observing a uniformly fluorescent flat object, a non-deconvoluted image $I_0(r)$ of which is then obtained. We then have $$C(r) = \frac{1}{I_0(r)}.$$

The multiplication of $I(r)$ by $C(r)$ can be followed or not by a deconvolution of the usual type.

In the more general case, the spatial dependency of the deconvolution function transforms the equation describing the deconvolution into:

$$V(r_0) = \int\int\int D(r_0^h; r-r_0) I(r) d^3r$$

where $D(r_0^h; r-r_0)$ is dependent on the horizontal component $r_0^h$ of the vector $r_0$ but is periodic on this variable, so that:

$$D(r_0^h; r-r_0) = D(r_0^h + ku+lv; r-r_0)$$

where u and v are the director vectors of the array of illuminating points in the observed object and where A and l are arbitrary whole numbers. The function $D(r_0^h; r-r_0)$ can be obtained on a grid of the periodic array of illuminating points, then making it possible to obtain it over the entire object. At each point of the grid of the array, it can be obtained by inverting, in the frequency domain (i.e. in Fourier representation), a PSF measured at this point by moving a fluorescent microbead around the point, the value $P(r)$ of the PSF being the intensity value measured at the measurement point when the position of the microbead in relation to the measurement point is defined by the vector r.

Figure 26:
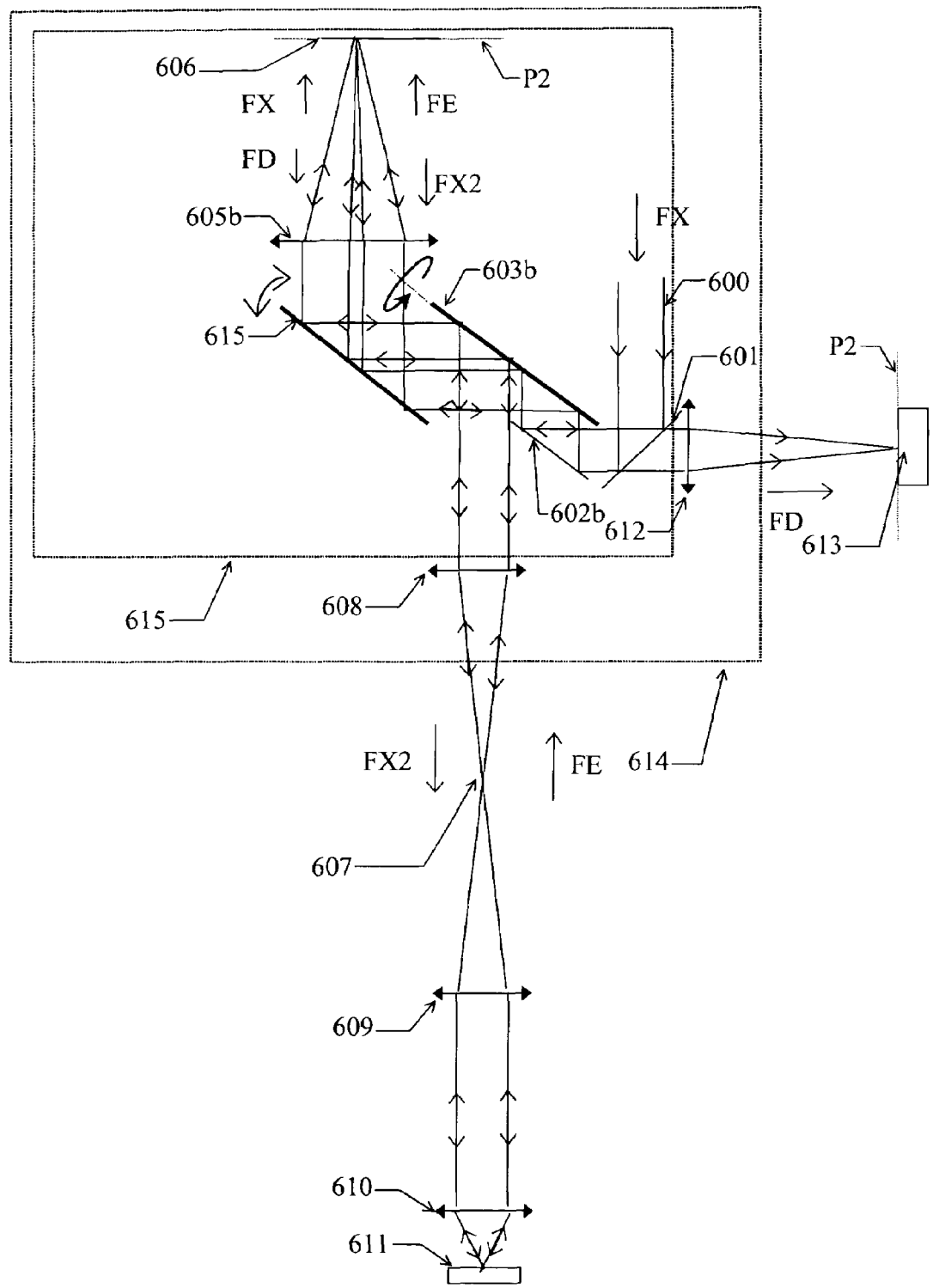
FIG. 26 represents a version with two galvanometric mirrors of the embodiment of FIG. 22.

The device in FIG. 22 can be combined with a second galvanometric mirror to be able to perform two-dimensional scanning as in the second embodiment. The resulting layout is shown FIG. 26 in which a galvanometric mirror 615 has been added and the other elements have been moved accordingly. The axis of rotation of the mirror 615 is orthogonal to that of the mirror 603b. By controlling the two mirrors in quadrature, it becomes possible to impart a circular or two-dimensional trajectory to each illuminated point. This trajectory is for example similar to the trajectory 505 of FIG. 19. The advantage of such a trajectory is that it does not result in any energy losses. However, this trajectory generates periodic illumination nonhomogeneities, which can be compensated as previously by using a deconvolution function depending on the considered point or by multiplying the non-deconvoluted image by an illumination nonhomogeneity compensation function.

Figure 27:
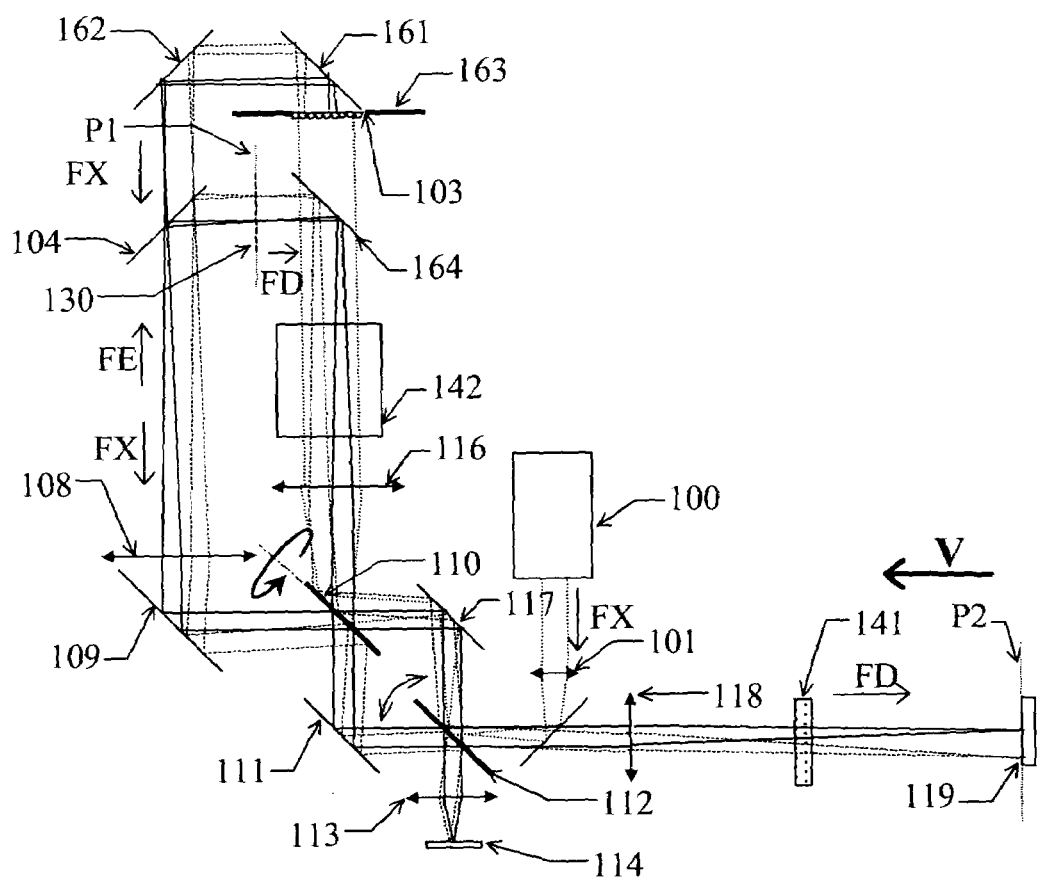
FIG. 27 represents an embodiment with multipoint laser illumination, in which the illuminating beam undergoes a first deflection before reaching the microlens array.

A similar technique can be used with laser illumination, the illuminating beam then having to be reflected a first time on the galvanometric mirrors before reaching the microlens array. Such a device, derived from the one in FIG. 6, is represented in FIG. 27. Mirrors 162 and 161 have been added to modify the trajectory of the illuminating beam, and the laser 100 and the lens 101 have been placed upstream of the galvanometric mirrors. The mirror 115 has been replaced by a dichroic beam splitter 164. Preferably, the beam laser coming from 100, represented in a thick dotted line, is focused by the lens 101 on the galvanometric mirror 112, which is the only mobile and which is also in a focal plane of the lens 116. The angular movement of the galvanometric mirror then results in the movement of the illuminating beam over the microlens array 103. If the microlens array 103 is extended by an absorbing diaphragm 163, it is possible to bring the illuminating laser beam entirely on to the diaphragm 163 to generate an extinction. This thus makes it possible, as previously, to extinguish the beam at the ends of the trajectory.

Simplified Embodiment with a Spatial Filtering Device Consisting of a Pinhole Array.

Figure 28:
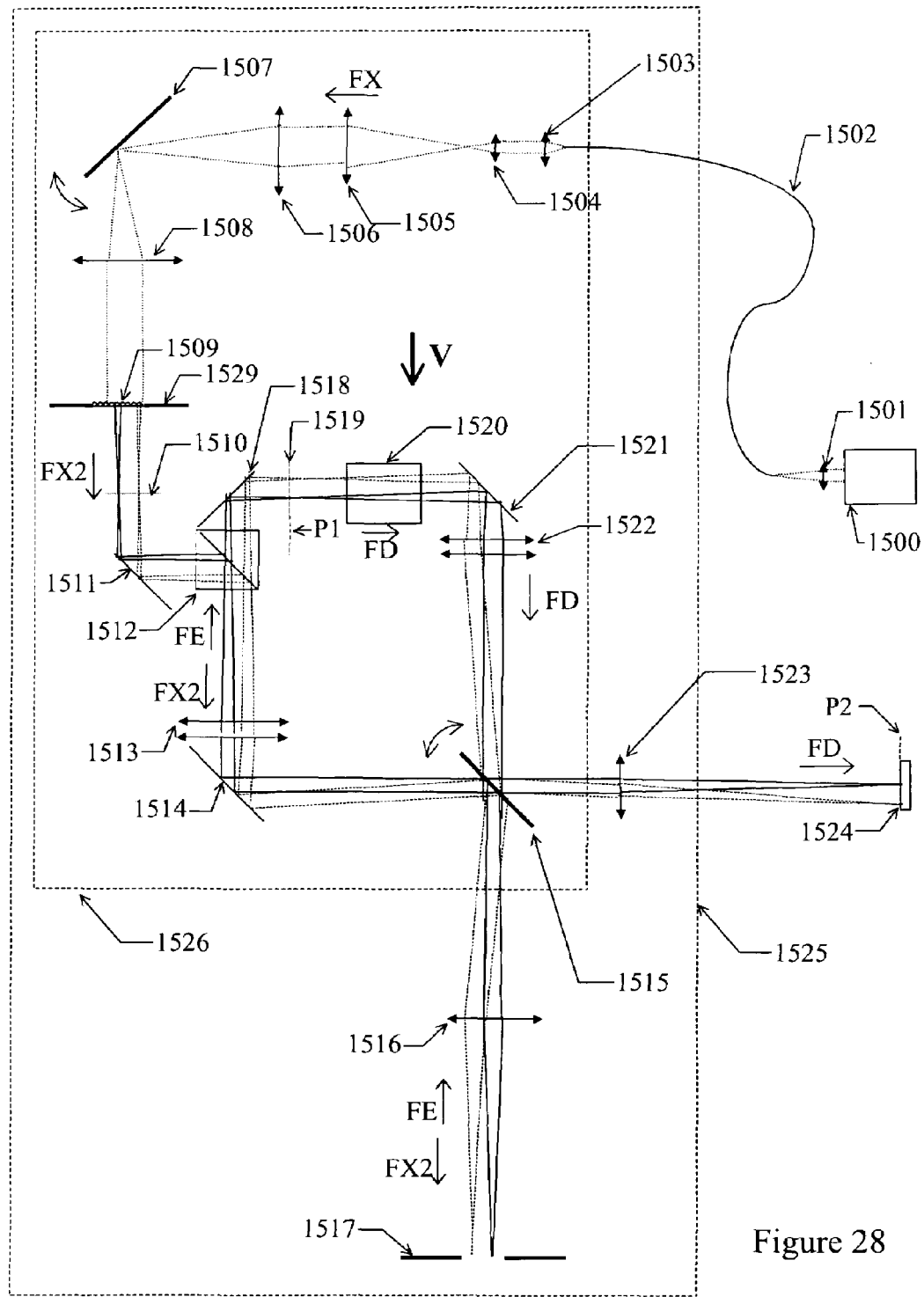
FIG. 28 shows a simplified embodiment with laser illumination.

The embodiment of FIG. 28 is a simplified embodiment with laser light, comprising only one galvanometric mirror, and using a pinhole array as the spatial filtering system. Owing to its simplicity, in particular in terms of synchronization and as regards the number of galvanometric mirrors used, it constitutes a preferred embodiment with laser illumination.

The illuminating beam FX coming from the laser 1500 is coupled by means of a lens 1501 to an optical fiber 1502 which transports it up to the scanning device. It is then transformed into a parallel beam by the lenses 1503, 1504 and 1505. It is refocused by the lens 1506 on the galvanometric mirror 1507 which reflects it. It passes through the lens 1508 whose object focal plane is on the mirror 1507. It reaches the microlens array 1509 placed in the image focal plane of the lens 1508.

It is split by this microlens array into a plurality of illuminating sub-beams FX2, which is then reflected by the mirror 1511 and then the dichroic mirror 1512. It passes through the lens 1513 made up of two separate lenses whose separation can be adjusted in order to adjust precisely the focal length. It is reflected by the mirror 1514 and then by the galvanometric mirror 1515, passes through a lens 1516 and then a diaphragm 1517. The lens 1516 has one focal plane on the mirror 1515 and another focal plane on the diaphragm 1517. The lens 1513 has one focal plane in the focusing plane 1510 of the sub-beams coming from the microlens array 1509, and another focal plane on the galvanometric mirror 1515. The diaphragm 1517 is mounted in an image plane of microscope, and the beam passing through this diaphragm then reaches the samples, through the tube lens and the objective, these elements not being shown in the drawing.

The light beam FE emitted by fluorescence by the sample in turn reaches the image plane where the diaphragm 1517 is located, via the objective and the tube lens. It is reflected by le galvanometric mirror 1515, by the mirror 1514, passes through the lens 1513 and the dichroic cube 1512, is reflected by the mirror 1518, and passes through the pinhole array 1519.

The beam to be detected FD coming from this pinhole array then passes through all the mirrors 1520 represented in FIG. 8 in a view along the direction V. It is reflected by the mirror 1521, passes through the lens 1522 identical to the lens 1513, is reflected by the second face of the galvanometric mirror 1515, passes through the lens 1523, and is focused on a sensor 1524 located in an image focal plane of the lens 1523.

Figure 29:
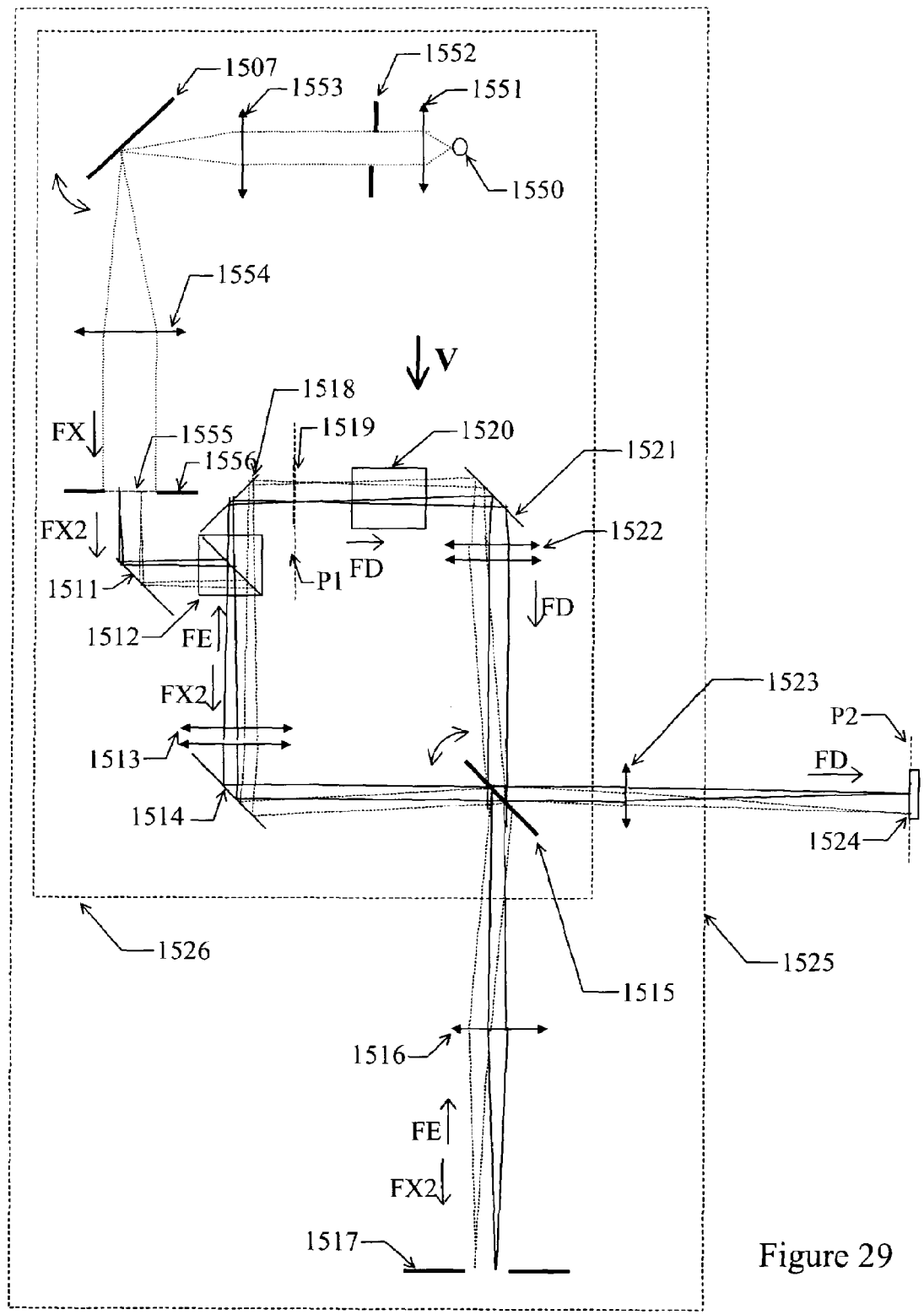
FIG. 29 shows an embodiment similar to that of FIG. 28, but with white light illumination.

The device may be modified as indicated in FIG. 29 to enable observation under reflected white light. In the device of FIG. 29, the illuminating beam FX coming from an incoherent light source 1550, for example a Xenon arc lamp, then passes through a lens 1551 and a diaphragm 1552, and then a lens 1553. The illuminating beam then passes through the lens 1554 and reaches the pinhole array 1555 which splits it into a plurality of sub-beams and which is placed in a common image focal plane of the lenses 1554 and 1513. The dichroic cube 1512 is replaced by a wavelength-neutral beamsplitter cube, for example of the semi-reflecting type. The device thus modified enables observation under reflected light. It constitutes a preferred embodiment for observation under reflected light, for which it is preferable to the device in FIG. 22 which cannot totally eliminate stray light.

Whether one uses reflected white light or laser-excited fluorescence, the illuminating points in the object must be sufficiently close to each other and the array of illuminating points in the object must be correctly oriented in relation to the direction of movement of these points which is generated by the movement of the galvanometric mirror 1515. This allows the use of the single-mirror scanning technique based on the principle already described in FIG. 19. The galvanometric mirror 1507 is designed to allow the movement of the illuminated zone over the device splitting the beam into sub-beams, which may be either the lens array 1509 or the pinhole array 1555, to permit the use of the technique described in FIG. 23, in which the transparent part of the transparent plate 1600 is now replaced by a diaphragm 1556 or 1529, and in which the zone 1601 of this plate is replaced by the pinhole array 1555 or the microlens array 1509. The galvanometric mirror 1507 must be synchronized with the galvanometric mirror 1515, and the amplitude of its movement must be appropriate so that the illuminated zone in the object, corresponding to the geometrical image of the illuminated zone in the plane 1510 or on the pinhole array 1555, is fixed.

Figure 30:
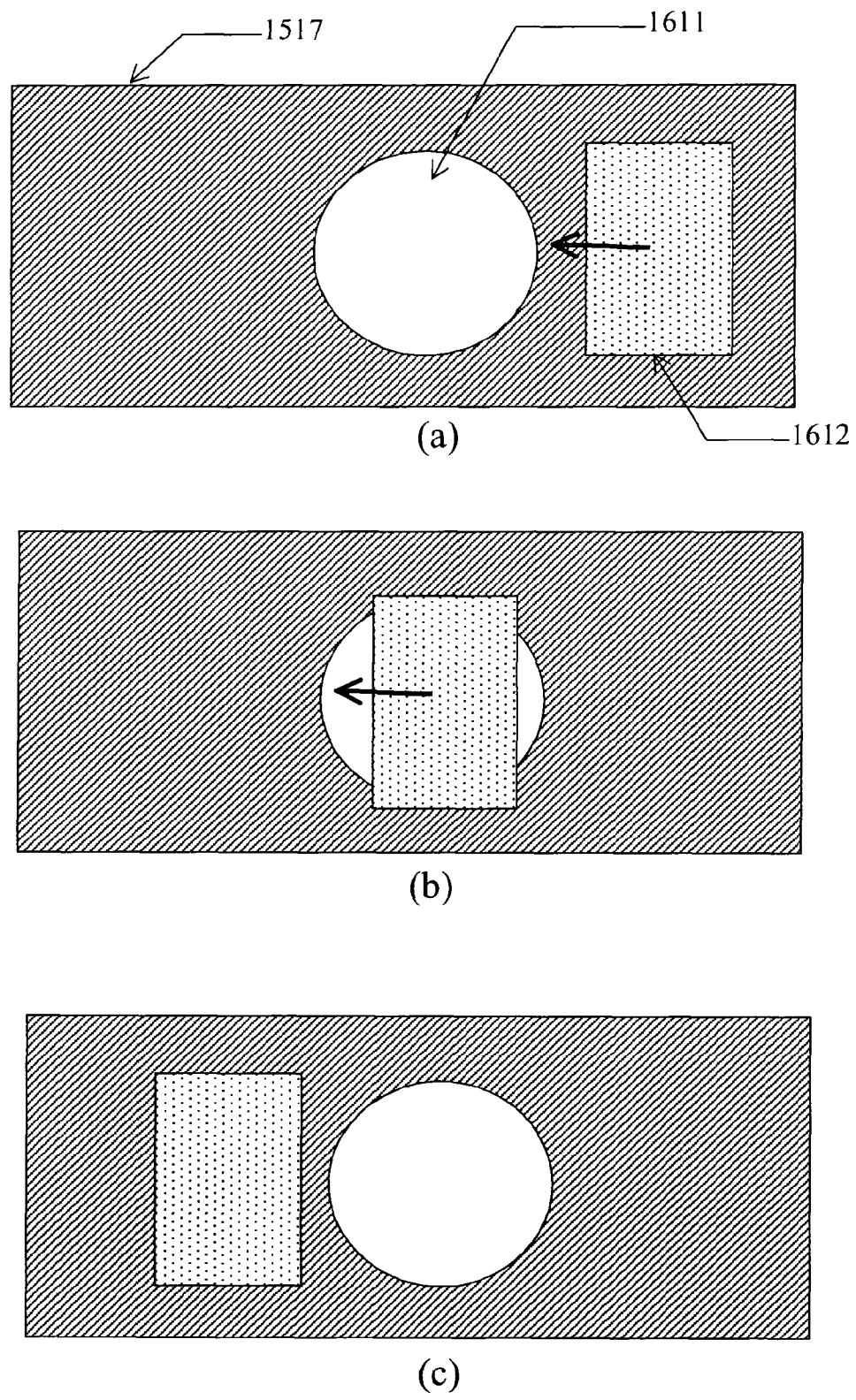
FIG. 30 represents the movement of an illuminated zone on a diaphragm, used for example in the embodiment of FIG. 29.

It is also possible not to use the mirror 1507 or to replace it by a fixed mirror. The sample scanning technique is then modified and the diaphragm 1517 is used to delimit the observed zone. FIG. 30 illustrates the scanning technique that can then be used. Because of the movement of the only mirror 1515, the illuminated zone on the sample moves. FIG. 30(*a*) represents the diaphragm 1517 having an aperture 1611, as well as the illuminated zone 1612 which is made up of an array of illuminated pinholes moving over the diaphragm. When the mirror is in an end position of its oscillatory movement, the illuminated zone 1612 is in the position indicated in FIG. 30 and the plurality of illuminating sub-beams is entirely stopped by the diaphragm. When the mirror rotates, the illuminated zone 1612 moves and passes through the aperture of the diaphragm as indicated in FIG. 30(*b*). The illuminated zone then reaches the other side of the diaphragm, as indicated in FIG. 30(*c*), and its movement speed is then cancelled. As the movement speed is cancelled only for the end positions of the illuminated zone on the diaphragm, in which the illuminating beam is entirely stopped by the diaphragm, the aperture of the diaphragm is scanned by points moving at a roughly constant speed. The diaphragm 1517 here constitutes a limitation device stopping the part of the illuminating beam that passes outside of a selection area constituted by its aperture.

The narrower the illuminated zone 1612, the greater the possibility of minimizing light losses. Nevertheless, the narrower this zone the greater must be the density of the illuminating point array, thus limiting how narrow the zone can be. In general, the solution consisting in using the mirror 1507, although more expensive, is technically preferable.

The confocal scanning device can, for example, include all the elements contained in the zone delimited in the figure by the broken line 1525. In this case, the user must simply connect to the scanner a camera, a microscope, and a source of lighting. However, the confocal scanning device can also be limited to the elements delimited in the figure by the broken line 1526. In this case, the user must also connect to the device lenses 1516 and 1523 supplied separately. The advantage of this solution is that the connection is made in an afocal zone, thus making it less sensitive to positioning errors, and users can choose the lens used, enabling them for example to modify the system's magnification.

Means for Modifying the Spatial Filtering Characteristics and/or Characteristics for Splitting the Illuminating Beam Into Sub-beams.

In all the embodiments it is possible to modify the spatial filtering characteristics and possibly the characteristics of the beam splitting system producing sub-beams. For example, the first spatial filtering system can be mounted in a movable manner to be exchangeable manually. However, it is often desirable to have the possibility of modifying the spatial filtering system so that it may be driven, for example, by means of an electric motor.

Figure 31:
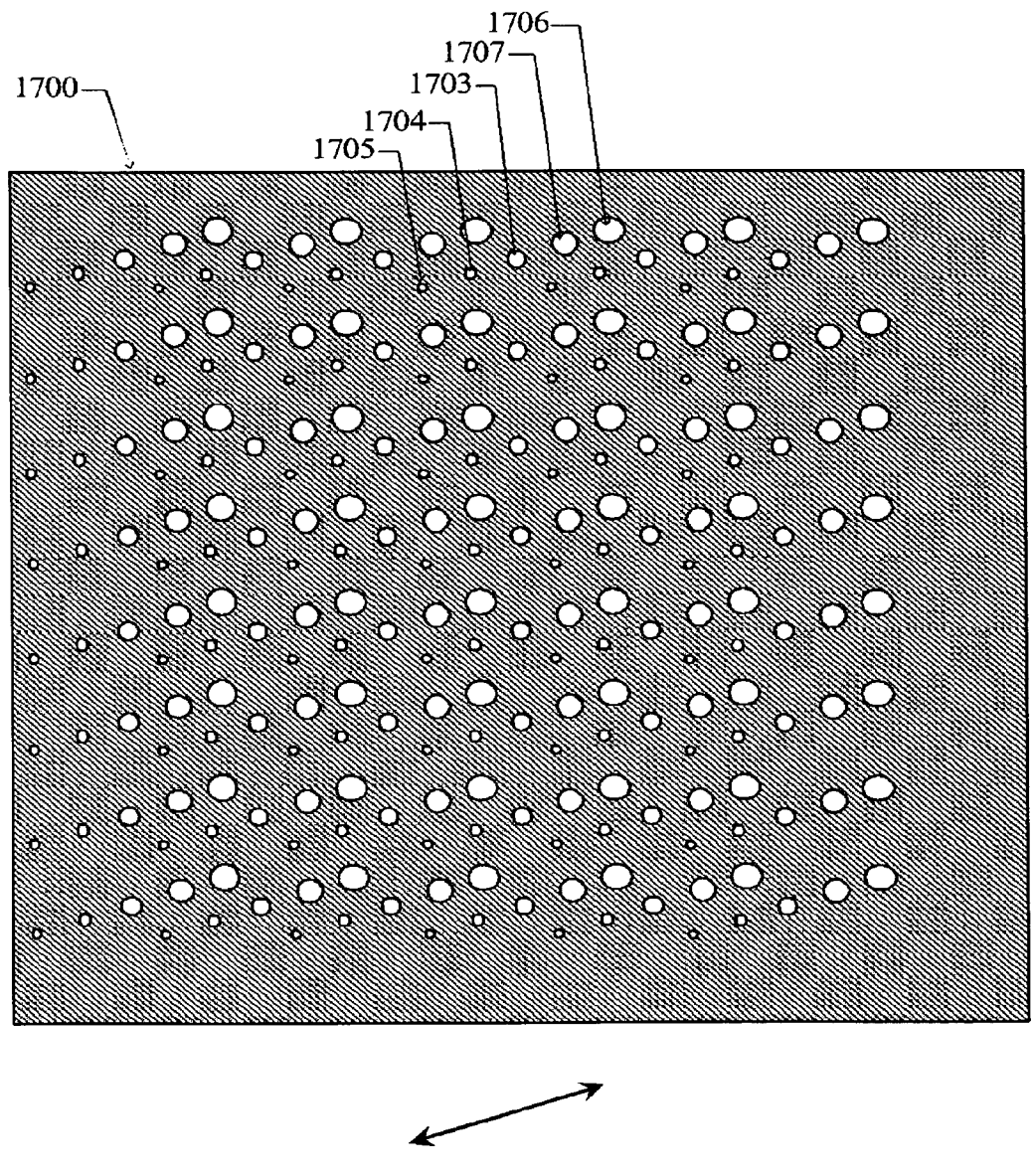
FIGS. 31 and 32 represent two plates provided with pinholes, both of these plates placed one against the other forming a modifiable spatial filtering device.
Figure 32:
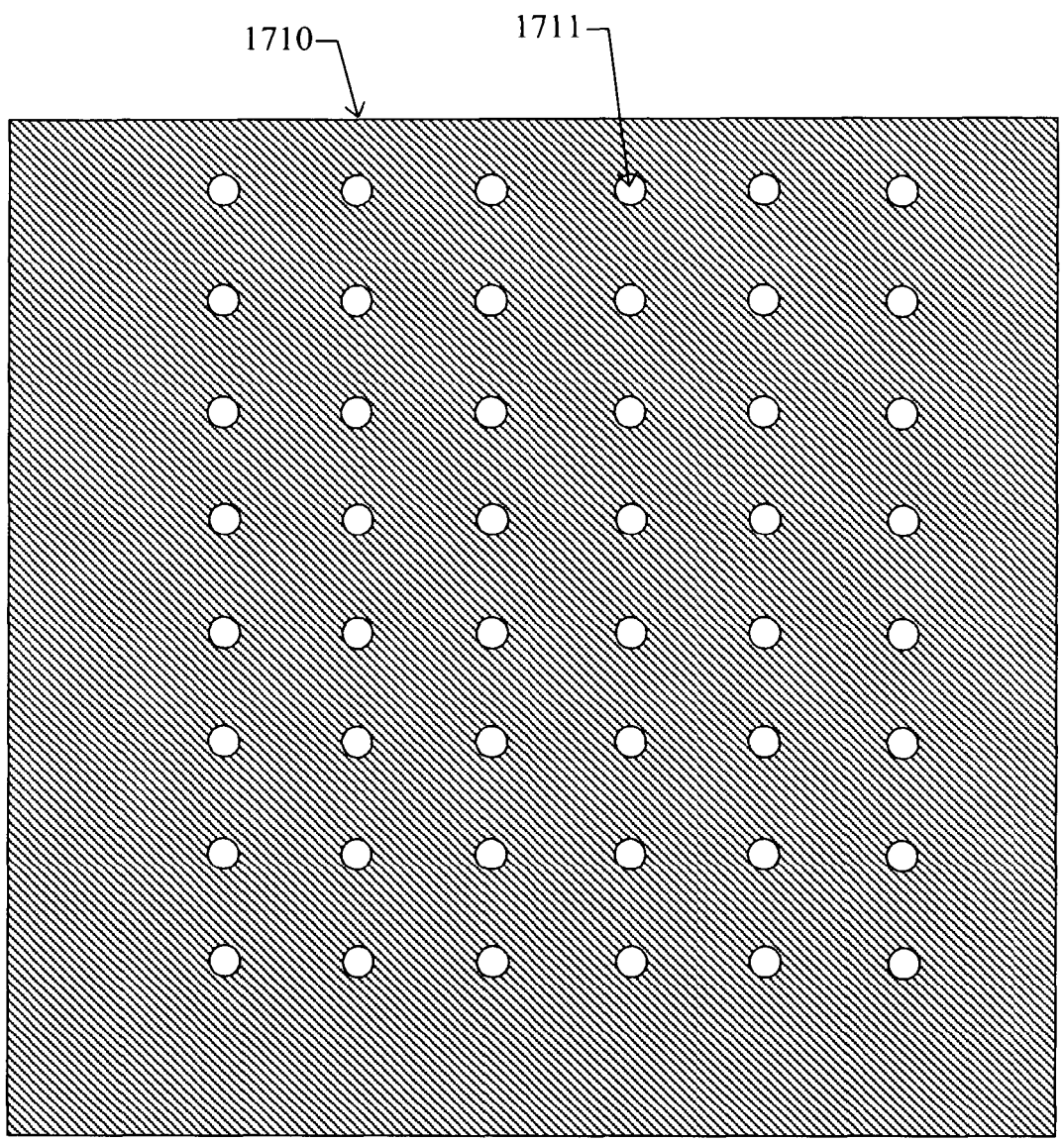

For example, when the spatial filtering system is a pinhole array, for example the array 130 in FIG. 6 or the array 1519 in FIG. 29, it can be made up of two plates 1700 and 1710 sliding against each other, the relative position of these plates allowing the pinhole size to be checked. The first plate 1700 is represented in FIG. 31. It includes, for example, the pinholes 1703 to 1707. The second plate 1710 is represented in FIG. 32 and includes, for example the pinhole 1711. When the two plates 1700 and 1710 are placed one against the other, and when the hole 1706 is brought opposite the hole 1711, the spatial filter formed by the two plates together is identical to that which would be formed by the plate 1710 alone, each of the pinholes of the plate 1710 being opposite a hole of the same diameter on the plate 1700. When the plate 1700 is moved in the direction of the arrow indicated in FIG. 32, the hole 1707 can be placed opposite the hole 1711. As the hole 1707 has a diameter smaller than the hole 1711, the diameter of the hole centered on 1711, in the assembly formed by the two plates 1700 and 1710, is limited by the hole 1707. The assembly formed by the two plates 1700 and 1710 is then a pinhole array, but the diameter of each hole in this array is that of the hole 1707. By successively bringing the hole 1711 opposite the holes 1703, 1704,

1705, it is possible to give different values to the diameter of each pinhole in the array formed by the assembly of the two plates 1700 and 1710 placed against each other. Each of these two plates may, for example, be obtained by depositing a metal layer on a sheet of glass, followed by an optical lithography operation to obtain the pinholes. When the two plates are placed one against the other, the metal layers of the two glasses must preferably be in direct contact, with the possibility of using an optical oil layer to facilitate their relative movement. The relative movement of the two plates can, for example, be controlled by means of a positioner using a stepping electric motor.

Figure 33:
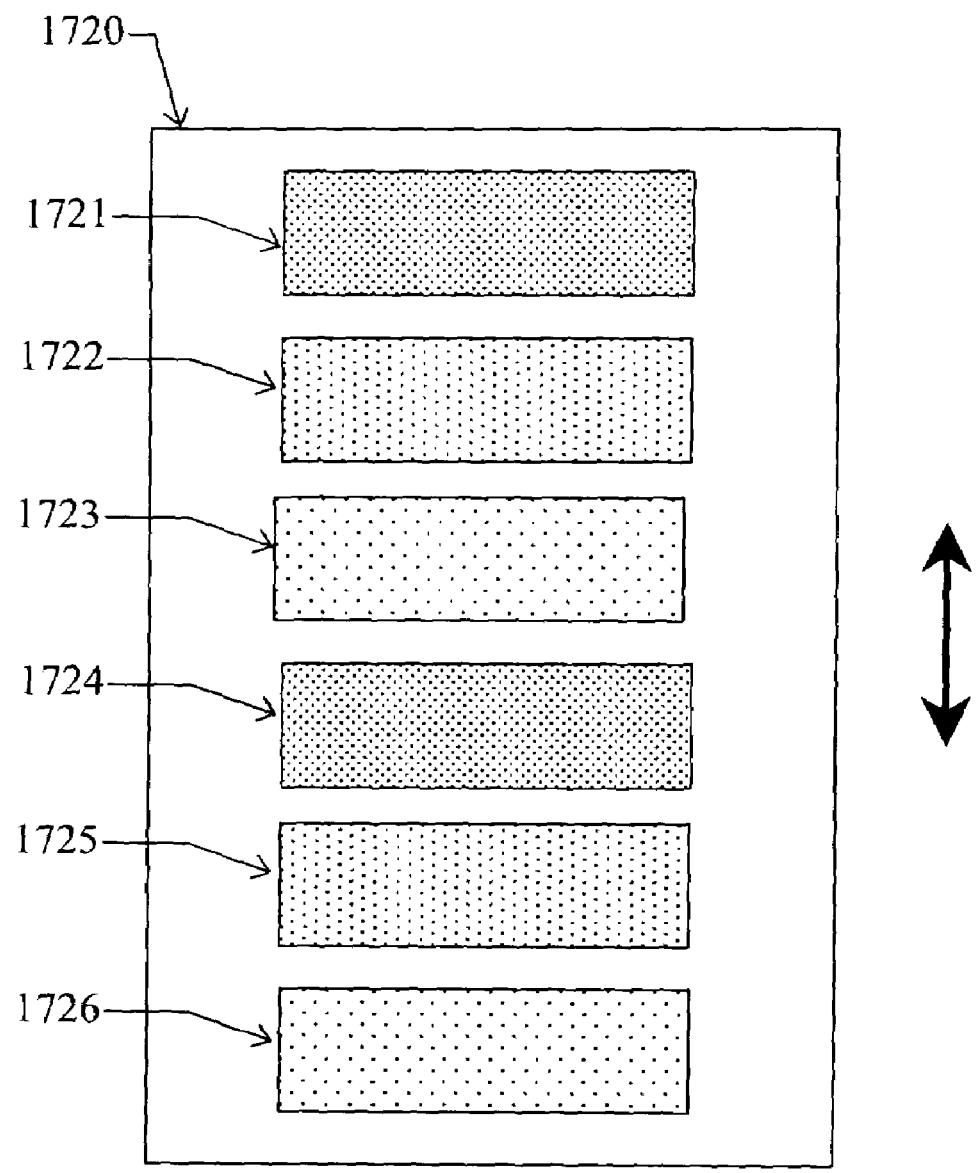
FIG. 33 shows a plate equipped with a plurality of pinhole arrays and mobile in one direction, allowing a modification of spatial filtering characteristics.
Figure 34:
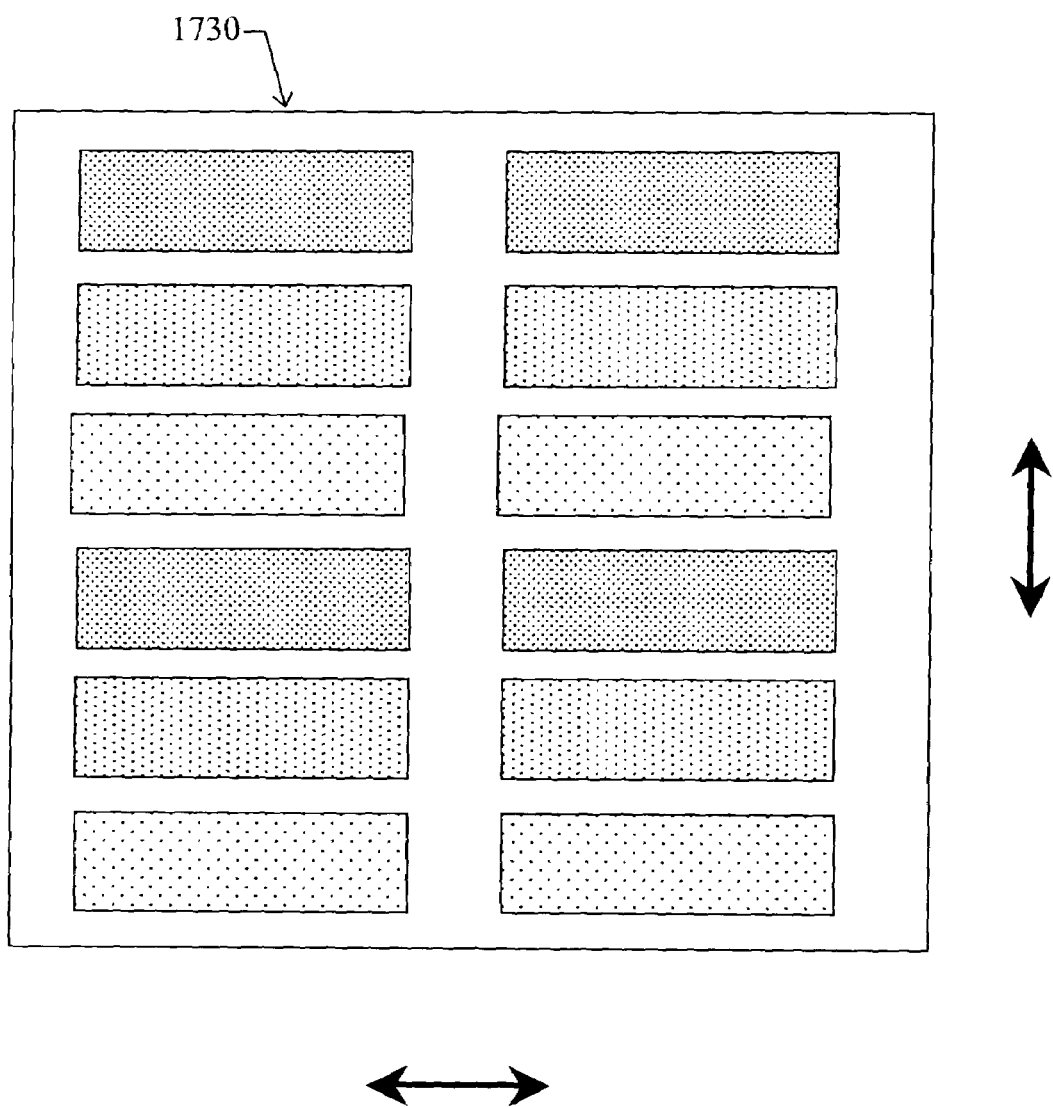
FIG. 34 shows a plate provided with a plurality of pinhole arrays and mobile in two directions. allowing a modification of spatial filtering characteristics.

When the spatial filtering system is an array of microscopic mirrors 606, as in FIG. 22, it is not possible to use the preceding method. The spatial filtering system can then be made up of a plate 1720 represented in FIG. 33, and comprising several microscopic mirror arrays 1721 to 1726. The plate 1720 can be mounted on a single-dimension positioning device comprising preferably a guide rail, and driven by an electric motor, and allowing movement in the direction of the arrow indicated in FIG. 33. By moving the plate along the arrow indicated in FIG. 33, it is possible to successively bring each of the zones 1721 to 1726 on to the illuminating beam path. The microscopic mirror arrays 1721 to 1726 may differ from each other as concerns the diameter of the microscopic mirrors and/or the director vectors of the arrays, and hence the array density. In an equivalent manner, it is possible to use a plate 1730, represented in FIG. 34, capable of being moved in two directions, and hence capable of including more microscopic mirror arrays. The microscopic mirror arrays can each be made on a glass and superposed on a support plate 1720 or 1730. They can also be made directly on the support plate. If the spatial filtering system is a pinhole array, an equivalent device can be used in which the microscopic mirror arrays are replaced by pinhole arrays. Constant and precise positioning of the pinholes is more difficult to obtain with this system than with the system made up of two parallel plates represented in FIGS. 31 and 32. It is thus preferable to use this technique when the spatial filtering system plays the simultaneous role of spatial filter and beam splitting device, as in the device 606 of FIG. 22 or the device 105 of FIG. 18.

Figure 35:
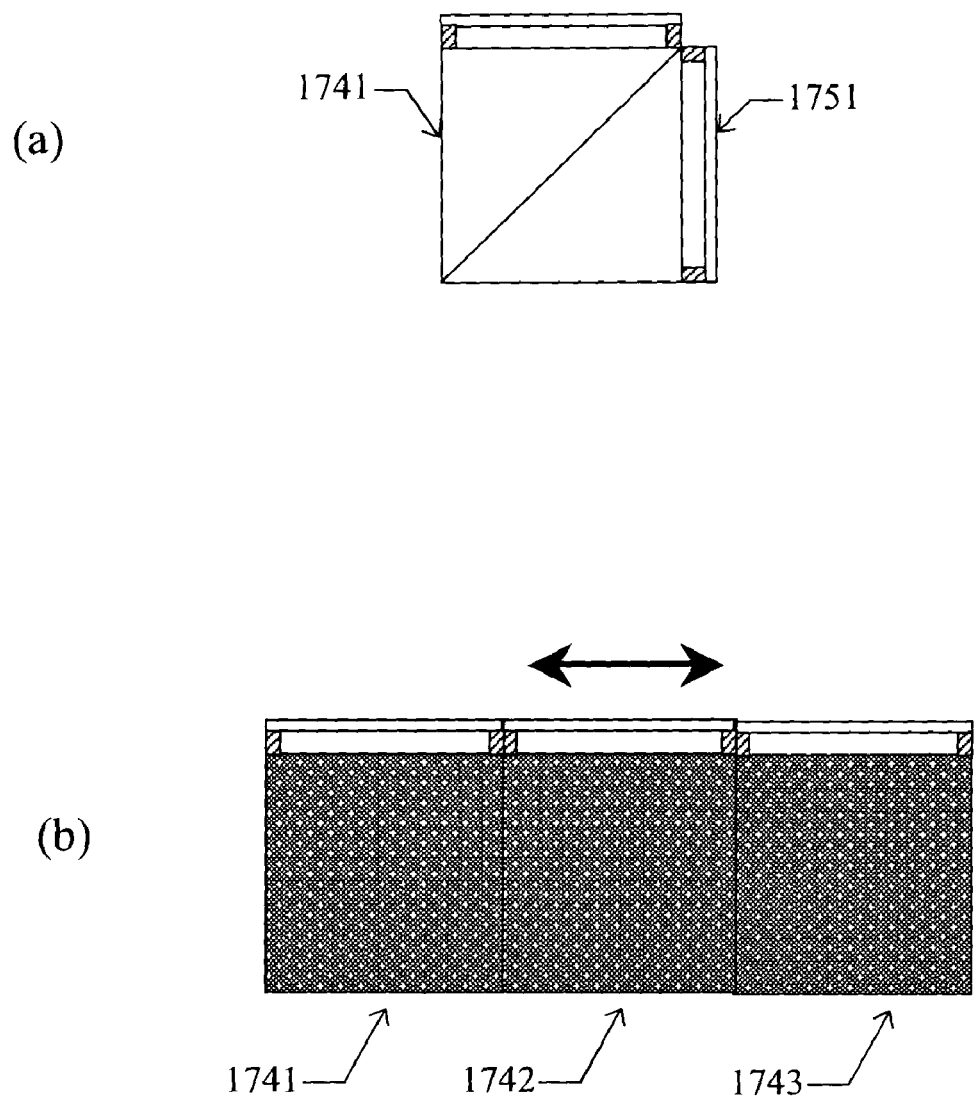
FIG. 35 shows a set of cubes each including a splitter and two spatial filtering devices, the assembly being mobile in one direction to be able to change the cube used in the device.

In the other cases, a filter exchange device requiring moderate mechanical precision can also be designed, but the spatial filtering system and the device splitting the illuminating beams into sub-beams must preferably be grouped in an exchangeable mobile unit. For example, in the device of FIG. 16, the pinhole arrays 105 and 130 as well as the dichroic mirror 104 can be grouped in a single unit represented in FIG. 17. Several of these units can be associated as indicated in FIG. 35 which shows a set of three units 1741, 1742, 1743 grouped together and movable as a unit. FIG. 35(*a*) is a side view (same observation direction as FIG. 16) and FIG. 35(*b*) is a side view along the direction V indicated in FIG. 16. By moving the assembly in the direction indicated in FIG. 35(*b*), it is possible to bring one or the other of the three units on to the light beam path. The assembly may be included in a mechanical device which provides among other things suitable diaphragming so that the cubes not used do not receive any light, and allowing motor-driven movement. The cubes 1741 to 1743 may differ from each other by the diameter of the pinholes or the density of the pinhole arrays. Each cube includes an array of pinholes 1751 constituting the first spatial filtering operation, which is mounted movably together with the beam splitting device and the dichroic mirror. If a microlens array is used as in FIG. 6, a similar device can be produced, the microlens array, the spatial filter and the dichroic mirror being integrated in a unit, and several units being integrated in a mobile system.

INDUSTRIAL APPLICATIONS

The present optical scanning device, integrated in a confocal microscope, can be used for fluorescence and real-time imaging of biological objects. Equipped with laser illumination, it allows imaging at the highest speed. Equipped with incoherent lighting, it allows fluorescence imaging with a complete range of excitation wavelengths. The confocal image obtained by means of the present device lends itself well to the use of three-dimensional deconvolution algorithms enabling improved resolution. The present optical scanning device, in an adapted version, can also be used for reflection imaging, for example for the observation of circuits in microelectronics, or for in-depth observation of living specimens (skin, for example), in which case it is the light beam diffracted back by the observed object which is measured.

The invention claimed is:

1. Confocal optical scanning device for viewing an observed area of an observed object;
   comprising means (1509) for splitting an illuminating beam (FX) into a plurality of illuminating sub-beams (FX2);
   comprising optical means (1513, 1516) for focusing the illuminating sub-beams on to a plurality of illuminating points in the observed object;
   comprising optical means (1513, 1516) for focusing a plurality of luminous sub-beams (FE) coming back from the illuminating points on to a plurality of luminous points in a first image plane (P1);
   comprising a spatial filtering system (1519) arranged in the first image plane and designed to select the light reaching the luminous points, to obtain a plurality of sub-beams (FD) to be detected;
   comprising optical means (1522, 1523) for focusing the plurality of sub-beams to be detected on to a plurality of points to be detected in a second image plane;
   comprising at least one rotatably mounted mobile mirror (1515) reflecting:
   i) the plurality of illuminating sub-beams directed towards the observed object, to allow the plurality of illuminating points to scan the observed object,
   ii) the plurality of luminous sub-beams, to allow the plurality of luminous points to be fixed in the first image plane, and
   iii) the plurality of sub-beams to be detected, to allow the plurality of points to be detected to scan the second image plane;
   wherein said means for splitting the illuminating beam into a plurality of illuminating sub-beams are adapted so that the plurality of illuminating points (1601) forms a two-dimensional periodic array;
   wherein said rotatably mounted mobile mirror is adapted to move each illuminating point along a substantially straight line (500); and
   wherein said straight line is not parallel to any of the direction vectors (u,v) of the periodic array.

2. Confocal optical scanning device as claimed in claim 1, adapted so that each illuminating point (1702) crosses the entire observed area (1701) during the scanning of the observed object.

3. Confocal optical scanning device as claimed in claim 1, comprising means (1507) for scanning a zone (1602) illuminated by the illuminating beam over the means (1509) for splitting the illuminating beam into sub-beams, the scanning movement of said zone being synchronous with the scanning of the observed object by the illuminating points.

4. Confocal optical scanning device as claimed in claim 3, wherein the means for scanning the zone illuminated by the illuminating beam over the means for splitting the illuminating beam into sub-beams are adapted so that an illuminated zone in the observed object remains fixed when said illuminating points scan the observed object, wherein said illuminated zone in the observed object comprises the plurality of illuminating points.

5. Confocal optical scanning device as claimed in claim 1, comprising means for eliminating the illuminating beam before it reaches the observed object, and wherein these means are designed to eliminate the illuminating beam when the speed of the movement of the geometrical image in the observed object of a fixed geometrical point of the first image plane (P1) reaches its minimum value.

6. Confocal optical scanning device as claimed in claim 5, wherein the means for eliminating the illuminating beam are formed by a limitation device (1517) arranged to be reached by the illuminating beam, said limitation device comprising means for eliminating the part of the illuminating beam which does not reach a selection area (1611), wherein the limitation device, the optical system, and the movement of the rotatably mounted mobile mirror are designed so that the zone (1612) illuminated by the illuminating beam on the limitation device is outside the selection area (1611) when the movement speed of the geometrical image, in the observed object, of a fixed geometrical point of the first image plane, reaches its minimum value.

7. Confocal optical scanning device as claimed in claim 1, wherein the means for splitting the illuminating beam into a plurality of illuminating sub-beams are formed by the spatial filtering system, and wherein the first spatial filtering system is mounted in a mobile or movable manner, to be replaced by another spatial filtering system.

8. Confocal optical scanning device as claimed in claim 1, wherein:
the illuminating beam is a non-coherent light beam; and
the means for splitting and the spatial filtering system are an array of microscopic mirrors.

9. Confocal optical scanning device as claimed in claim 1, wherein:
the illuminating beam is a laser beam;
the means for splitting is a microlens array (1529); and
the spatial filtering system is an array of pinholes (1519).

10. Confocal optical scanning device as claimed in claim 1, wherein:
the illuminating beam is a non-coherent light beam;
the means for splitting is an array of pinholes; and
the spatial filtering system is an array of pinholes.

11. The device of claim 1, further comprising a field diaphragm through which the illuminating sub-beams pass on their way from the rotatably mounted mirror to the observed object, the illuminating sub-beams being focused on the field diaphragm, and the movement of the rotatably mirror being adapted so that the field diaphragm is scanned by the illuminating sub-beams starting in a beam stopping portion of the field diaphragm which stops all illuminating sub-beams, crossing an aperture of the field diaphragm, and ending in a beam stopping portion of the field diaphragm.

12. Confocal optical scanning device for viewing an observed area of an observed object, comprising:
means for splitting an illuminating beam into a plurality of illuminating sub-beams;
optical means for focusing the illuminating sub-beams on to a plurality of illuminating points in the observed object;
optical means for focusing a plurality of luminous sub-beams coming back from the illuminating points on to a plurality of luminous points in a first image plane;
a spatial filtering system arranged in the first image plane and designed to select the light reaching the luminous points, to obtain a plurality of sub-beams to be detected;
optical means for focusing the plurality of sub-beams to be detected on to a plurality of points to be detected in a second image plane; and
a rotatably mounted mobile mirror reflecting:
i) the plurality of illuminating sub-beams directed towards the observed object, to allow the plurality of illuminating points to scan the observed object,
ii) the plurality of luminous sub-beams, to allow the plurality of luminous points to be fixed in the first image plane, and
iii) the plurality of beams to be detected, to allow the plurality of points to be detected to scan the second image plane;
wherein the improvement is characterized in that the device comprises means (1507) for scanning a zone illuminated by the illuminating beam over the means for splitting the illuminating beam into a plurality of illuminating sub-beams, the scanning of said zone over said means for splitting being synchronous with the scanning of the observed object by the illuminating points.

13. Confocal optical scanning device as claimed in claim 12, wherein the means for scanning the zone illuminated by the illuminating beam over the means for splitting the illuminating beam into sub-beams are designed so that an illuminated zone in the observed object remains fixed when said illuminating points scan the observed object, wherein said illuminated zone in the observed object comprises the plurality of illuminating points.

14. Confocal optical scanning device as claimed in claim 12, wherein the plurality of illuminating points forms a two-dimensional periodic array, wherein the movement of the illuminating points during the scan of the object is along a straight line, and wherein said straight line is not parallel to any of the direction vectors of the periodic array.

15. The device of claim 12, wherein the means for scanning a zone illuminated by the illuminating beam over the means for splitting the illuminating beam into a plurality of illuminating sub-beams are adapted so that, during each scan of the illuminating beam over the means for splitting, the zone illuminated by the illuminating beam starts in a first beam stopping area adjacent to the beam splitting area, crosses the beam splitting area, and ends in a second beam stopping area adjacent to the beam splitting area, wherein the illuminating beam reaching the beam stopping area is prevented from following its path towards the rotatable mirror.

16. In the operation of a confocal scanning microscope for the observation of an observed object, a method comprising the steps of:
directing an illuminating beam onto an illuminated zone on a splitting area;
scanning the illuminated zone over the splitting area;
splitting the illuminating beam having reached the splitting area into a plurality of illuminating sub-beams;
reflecting the plurality of illuminating sub-beams onto a rotatably mounted mobile mirror;

focusing the illuminating sub-beams onto a plurality of illuminating points in the observed object;

scanning the plurality of illuminating points over the observed object in synchronism with the scanning movement of the illuminated zone over the splitting area, using a rotation of the rotatably mounted mobile mirror;

reflecting on the rotatably mounted mobile mirror a plurality of luminous sub-beams (FE) coming back from the illuminating points;

focusing the plurality of luminous sub-beams (FE) on to a plurality of luminous points in a first image plane (P1);

descanning the plurality of luminous points, using the rotation of the rotatably mounted mobile mirror;

selecting the light reaching the luminous points, to obtain a plurality of sub-beams (FD) to be detected;

reflecting the plurality of sub-beams to be detected on the rotatably mounted mobile mirror, focusing the plurality of sub-beams to be detected on to a plurality of points to be detected in a second image plane;

rescanning the plurality of points to be detected over the second image plane, using the rotation of the rotatably mounted mobile mirror.

17. A method according to claim 16, wherein the scanning movement of said illuminated zone is adapted so that an illuminated zone in the observed object remains fixed when the illuminating points scan the observed object, wherein said illuminated zone in the observed object comprises the plurality of illuminating points.

18. A method according to claim 16, wherein said plurality of illuminating points is a two-dimensional periodic array scanning the observed object along a substantially straight line not parallel to any of the director vectors (u, v) of the periodic array.

19. A method according to claim 16, wherein, during each scan of the illuminated zone over the splitting area, the illuminated zone starts in a first beam stopping area adjacent to the splitting area, crosses the splitting area, and ends in a second beam stopping area adjacent to the splitting area, wherein the illuminating beam reaching the beam stopping area is prevented from following its path towards the rotatable mirror.

20. In the operation of a confocal scanning microscope for the observation of an observed area of an observed object, a method comprising the steps of:

directing an illuminating beam onto an illuminated zone on a splitting area;

splitting the illuminating beam having reached the splitting area into a plurality of illuminating sub-beams;

reflecting the plurality of illuminating sub-beams onto a rotatably mounted mobile mirror;

focusing the illuminating sub-beams onto a two-dimensional periodic array of illuminating points in the observed object;

scanning the two-dimensional periodic array of illuminating points over the observed object along a direction not parallel to the direction vectors of the periodic array, using a rotation of the rotatably mounted mobile mirror;

reflecting on the rotatably mounted mobile mirror a plurality of luminous sub-beams (FE) coming back from the illuminating points;

focusing the plurality of luminous sub-beams (FE) on to a plurality of luminous points in a first image plane (P1);

descanning the plurality of luminous points, using the rotation of the rotatably mounted mobile mirror;

selecting the light reaching the luminous points, to obtain a plurality of sub-beams (FD) to be detected;

reflecting the plurality of sub-beams to be detected on the rotatably mounted mobile mirror, focusing the plurality of sub-beams to be detected on to a plurality of points to be detected in a second image plane;

rescanning the plurality of points to be detected over the second image plane, using the rotation of the rotatably mounted mobile mirror.

21. The method of claim 20, wherein each illuminating point crosses the entire observed area of the observed object during said step of scanning.

22. The method of claim 20, further comprising:

a step of directing the plurality of illuminating sub-beams onto a field diaphragm on which the illuminating sub-beams are focused, a step of scanning the plurality of illuminating sub-beams over the field diaphragm, wherein each scan of the plurality of illuminating sub-beams over the diaphragm starts in a beam stopping portion of the diaphragm which stops all illumination sub-beams, crosses an aperture of the diaphragm, and ends in a beam stopping portion of the diaphragm which stops all illumination sub-beams, wherein the scan of the plurality of illuminating sub-beams over the field diaphragm is simultaneous with the scan of the illuminating points over the observed object.

* * * * *